US005227477A

United States Patent [19]

Auerbach et al.

[11] Patent Number: 5,227,477

[45] Date of Patent: Jul. 13, 1993

[54] DYES HAVING ONE OR TWO 2,4- OR 4,6-DICHLORO-5-CYANOPYRIMIDYL GROUPS LINKED THROUGH BRIDGING RADICALS CONTAINING AT LEAST TWO NITROGEN ATOMS TO CHLORO-1,3,5-TRIAZINYL GROUPS

[75] Inventors: Günther Auerbach, Basel, Switzerland; Kurt Brenneisen, Grenzach; Markus Doerr, Hartheim, both of Fed. Rep. of Germany; Paul Doswald, Münchenstein, Switzerland; Markus Gisler, Rheinfelden, Switzerland; Werner Koch, Oberwil, Switzerland; Helmut A. Moser, Oberwil, Switzerland; Roland Wald, Huningue, France

[73] Assignee: Sandoz Ltd., Basel, Switzerland

[21] Appl. No.: 736,196

[22] Filed: Jul. 26, 1991

Related U.S. Application Data

[63] Continuation of Ser. No. 523,160, May 14, 1990, abandoned, which is a continuation of Ser. No. 366,058, Jun. 14, 1989, abandoned.

[30] Foreign Application Priority Data

Jun. 14, 1988 [DE] Fed. Rep. of Germany ....... 3820149

[51] Int. Cl.[5] ........................ C09B 62/20; D06P 1/382

[52] U.S. Cl. .................................... 534/634; 534/618; 534/623; 534/624; 534/633; 540/126; 544/56; 544/58.1; 544/60; 544/75; 544/209; 8/549

[58] Field of Search ............... 534/618, 623, 624, 625, 534/627, 628, 633, 634; 540/125; 544/56, 58.1, 60, 75, 209

[56] References Cited

U.S. PATENT DOCUMENTS

| | | | |
|---|---|---|---|
| 3,362,948 | 1/1968 | Andrew et al. | 534/636 X |
| 3,926,942 | 12/1975 | Yelland | 534/618 |
| 4,248,771 | 2/1981 | Scholl et al. | 534/634 X |
| 4,330,469 | 5/1982 | Gati et al. | 540/126 |

FOREIGN PATENT DOCUMENTS

| | | | |
|---|---|---|---|
| 97119 | 12/1983 | European Pat. Off. | 534/634 |
| 1328571 | 4/1963 | France | 534/635 |
| 1344653 | 10/1963 | France | 534/635 |
| 441563 | 8/1967 | Switzerland | 534/634 |
| 1247186 | 9/1971 | United Kingdom | 534/634 |
| 1320921 | 6/1973 | United Kingdom . | |
| 1384749 | 2/1975 | United Kingdom . | |
| 1530104 | 10/1978 | United Kingdom . | |
| 1569492 | 6/1980 | United Kingdom . | |
| 2169306 | 7/1986 | United Kingdom | 534/634 |
| 2200131 | 7/1988 | United Kingdom | 534/634 |

OTHER PUBLICATIONS

Beech, Fibre-Reactive Dyes, Logos Press Limited, London (1970), pp. 118–131 and 176–181.

*Primary Examiner*—Mary C. Lee
*Assistant Examiner*—Fiona T. Powers
*Attorney, Agent, or Firm*—Robert S. Honor; Melvyn M. Kassenoff

[57] ABSTRACT

Metal-free compounds of the formula

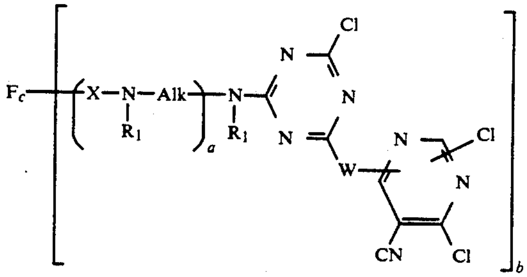

a 1:1 or 1:2 metal complex of a metallizable compound of said formula or a salt of a metal-free compound of said formula or of a 1:1 or 1:2 metal complex thereof each cation of which is independently a non-chromophoric cation, or a mixture, thereof, wherein $F_c$ is the radical of a water-soluble azo, formazan, phthalocyanine, azomethine, oxazine, thiazine, phenazine or triphenylmethane dye, each W is independently —$NR_1$—$B_1$—$NR_1$—, (Abstract continued on next page.)

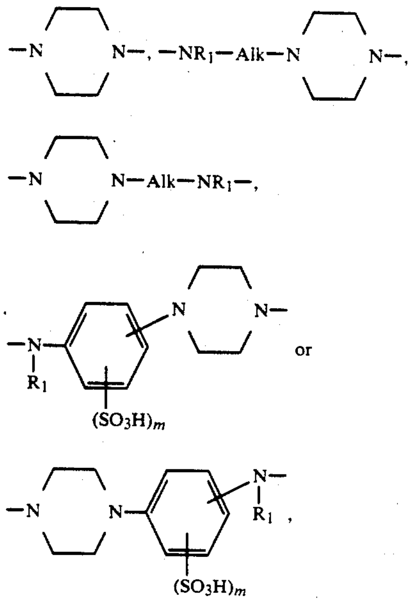

wherein $B_1$ is linear or branched $C_{2-6}$alkylene; linear or branched $C_{2-6}$alkylene interrupted by —O— or —$NR_1$—; linear or branched $C_{3-6}$alkylene monosubstituted by hydroxy or carboxy or disubstituted by hydroxy,

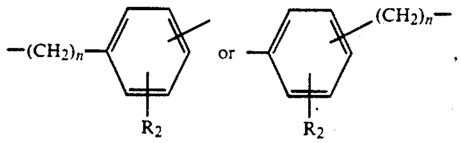

wherein $R_2$ is hydrogen, $C_{1-4}$alkyl, $C_{1-4}$alkoxy, carboxy or sulfo, and n is 0, 1, 2, 3 or 4, and m is 0 or 1, each X is independently a direct bond, —CO— or —$SO_2$—, each a is independently 0 or 1, and b is 1 or 2, wherein each Alk is independently linear or branched $C_{2-4}$alkylene, and each $R_1$ is independently hydrogen, $C_{1-4}$alkyl or $C_{1-4}$alkyl monosubstituted by hydroxy, halo, sulfo, sulfato or carboxy, with the proviso that the hydroxy groups of each alkylene radical substituted by two hydroxy groups are attached to different carbon atoms, useful for dyeing and printing hydroxy group- and nitrogen-containing organic substrates, for example, leather and fibrous materials comprising, natural, or synthetic polyamides or natural or regenerated cellulose, especially textile materials comprising cotton.

28 Claims, No Drawings

DYES HAVING ONE OR TWO 2,4- OR 4,6-DICHLORO-5-CYANOPYRIMIDYL GROUPS LINKED THROUGH BRIDGING RADICALS CONTAINING AT LEAST TWO NITROGEN ATOMS TO CHLORO-1,3,5-TRIAZINYL GROUPS

This is a continuation of application Ser. No. 07/523,160, filed May 14, 1990 and now abandoned which is a continuation of application Ser. No. 07/366,058, filed Jun. 14, 1989 and now abandoned.

This invention relates to chromophoric compounds containing fibre-reactive groups and a process for their preparation. These compounds are suitable for use as fibre-reactive dyestuffs in any conventional dyeing or printing process.

More particularly, this invention provides compounds of formula I

I

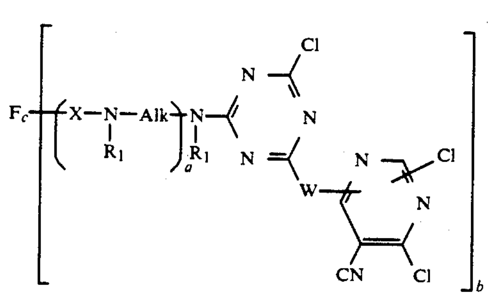

in free acid or salt form, in which $F_c$ is the radical of a water-soluble azo, formazan, phthalocyanine, azomethine, oxazine, thiazine, phenazine or triphenylmethane dye which is in metal-free or metal complex form, which radical may contain a further fibre-reactive group, each a, independently, is 0 or 1, b is 1 or 2, each X, independently, is a direct bond, —CO— or —$SO_2$—, each $R_1$, independently, is hydrogen, unsubstituted $C_{1-4}$alkyl or $C_{1-4}$alkyl which is monosubstituted by hydroxy, halogen, —$SO_3H$, —$OSO_3H$ or —COOH, and each Alk, independently, is $C_{2-4}$alkylene;

each W, independently, is

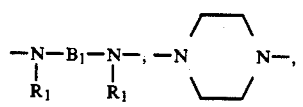

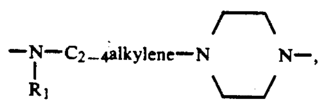

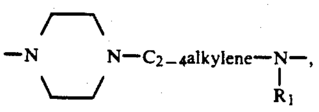

-continued

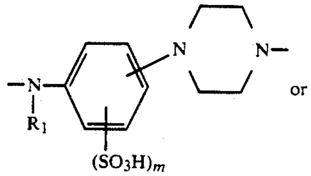

or

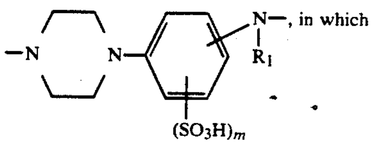

, in which m is 0 or 1, and $B_1$ is $C_{2-6}$alkylene; a $C_{2-6}$alkylene chain which is interrupted by —O— or —$NR_1$—; $C_{3-6}$alkylene which is substituted by one or two hydroxy groups or by one carboxy group:

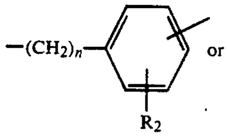

or

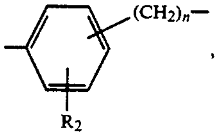

, in which n is 0, 1, 2, 3 or 4, and $R_2$ is hydrogen, $C_{1-4}$alkyl, $C_{1-4}$alkoxy, —COOH or —$SO_3H$, and mixtures of compounds of formula I.

In the specification, any alkyl, alkenyl, alkynyl or alkylene group present is linear or branched unless indicated otherwise. In any hydroxy-substituted alkyl or alkylene group which is attached to a nitrogen atom, the hydroxy group is preferably bound to a carbon atom which is not directly attached to the nitrogen atom. In any alkylene group containing two hydroxy groups, the hydroxy groups are bound to different carbon atoms which are preferably not adjacent to each other. In any alkylene chain interrupted by —O— or —$NR_1$— which is attached to a nitrogen atom, preferably the —O— or —$NR_1$— is bound to a carbon atom which is not directly attached to the nitrogen atom.

Any halogen is preferably fluorine, chlorine or bromine; more preferably, it is chlorine or bromine, and especially chlorine.

Preferably, when a compound of formula I is in 1:2 metal complex form, each of the two units of the complex contains at least one sulfo group and, otherwise, the compound of formula I preferably contains at least one sulfo group.

$F_c$ is preferably the water-soluble radical of a metal-free or metal containing monoazo or disazo dye which when metallised is preferably in 1:1 copper complex or 1:2 chromium or 1:2 cobalt complex form, of a formazan, copper or nickel phthalocyanine or triphenedioxazine dye.

Each X, independently, is preferably a direct bond or —$SO_2$—.

Each Alk, independently, is preferably a $C_{2-3}$alkylene group.

Any alkyl as $R_1$ preferably contains 1 or 2 carbon atoms. Any substituted alkyl as $R_1$ is preferably $C_{1-3}$alkyl preferably containing one substituent selected from hydroxy, —$SO_3H$, —$OSO_3H$ and —COOH, especially hydroxy.

Each $R_1$ is preferably $R_{1a}$, where each $R_{1a}$, independently, is hydrogen, methyl, ethyl, 2-hydroxyethyl, —$(CH_2)_r$—$SO_3H$, —$(CH_2)_r$—$OSO_3H$ or —$(CH_2)_q$—COOH, in which r is 1 or 2 and q is 1, 2 or 3.

More preferably, each $R_1$ is $R_{1b}$, where each $R_{1b}$, independently, is hydrogen, methyl, ethyl or 2-hydroxyethyl. Most preferably each $R_1$ is hydrogen.

Each $R_2$ is preferably $R_{2a}$, where each $R_{2a}$, independently, is hydrogen, methyl, methoxy, —COOH or —$SO_3H$. More preferably each $R_2$ is $R_{2b}$, where each $R_{2b}$, independently, is hydrogen or —$SO_3H$.

Each $B_1$ is preferably $B_{1a}$, where each $B_{1a}$, independently, is —$C_{2-4}$alkylene—, —$C_{2-3}$alkylene—O—$C_{2-3}$alkylene-, —$C_{2-3}$alkylene—N($R_{1b}$)—$C_{2-3}$alkylene—, monohydroxy-substituted —$C_{3-4}$alkylene-,

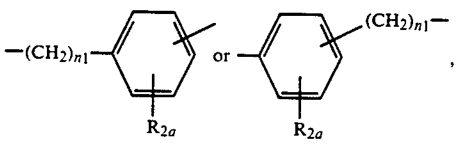

in which $n_1$ is 0, 1, 2 or 3.

More preferably each $B_1$ is $B_{1b}$, where each $B_{1b}$, independently, is —$C_{2-3}$alkylene-, monohydroxy-substituted —$C_{3-4}$alkylene-,

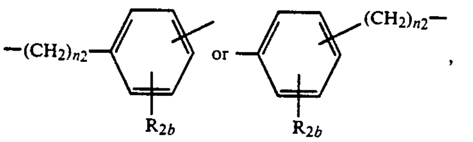

in which $n_2$ is 0, 1 or 2.

Most preferably each $B_1$ is $B_{1c}$, where each $B_{1c}$, independently, is —$C_{2-3}$alkylene- or monohydroxy-substituted —$C_{3-4}$alkylene-.

Each W is preferably $W_1$, where each $W_1$, independently, is

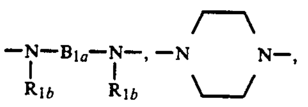

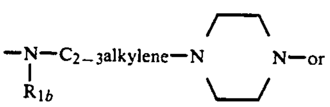

-continued

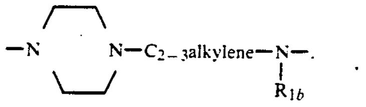

More preferably each W is $W_2$, where each $W_2$, independently, is

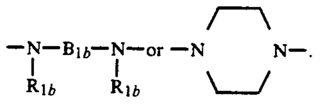

Most preferably each W is $W_3$, where each $W_3$, independently, is —NH—$B_{1c}$—NH—.

Preferred compounds of formula I in metal-free or metal complex form are of formulae (1) to (7) as defined below:

Compounds (1)

$$\left[DK-N=N-KK\right]-(Z)_b \quad (1)$$

in which

DK is the radical of a benzenic or naphthalenic diazo component,

KK is the radical of a benzenic, naphthalenic or heterocyclic coupling component or of a CH-acidic compound capable of being enolised, Z is

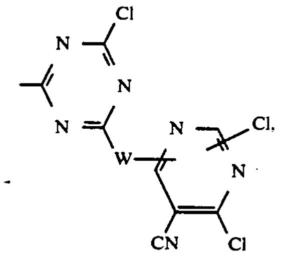

in which

W is as defined above, and b is 1 or 2, which one or two groups Z are bound to the diazo and/or coupling component by

—N($R_1$)—.

Preferably b is 1.

In a compound (1)

DK is preferably one of the groups (a) to (h) in which each marked bond is attached to the azo group and each —$NR_1$— radical is attached to Z,

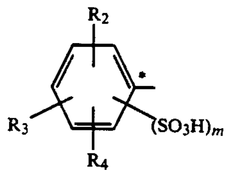

(a)

-continued (b)

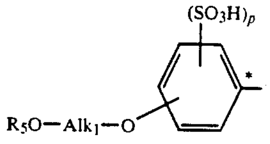

(c)

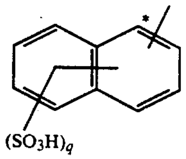

(d)

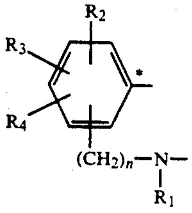

(e)

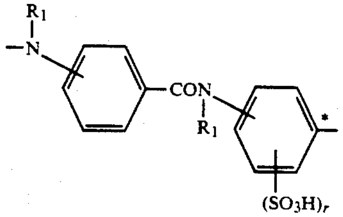

(f)

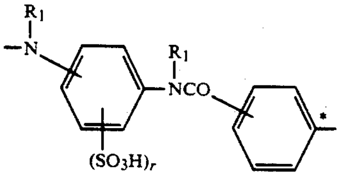

(g)

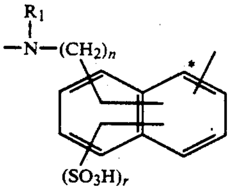

(h)

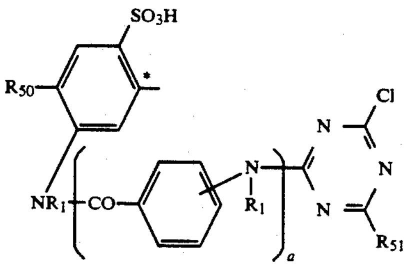

in which $R_1$ and $R_2$ are as defined above, $R_3$ is hydrogen, halogen, $C_{1\text{-}4}$alkyl, $C_{1\text{-}4}$alkoxy, acetylamino, benzoylamino, —$SO_3H$ or —$COR_{13}$, $R_4$ is hydrogen, halogen, $C_{1\text{-}4}$alkyl, $C_{1\text{-}4}$alkoxy or —$COR_{13}$, $R_{13}$ is —OH, —$OC_{1\text{-}4}$alkyl or —$NH_2$, $Alk_1$ is —$C_{2\text{-}3}$alkylene, $R_5$ is hydrogen, —$SO_3H$, $C_{1\text{-}4}$alkyl or $C_{2\text{-}4}$hydroxyalkyl, $R_{50}$ is hydrogen or —$SO_3H$, $R_{51}$ is

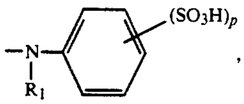

,

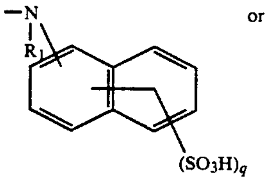

or

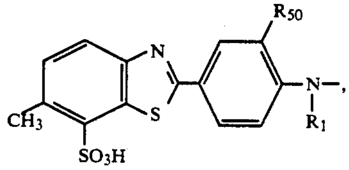

m is 0 or 1, n is 0, 1, 2, 3 or 4, p is 0, 1 or 2, q is 1, 2 or 3, and r is 1 or 2;

KK is preferably one of the groups ($K_1$) to ($K_7$) in which the marked carbon atom indicates the position where the coupling takes place, and each —$NR_1$— radical is attached to Z,

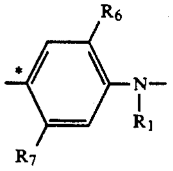

($K_1$)

in which $R_1$ is as defined above, $R_6$ is hydrogen, $C_{1\text{-}4}$alkyl or $C_{1\text{-}4}$alkoxy, and $R_7$ is hydrogen, halogen, $C_{1\text{-}4}$alkyl, $C_{1\text{-}4}$alkoxy, —$NHCOC_{1\text{-}4}$alkyl or —$NHCONH_2$;

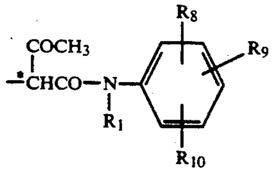

($K_2$)

in which $R_1$ is as defined above, $R_8$ is hydrogen, halogen, $C_{1\text{-}4}$alkyl or $C_{1\text{-}4}$alkoxy, $R_9$ is hydrogen, halogen, $C_{1\text{-}4}$alkyl, $C_{1\text{-}4}$alkoxy, —COOH or —$SO_3H$, and $R_{10}$ is hydrogen, —$SO_3H$ or —$NR_1$—(Z);

(K3)

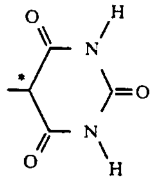

(K4)

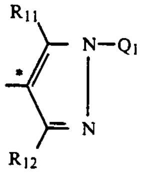

in which $R_{11}$ is —OH or —$NH_2$, $R_{12}$ is $C_{1-4}$alkyl or —$COR_{13}$, $R_{13}$ is as defined above, $Q_1$ is hydrogen, $C_{1-4}$alkyl or

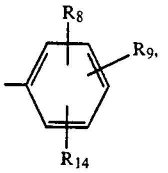

$R_8$ and $R_9$ are as defined above, and $R_{14}$ is hydrogen, halogen, $C_{1-4}$alkyl,

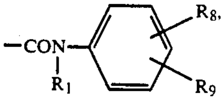

—$SO_3H$ or —$(B_3)_a$—N($R_1$)—(Z)

in which $R_1$ and a are as defined above and $B_3$ is a divalent bridging group; preferably, a is 0.

(K5)

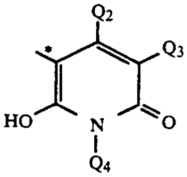

in which $Q_2$ is hydrogen; $C_{1-4}$alkyl; $C_{5-6}$cycloalkyl; phenyl or phenyl($C_{1-4}$alkyl) in which each phenyl ring is unsubstituted or substituted by 1-3 substituents selected from $C_{1-4}$alkyl, $C_{1-4}$alkoxy, halogen, —COOH and —$SO_3H$; —$COR_{13}$ or $C_{1-4}$alkyl monosubstituted by —$SO_3H$, —$OSO_3H$ or —$COR_{13}$, $Q_3$ is hydrogen; —CN; —$SO_3H$; —$COR_{13}$; $C_{1-4}$alkyl; $C_{1-4}$alkyl monosubstituted by —OH, halogen, —CN, $C_{1-4}$alkoxy,

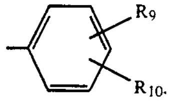

—$SO_3H$, —$OSO_3H$ or —$NH_2$; —$SO_2NH_2$;

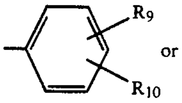

or

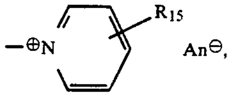

$An^{\ominus}$, in which $R_{15}$ is hydrogen, $C_{1-4}$alkyl or $C_{2-4}$hydroxyalkyl, and $An^{\ominus}$ is a non-chromophoric anion, $Q_4$ is hydrogen;

—$B_2$—N($R_1$)—(Z);

$C_{1-6}$alkyl; $C_{2-4}$alkenyl; $C_{2-4}$alkynyl; $C_{5-6}$cycloalkyl; phenyl or phenyl($C_{1-4}$-alkyl) in which each phenyl ring is unsubstituted or substituted by 1-3 substituents selected from halogen, $C_{1-4}$alkyl, $C_{1-4}$alkoxy, —$SO_3H$, —COOH, —$NH_2$ and —$NR_1$—(Z); or —$C_{1-6}$alkylene-Y in which Y is —COOH, —$COOC_{1-4}$alkyl, —$SO_3H$, —$OSO_3H$, —OH, —CN, $C_{1-4}$alkoxy, —$NH_2$ or a protonatable aliphatic, cycloaliphatic, aromatic or heterocyclic amino group or a quaternary ammonium group, and $B_2$ is $C_{2-6}$alkylene; monohydroxy-substituted $C_{3-6}$alkylene; a $C_{2-6}$alkylene chain which is interrupted by —O— or —$NR_1$—;

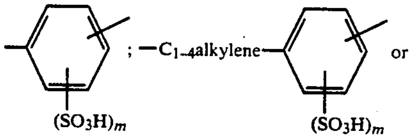

or

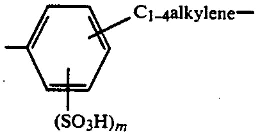

or

—$B_2$—$NR_1$—(Z) is

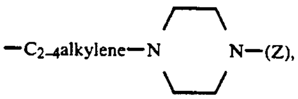

and $R_1$, $R_9$, $R_{10}$ and $R_{13}$ are as defined above; preferably, $B_2$ is $B_{2a}$ and Y is $Y_2$ as defined below;

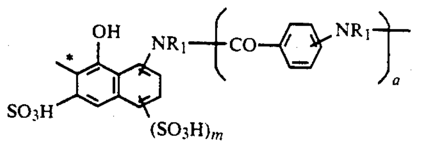

(K6)

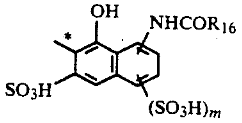

(K7)

in which $R_{16}$ is $C_{1-4}$alkyl, phenyl or phenyl substituted by 1-3 substituents selected from halogen, $C_{1-4}$alkyl and $C_{1-4}$alkoxy, and $R_1$, a and m are as defined above.

Compounds (2)

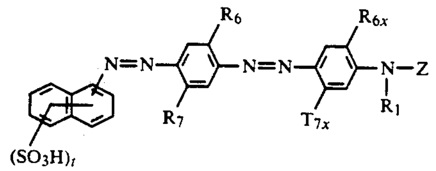

(2)

in which $R_6$, $R_7$, $R_1$ and Z are as defined above, t is 2 or 3, $R_{6x}$ has one of the significances of $R_6$ independently of $R_6$, and $R_{7x}$ has one of the significances of $R_7$ independently of $R_7$.

Preferred compounds (2) are those in which each $R_6$, $R_{6x}$ and $R_{7x}$ is hydrogen.

As compounds (3) there are provided metal complexes, preferably 1:1 copper and 1:2 chromium or 1:2 cobalt complexes, of the following metal-free compounds (3a) or (3b),

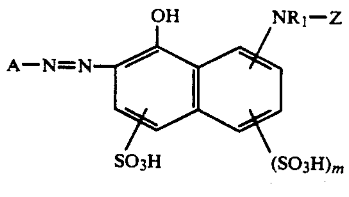

(3a)

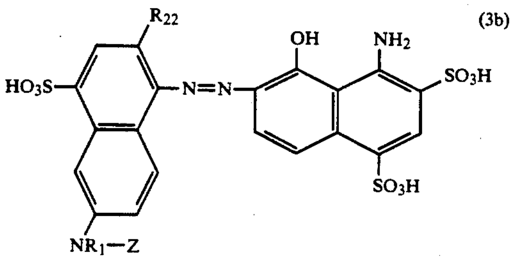

(3b)

in which $R_1$, Z and m are as defined above,

A is

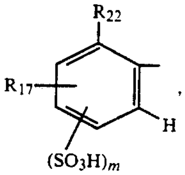

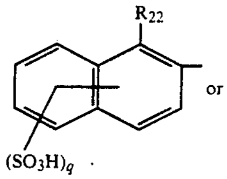

or

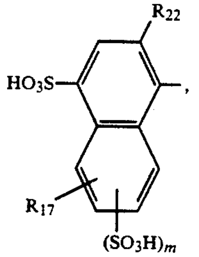

in which m and q are as defined above, $R_{17}$ is hydrogen, halogen, nitro, $C_{1-4}$alkyl, $C_{1-4}$alkoxy, $-COR_{13}$, $-SO_3H$ or $-NHCOCH_3$, $R_{22}$ is $-OH$, $-OCH_3$ or $-NH_2$, and $R_{13}$ is as defined above.

In a 1:2 chromium or 1:2 cobalt complex the two azo compounds are the same or different, i.e., it is a symmetrical or asymmetrical 1:2 metal complex.

Particularly preferred are 1:1 copper complexes of a compound (3a) in which

A is the radical of a benzenic diazo component and the radical of the naphthalenic coupling component is of the formula

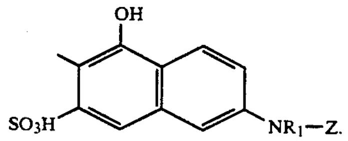

Furthermore, 1:1 copper complexes corresponding to the following formulae (3c) to (3e):

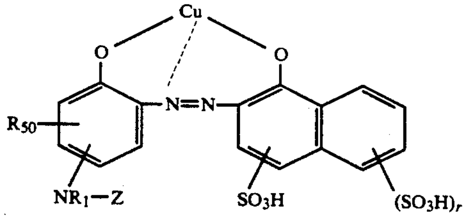

(3c)

in which $R_{50}$ is hydrogen or $SO_3H$, and $R_1$, Z and r are as defined above:

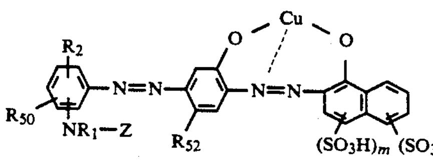

(3d)

in which the floating oxy and azo radicals are ortho to each other in the 1- and 2-positions of the naphthyl ring, $R_{52}$ is hydrogen, $C_{1-4}$alkyl or $C_{1-4}$alkoxy,
m is 0 or 1, r is 1 or 2 and
m+r are 2 or 3, and
$R_1$, $R_2$, $R_{50}$ and Z are as defined above;

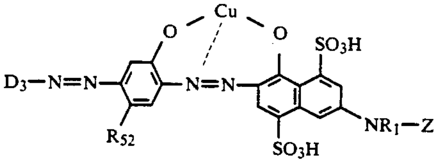

(3e)

in which

D3 is

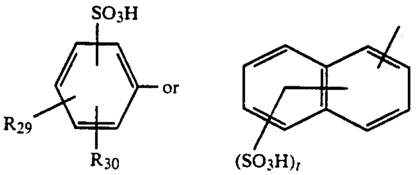

wherein
$R_{29}$ is hydrogen, —COOH or —$SO_3H$,
$R_{30}$ is hydrogen, $C_{1-4}$alkyl, $C_{1-4}$alkoxy or —O—$Alk_1$—$OR_5$, and t, $R_5$ and $Alk_1$ are as defined above, and
$R_1$, $R_{52}$ and Z are as defined above.

Compounds (4)

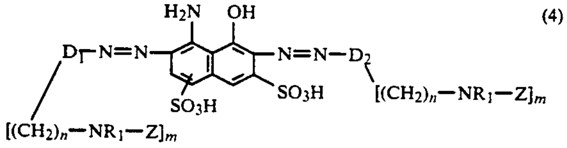

(4)

in which
each $D_1$ and $D_2$, independently, is the radical of a diazo component of the aminobenzene or aminonaphthalene series containing at least one sulpho, sulphonamido or carboxy group,
each m is 0 or 1, with the proviso that at least one m is 1, and
$R_1$, Z and n are as defined above.

$D_1$ is preferably $D_{1a}$, where $D_{1a}$ is a group of formula ($a_x$) or ($c_x$)

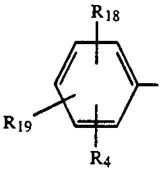

($a_x$)

-continued

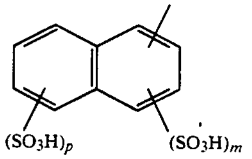

($c_x$)

in which
$R_{18}$ is sulpho, sulphonamido or —$COR_{13}$,
$R_{19}$ is hydrogen, halogen, $C_{1-4}$alkyl, $C_{1-4}$alkoxy, —$NHCOCH_3$ or —$SO_3H$,
$R_{13}$, m and p are as defined above, and
m+p are 1 or 2.

$D_2$ is preferably $D_{2a}$, where $D_{2a}$ is a group of formula ($d_x$)

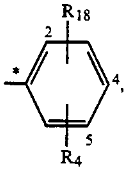

($d_x$)

in which $R_4$ and $R_{18}$ are as defined above, the marked bond is attached to the azo group and the other free bond is attached to the reactive group.

More preferably, in the group ($d_x$) $R_{18}$ is in the 2-position (with the azo group in the 1-position) and the free bond which is attached to the reactive group is in the 4- or 5-position.

Compounds (5)

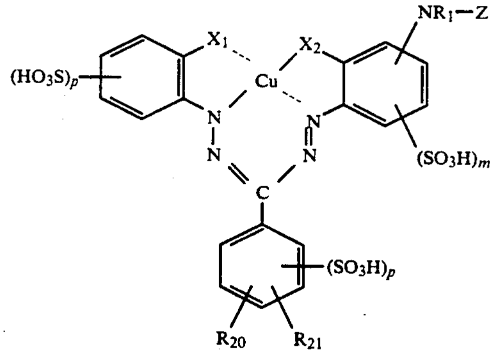

(5)

in which
one of $X_1$ and $X_2$ is —O— and the other is carboxy,
each $R_{20}$ and $R_{21}$, independently, is hydrogen, halogen, $C_{1-4}$alkyl, $C_{1-4}$alkoxy, —$COR_{13}$ or —NHCO($C_{1-4}$alkyl),
$R_1$, $R_{13}$, Z and m are as defined above,
each p, independently, is 0, 1 or 2, and
m+both p's together are at least 2.

Compounds (6)

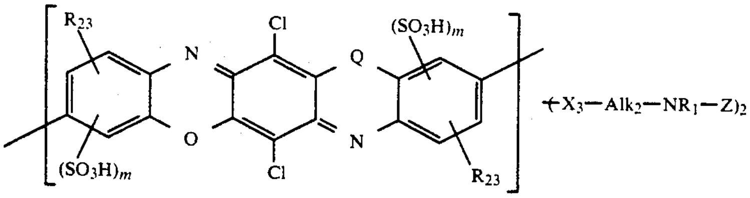

(6)

in which

Q is —O— or —S—, each $R_{23}$, independently, is hydrogen or $—SO_2CH_2CH_2OSO_3H$, each m, independently, is 0 or 1, each $X_3$, independently, is $—SO_2—$, $—NR_1—$, $—{}^*CONR_1—$ or $—{}^*SO_2NR_1—$ in which the marked atom is attached to a carbon atom of the ring system, each $Alk_2$, independently, is $C_{2-4}$alkylene, and each $R_1$ and Z, independently, is as defined above, and mixtures of compounds (6).

In a compound (6), preferably the two $-X_3-Alk_2-NR_1-Z$ groups are identical.

Compounds (7)

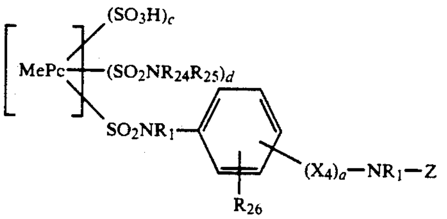

(7)

in which c is 1, 2 or 3, and d is 0, 1 or 2, with the proviso that c+d do not exceed 3;

Pc is the phthalocyanine radical,

Me is copper, nickel, cobalt, iron or aluminium, each $R_{24}$ and $R_{25}$, independently, is hydrogen or $C_{1-6}$alkyl, or $—NR_{24}R_{25}$ is a saturated 5- or 6-membered heterocyclic ring which may contain one further —O— or $$—\underset{R_{31}}{\underset{|}{N}}—,$$

in which $R_{31}$ is hydrogen, $C_{1-4}$alkyl, 2-hydroxyethyl or 2-aminoethyl, $R_{26}$ is hydrogen, halogen, hydroxy, $C_{1-4}$alkyl, $C_{1-4}$alkoxy, —COOH or $—SO_3H$, a is 0 or 1, $X_4$ is a divalent, optionally $$—\underset{R_1}{\underset{|}{N}}—$$

containing aliphatic, araliphatic or heterocyclic bridging group, or is $—N{=}N—KK_2—$ in which $KK_2$ is

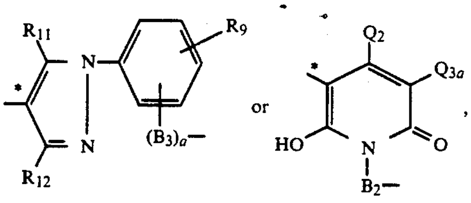

$R_9$, $R_{11}$, $R_{12}$, $Q_2$, $—B_2—$, $—B_3—$ and a are as defined above, each marked carbon atom indicates the coupling position, $Q_{3a}$ is hydrogen; —CN; $—SO_3H$; $—COR_{13}$; $C_{1-4}$alkyl; $C_{1-4}$alkyl monosubstituted by hydroxy, halogen, —CN, $C_{1-4}$alkoxy,

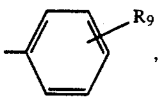

$—SO_3H$, $—OSO_3H$ or $—NH_2$;

$—SO_2NH_2$; 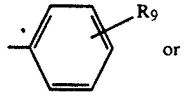 or

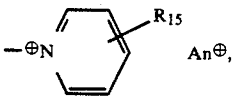

in which $R_9$, $R_{13}$, $R_{15}$ and $An^{\ominus}$ are as defined above, and mixtures of compounds (7).

Preferably, $X_4$ is $—N{=}N—KK_2—$ in which a is 0 and $B_2$ is $B_{2a}$ as defined below.

The fibre-reactive group Z is preferably $Z_a$ corresponding to the formula

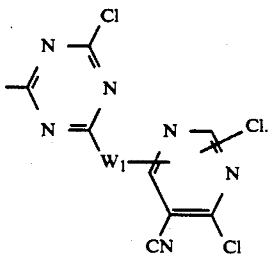

($Z_a$)

More preferably Z is $Z_b$, where $Z_b$ is a group $Z_a$ in which $W_1$ is $W_2$. Most preferably it is $Z_c$, where $Z_c$ is a group $Z_a$ in which $W_1$ is $W_3$.

Preferred compounds (1) are those corresponding to the formulae (1a) to (1d):

Compounds of formula (1a)

$$\left[DK_1-N=N-KK_1\right]-Z_a \qquad (1a)$$

in which $Z_a$ is as defined above and is attached to $DK_1$ or $KK_1$, $DK_1$ is one of the groups ($a_1$) to ($f_1$) and ($h_1$) in which the marked bond is attached to the azo group and each $-NR_{1b}-$ radical is attached to $Z_a$:

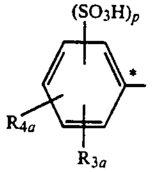

($a_1$)

in which p is 0, 1 or 2, and each $R_{3a}$ and $R_{4a}$, independently, is hydrogen, chlorine, methyl, methoxy, ethoxy or —COOH;

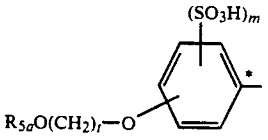

in which m is 0 or 1, t is 2 or 3, and $R_{5a}$ is hydrogen, methyl, ehtyl, $-SO_3H$ or 2-hydroxyethyl;

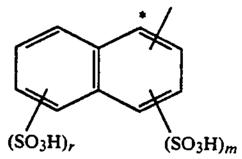

($c_1$)

in which m is 0 or 1, r is 1 or 2, and m+r are 2 or 3;

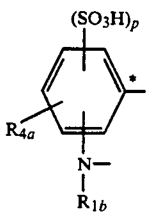

($d_1$)

in which $R_{1b}$, $R_{4a}$ and p are as defined above;

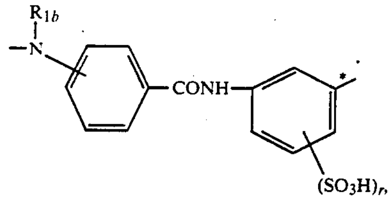

($e_1$)

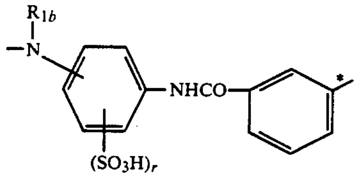

($f_1$)

in which $R_{1b}$ and r are as defined above;

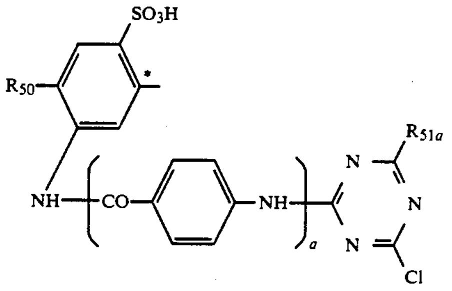

($h_1$)

in which $R_{51a}$ is

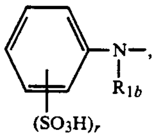

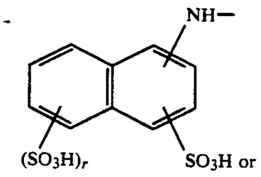

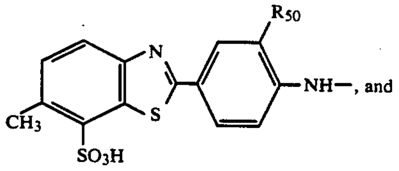

$R_{50}$, $R_{1b}$, a and r are as defined above; and $KK_1$ is one of the groups ($K_{2a}$), ($K_{4a}$) and ($K_{5a}$) as defined below or ($K_3$) as defined above:

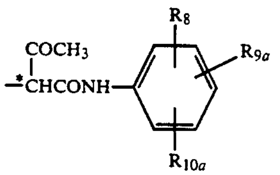

($K_{2a}$)

in which $R_{8a}$ is hydrogen, chlorine, methyl or methoxy.

$R_{9a}$ is hydrogen, chlorine, methyl, methoxy, $-SO_3H$ or $-COOH$, and $R_{10a}$ is hydrogen, $-SO_3H$ or (K4a)

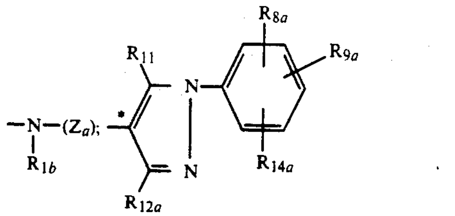

in which $R_{11}$, $R_{8a}$ and $R_{9a}$ are as defined above, $R_{12a}$ is methyl, $-COOH$ or $-CONH_2$, and $R_{14a}$ is hydrogen, chlorine, methyl, ethyl, $-SO_3H$ or (K5a)

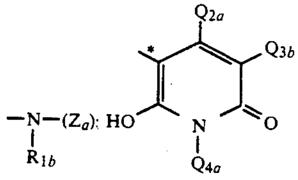

in which $Q_{2a}$ is hydrogen, methyl, ethyl, phenyl, $-COR_{13}$, $-CH_2SO_3H$ or $-CH_2OSO_3H$, $Q_{3b}$ is hydrogen, $-CN$, $-SO_3H$, $-COR_{13}$, methyl, ethyl, $-CH_2SO_3H$ or $-CH_2NH_2$, $Q_{4a}$ is hydrogen, $-B_{2a}$

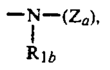

methyl, ethyl, cyclohexyl, phenyl or phenyl($C_{1-2}$alkyl), in which latter two groups the phenyl ring is unsubstituted or substituted by 1 or 2 substituents selected from chlorine, methyl, methoxy, $-SO_3H$, $-COOH$, $-NH_2$ and

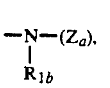

or $-C_{1-4}$alkylene$-Y_2$, $B_{2a}$ is $-C_{2-4}$alkylene-, monohydroxy-substituted $-C_{3-4}$alkylene-,

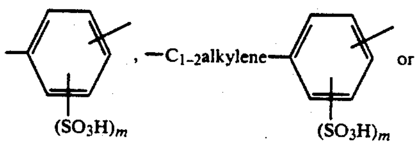

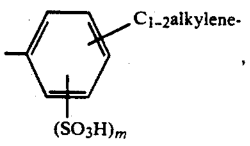

or $B_{2a}$ together with

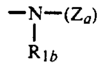

to·which it is attached, is

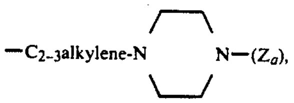

$Y_2$ is $-COOH$, $-SO_3H$, $-OSO_3H$, $-OH$, $-CN$, methoxy or $-NR_{27}R_{28}$, each $R_{27}$ and $R_{28}$, independently, is hydrogen; unsubstituted $C_{1-4}$alkyl; $C_{1-4}$alkyl monosubstituted by hydroxy, $C_{1-4}$alkoxy, $-COOH$, $-SO_3H$, $-NH(C_{1-4}alkyl)$ or $-N(C_{1-4}alkyl)_2$; unsubstituted cyclohexyl; cyclohexyl substituted by 1 to 3 methyl groups; phenyl or phenyl($C_{1-4}$alkyl) in which each phenyl ring is unsubstituted or substituted by 1 or 2 substituents selected from halogen, preferably chlorine, $C_{1-4}$alkyl, $C_{1-4}$alkoxy, $-SO_3H$ and $-COOH$, or $-NR_{27}R_{28}$ is a piperidine, morpholine or piperazine ring where each of these rings is unsubstituted or contains 1 to 3 methyl groups;

compounds of formula (1b),

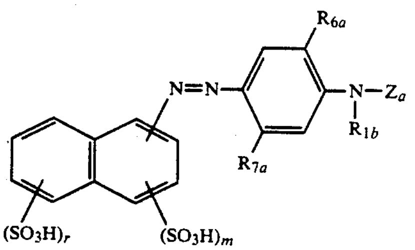

(1b)

in which m+r are 2 or 3, $R_{6a}$ is hydrogen, methyl or methoxy, and $R_{7a}$ is hydrogen, chlorine, methyl, methoxy, $-NHCOCH_3$ or $-NHCONH_2$;

compounds of formula (1c),

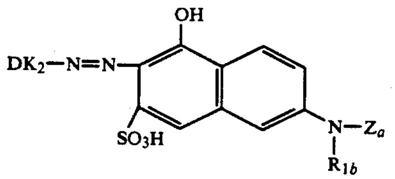

(1c)

in which $DK_2$ is a group of formula ($a_1$), ($b_1$) or ($c_1$) as defined above;

compounds of formula (1d),

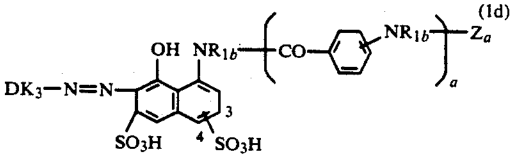

(1d)

in which the sulpho group is in the 3- or 4-position of the naphthyl ring, and $DK_3$ is a group of formula ($a_2$) or ($c_2$)

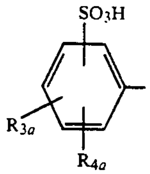

($a_2$)

in which $R_{3a}$ and $R_{4a}$ are as defined above,

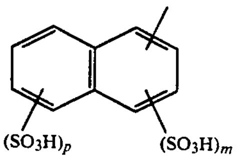

($c_2$)

in which m+p are 1 or 2.

Preferred compounds (2) correspond to formula (2a),

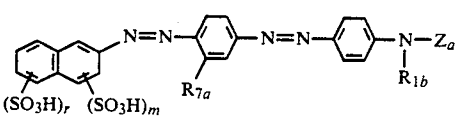

(2a)

in which $R_{7a}$ is as defined above and m+r are 2 or 3.

Preferred compounds (3) are 1:1 copper complexes of the metal-free compounds ($3a_1$) or ($3b_1$),

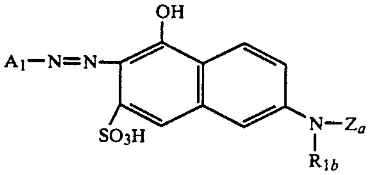

($3a_1$)

in which $A_1$ is

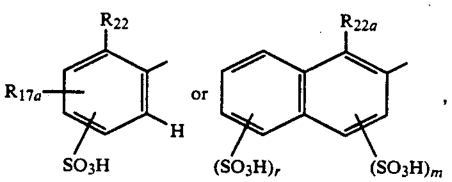

$R_{17a}$ is hydrogen, chlorine, bromine, nitro, methyl, methoxy, —$SO_3H$ or —COOH, $R_{22a}$ is —OH or —$OCH_3$, and m+r are 2 or 3;

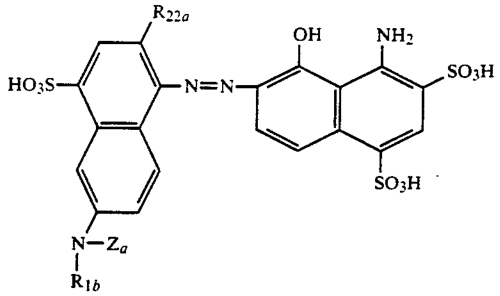

($3b_1$)

in which $R_{22a}$ is as defined above.

Furthermore, preferred compounds (3) are 1:1 copper complexes corresponding to the following formulae ($3c_1$), ($3d_1$) and ($3e_1$),

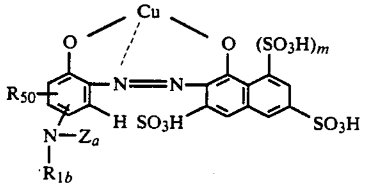

($3c_1$)

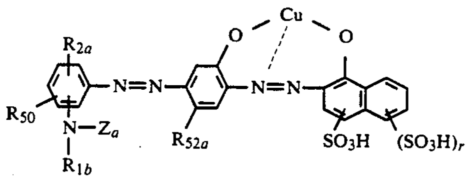

($3d_1$)

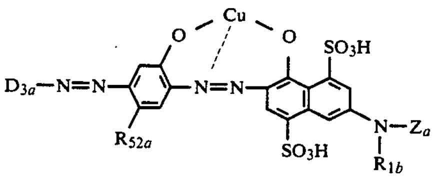

($3e_1$)

in which $R_{50}$ and $R_{2a}$ are as defined above, $R_{52a}$ is hydrogen, methyl or methoxy, and $D_{3a}$ is

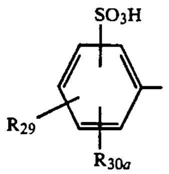

in which $R_{30a}$ is hydrogen, methyl or methoxy.

Preferred compounds (4) are those of formula (4a),

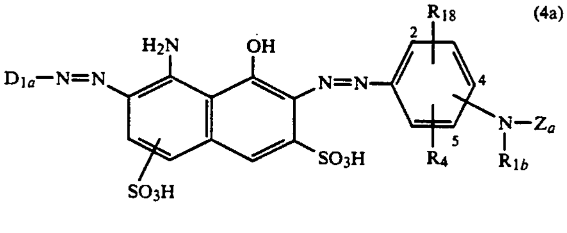

(4a)

in which $D_{1a}$, $R_4$ and $R_{18}$ are as defined above; more preferred are compounds of formula (4a) in which $R_4$ is hydrogen, and $R_{18}$ is in the 2-position and $$-\underset{R_{1b}}{\underset{|}{N}}-Z_a$$

is in the 4- or 5-position of the phenyl group.

Preferred compounds (5) are those in which each $R_{20}$ and $R_{21}$ is $R_{20a}$ and $R_{21a}$, where each $R_{20a}$ and $R_{21a}$, independently, is hydrogen, chlorine, methyl, methoxy, —COOH or —$NHCOCH_3$.

Preferred compounds (6) are those in which
Q is —O—,
each $X_3$, independently, is $$-\underset{R_{1b}}{\underset{|}{N}}- \text{ or } -{}^*SO_2\underset{R_{1b}}{\underset{|}{N}}-,$$

each $R_1$, independently, is $R_{1b}$,
each $Alk_2$, independently, is —$C_{2-3}$alkylene-, and
each Z, independently, is $Z_a$.

More preferred compounds (6) are those in which both groups containing $Z_a$ are identical.

Preferred compounds (7) are those in which
Me is copper or nickel, and
each $R_{24}$ and $R_{25}$ is hydrogen.

More preferred compounds (7) are those in which
Me is copper or nickel,
c is 2 or 3, and d is O,
each $R_1$, independently, is $R_{1b}$,
Z is $Z_a'$
$R_{26}$ is hydrogen, —COOH or —$SO_3H$, and
either
a is a 0, or
a is 1 and $X_4$ is —N=N—$KK_2$—, where $KK_2$ is

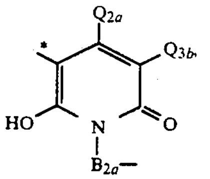

in which $Q_{2a}$, $Q_{3b}$ and —$B_{2a}$— are as defined above.

Furthermore, it is particularly preferred that in all above mentioned preferred metal-free compounds and metal complexes
(1) $Z_a$ is $Z_b$;
(2) $Z_a$ is $Z_c$;
(3) $Z_a$ is $Z_c$, and $R_{1b}$ is hydrogen.

When a compound of formula I is in salt form, the cation associated with the sulpho groups and any carboxy group is not critical and may be any one of those non-chromophoric cations conventional in the field of fibre-reactive dyes provided that the corresponding salts are water-soluble. Examples of such cations are alkali metal cations and unsubstituted and substituted ammonium cations, e.g., lithium, sodium, potassium, ammonium, mono-, di-, tri-and tetra-methylammonium, triethylammonium and mono-, di- and tri-ethanolammonium.

The preferred cations are the alkali metal cations and ammonium, with sodium being the most preferred.

In a compound of formula I the cations of the sulpho and any carboxy groups can be the same or different, e.g., they can also be a mixture of the above-mentioned cations meaning that the compound of formula I can be in a mixed salt form.

The present invention further provides a process for the preparation of compounds of formula I and mixtures thereof comprising reacting a compound of formula II

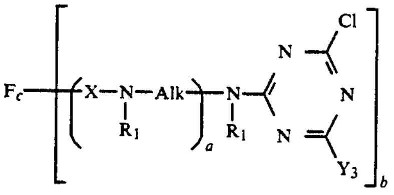

II in which
$Y_3$ is —W—H or chlorine, and $F_c$, X, $R_1$, Alk, a, b and W are as defined above,
or a mixture of compounds of formula II,
if $Y_3$ is —W—H, with 5-cyano-2,4,6-trichloropyrimidine, or,
if $Y_3$ is chlorine, with a compound of formula III

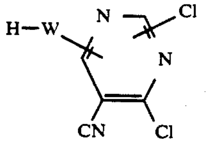

III in which W is as defined above, using a 1:1 molar ratio for the compounds of formulae II and III.

Preferably, in a compound of formula II $Y_3$ is —W—H. The condensation reaction of a compound of formula II in which $Y_3$ is —W—H, with 5-cyano-2,4,6-trichloropyrimidine is suitably carried out at 0° to 40° C. and at pH 7 to 9. Normally, water is used as the reaction medium; however, 5-cyano-2,4,6-trichloropyrimidine may also be used when dissolved in an organic solvent, for example in acetone.

Furthermore, disazo compounds of formula (4) may also be obtained by diazotizing a compound of formula IV $$H_2N-D_2+(CH_2)_n-NR_1-Z]_m \qquad \text{IV}$$

in which $D_2$, $R_1$, Z, m and n are as defined above, and alkaline coupling with a compound of formula V

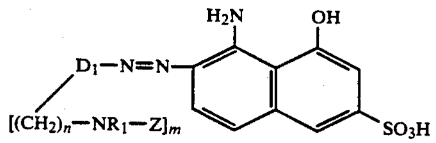

V in which $D_1$, $R_1$, Z, m and n are as defined above.

The compounds of formula I may be isolated in accordance with known methods, for example, by conventional salting out with alkali metal salt, filtering and drying optionally in vacuo and at slightly elevated temperatures.

Depending on the reaction and isolation conditions a compound of formula I is obtained in free acid or preferably salt form or even mixed salt form containing, for example, one or more of the above-mentioned cations. It may be converted from free acid form to a salt form or mixture of salt forms or vice versa or from one salt form to another by conventional means.

The starting compounds of formulae II, III, IV and V are either known or may be prepared in accordance with known methods using known starting materials.

The compounds of formula I and mixtures thereof are useful as fibre-reactive dyestuffs for dyeing or printing hydroxy group- or nitrogen- containing organic substrates. Preferred substrates are leather and fibre material containing or consisting of natural or synthetic polyamides and, particularly, of natural or regenerated cellulose such as cotton, viscose and spun rayon. The most preferred substrate is textile material containing or consisting of cotton.

Dyeing or printing is effected in accordance with known methods conventional in the fibre-reactive dyestuff field. Preferably, for the compounds of formula I the exhaust dyeing method is used at temperatures within the range of 30° to 80° C.

The compounds of this invention are well compatible with other fibre-reactive dyes; they may be applied per se or in combination with appropriate fibre-reactive dyestuffs of the same class having analogous dyeing properties, e.g., concerning common fastness properties, extent of ability to exhaust from the dyebath onto the fibre, etc. The dyeings obtained with such combination mixtures have good fastness properties and are comparable to those obtained with a single dye-stuff.

In view of their notable build-up power the compounds of formula I give good exhaust and fixation yields. The portion of unfixed dyestuff can be easily washed off the substrate. The dyeings and prints obtained show good dry and wet light fastness and also good wet fastness properties such as wash, water, sea water and sweat fastness. They are resistant to oxidative influences, e.g., chlorinated water, hypochlorite bleach and peroxide-containing and perborate-containing wash liquors.

The following examples further serve to illustrate the invention. In the examples all parts and percentages are by weight or volume. The temperatures are in degrees Centigrade.

EXAMPLE 1

To 18.3 parts (0.025 mole) of the compound of formula B

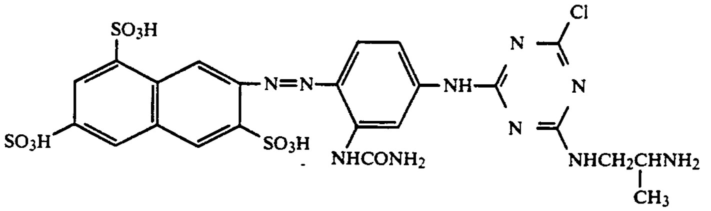

(B)

in 500 parts of water a solution of 6.1 parts (20% excess) of 5-cyano-2,4,6-trichloropyrimidine in acetone is added all at once at 25°. The pH of the reaction mixture which decreases spontaneously is held at 7 to 7.5 by continuously adding a 20% sodium carbonate solution. Simultaneously, the mixture is heated to reach a final temperature of 35°. After 3 to 4 hours, the condensation reaction is terminated what is proved by thin layer chromatography.

For isolating the reaction product, the resulting orange-red dull solution is heated to 40° and stirred with filtering earth for about 10 minutes. It is then filtered clear, and sodium chloride (about 10% by volume) is added to the filtrate whilst stirring. The fine precipitate is filtered and dried at about 50° in vacuo. The dyestuff of the formula

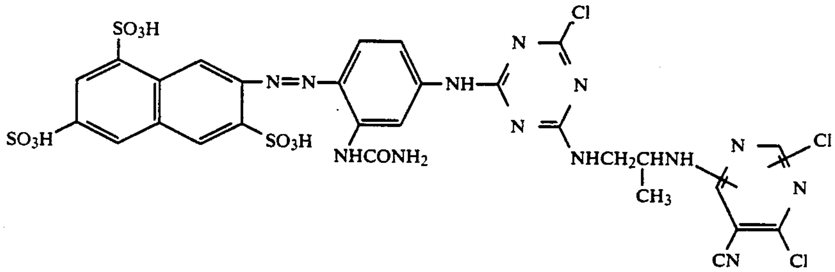

thus obtained dyes cotton an orange shade. The dyeings and prints on cotton obtained in accordance with conventional methods show good wet fastness properties and notably good light fastness; furthermore, they are resistant to oxidative influences.

Preparation of the starting compound B a) 9.6 Parts of 2-aminonaphthalene-3,6,8-trisulphonic acid are dissolved in 60 parts of water at pH 12 by the addition of 4.3 parts of a 30% sodium hydroxide solution. To this solution, 11 parts of 30% hydrochloric acid are added dropwise and a suspension is obtained which is well stirred. Diazotisation is effected at 0°-5° after the addition of 25 parts of ice by adding 6.5 parts of a 4N sodium nitrite solution. This diazonium salt solution is added to a suspension consisting of 3.9 parts of 3-aminophenylurea in 25 parts of ice water at 3°-7° within 30 minutes. During the addition, the pH is kept at 5.0 by adding 22 parts of a 20% sodium carbonate solution. A red solution is formed containing the aminoazo compound of formula A.

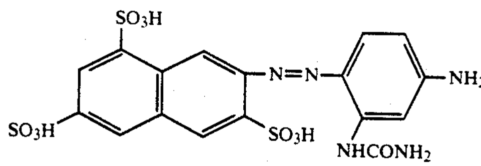

(A)

b) 5.1 Parts of cyanuric chloride are stirred into 30 parts of ice water during 30 minutes. Subsequently, the dye solution obtained in step a) is added within 5 minutes, and condensation is effected at pH 6.0 in the presence of 8 parts of a 20% sodium carbonate solution. To the red-orange solution thus obtained, a solution is added containing 3.3 parts of 1,2-diaminopropane in 50 parts of ice water, the pH of which has been adjusted to 6.0 by adding 8 parts of 30% hydrochloric acid. Within one hour the temperature of the reaction mixture is slowly elevated to 48°-50°. Simultaneously, the pH of the mixture is kept at 6.0 by the addition of 20 parts of a 20% sodium carbonate solution. Before separating the orange dyestuff thus formed, its precipitation is completed by adding 100 parts of sodium chloride. Thus, the compound of formula B is obtained.

EXAMPLES 2 TO 200

By analogy with the method described in Example 1, using appropriate starting compounds to form the desired chromophoric part $F_c$, further metal-free compounds of formula I may be prepared which are listed in the following Tables 1 to 11. At the top of each of these Tables the corresponding formula is given in which the symbols are as defined in the Table.

The compounds of Examples 2 to 200 may be applied to substrates containing or consisting of cellulose fibres, and particularly to textile material consisting of cotton, according to the conventional exhaust dyeing method or printing processes, where dyeings and prints of the indicated shade are obtained. The dyeings and prints on cotton show good light and wet fastness properties and are resistant to oxidative influences.

The divalent group as defined in column - W - of Table 1 and also of every subsequent Tables may be an asymmetrical diamino group. Normally, the connection with a carbon atom of the triazine ring on the one side, and with a carbon atom of the pyrimidine ring on the other side, is effected in the given order. However, depending on the preparation of the starting compound, this connecting order may be reversed, i.e. pyrimidine/-triazine ring, when the condensation product of the pyrimidine compound with the diamine is used as starting compound.

TABLE 1

Compounds of formula (T1)

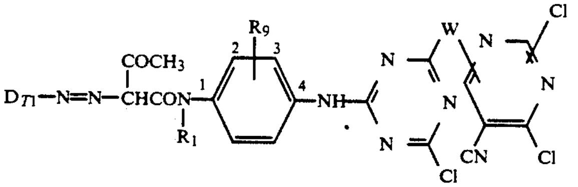

(T1)

| Ex. No. | $D_{T1}$ | $R_1$ | $R_9$ (position) | —W— |
|---|---|---|---|---|
| 2 | 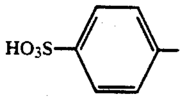 | H | $-SO_3H(3)$ | $-NHCH_2CH(CH_3)NH-$ |
| 3 | " | H | " | $-NHCH_2CH(OH)CH_2NH-$ |
| 4 | 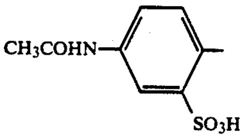 | $CH_3$ | $-SO_3H(3)$ | $-NH(CH_2)_3N(CH_3)-$ |
| 5 | 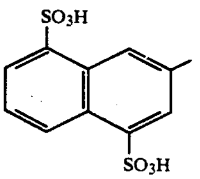 | H | H | $-NHCH_2CH_2NH-$ |

TABLE 1-continued
Compounds of formula (T1)
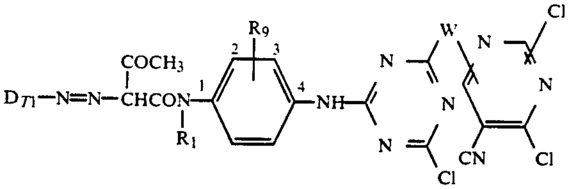
(T1)
| Ex. No. | $D_{T1}$ | $R_1$ | $R_9$ (position) | —W— |
|---|---|---|---|---|
| 6 | 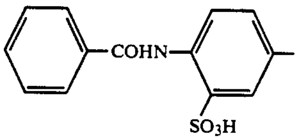 | H | $-SO_3H(2)$ | $-NHCH_2CH(OH)CH_2NH-$ |
| 7 | 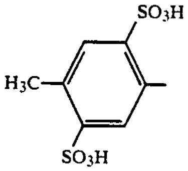 | H | " | " |
| 8 | " | H | " | $-NHCH_2CH(CH_3)NH-$ |
| 9 | 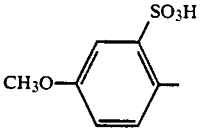 | H | $-SO_3H(3)$ | " |
| 10 | " | H | " | $-NH(CH_2)_3N(CH_3)-$ |
| 11 | 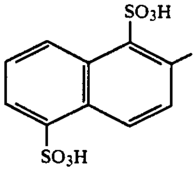 | H | H | $-NHCH_2CH(CH_3)NH-$ |
| 12 | " | H | $SO_3H(3)$ | $-NHCH_2CH(OH)CH_2NH-$ |
| 13 | " | H | $SO_3H(2)$ | $-NH(CH_2)_3N(CH_3)-$ |
| 14 | 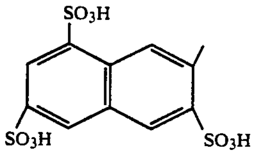 | H | H | $-NH(CH_2)_3N(CH_3)-$ |
| 15 | " | H | H | $-NHCH_2CH_2NH-$ |
| 16 | " | H | $SO_3H(3)$ | $-NHCH_2CH(CH_3)NH-$ |

TABLE 1-continued

Compounds of formula (T1)

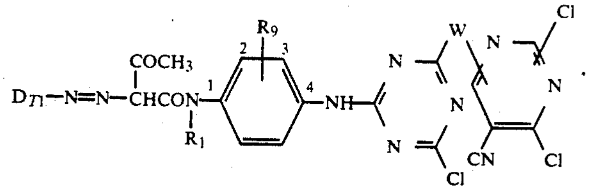

(T1)

| Ex. No. | $D_{T1}$ | $R_1$ | $R_9$ (position) | —W— |
|---|---|---|---|---|
| 17 | 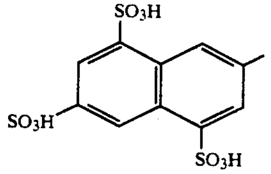 | H | H | " |
| 18 | " | $CH_3$ | H | " |
| 19 | " | H | $SO_3H(2)$ | " |

The dyeings and prints on cotton obtained with the dyestuffs of Examples 2 to 19 have a greenish-yellow shade.

The dyeings and prints on cotton obtained with the dyestuffs of Examples 20 to 25 are of a greenish-yellow shade.

TABLE 2

Compounds of formula (T2)

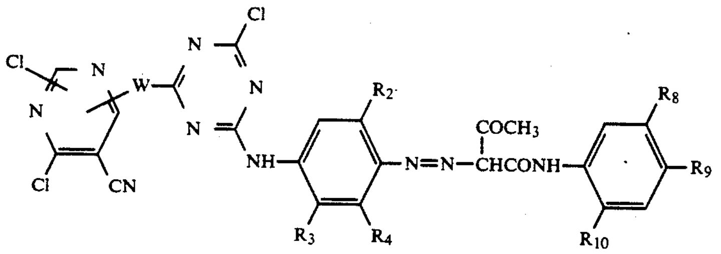

(T2)

| Ex. No. | $R_2$ | $R_3$ | $R_4$ | $R_8$ | $R_9$ | $R_{10}$ | —W— |
|---|---|---|---|---|---|---|---|
| 20 | H | H | $-SO_3H$ | H | H | H | $-NHCH_2CH_2NH-$ |
| 21 | H | H | " | $CH_3$ | $-SO_3H$ | $CH_3$ | $-NHCH_2CH(CH_3)NH-$ |
| 22 | $CH_3$ | $OCH_3$ | H | " | " | $OCH_3$ | " |
| 23 | " | $CH_3$ | H | " | " | " | " |
| 24 | H | H | $-SO_3H$ | " | " | " | $-NHCH_2CH(OH)CH_2NH-$ |
| 25 | $CH_3$ | $OCH_3$ | H | $-SO_3H$ | H | $-SO_3H$ | $-NH(CH_2)_3N(CH_3)-$ |

TABLE 3

Compounds of formula (T3)

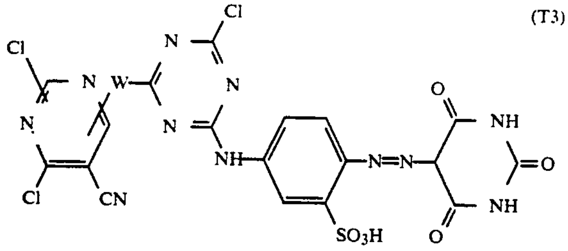

(T3)

| Ex. No. | —W— |
|---|---|
| 26 | $-NHCH_2CH(OH)CH_2NH-$ |
| 27 | $-NHCH_2CH(OH)CH_2NH-$ |
| 28 | $-NHCH_2CH_2NH-$ |
| 29 | $-NH(CH_2)_3N(CH_3)-$ |

With the dyestuffs of Examples 26 to 29 greenish-yellow dyeings and prints on cotton are obtained.

TABLE 4

Compounds of formula (T4)

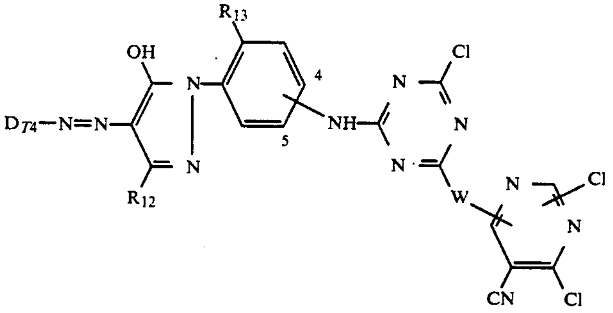

(T4)

In the last column I the shade of each cotton dyeing is given whereby a is greenish-yellow and b is yellow.

| Ex. No. | $D_{T4}$ | $R_{12}$ | $R_{13}$ | position —NH— | —W— | I |
|---|---|---|---|---|---|---|
| 30 | 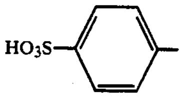 | $CH_3$ | H | 5 | $-NHCH_2CH(CH_3)NH-$ | b |
| 31 | " | " | H | 5 | $-NHCH_2CH(OH)CH_2NH-$ | b |
| 32 | 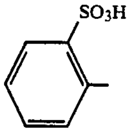 | " | H | 4 | " | b |
| 33 | " | " | H | 4 | $-NHCH_2CH_2NH-$ | b |
| 34 | " | " | H | 5 | $-NHCH_2CH(CH_3)NH-$ | b |

TABLE 4-continued

| | | | | | | |
|---|---|---|---|---|---|---|
| 35 | 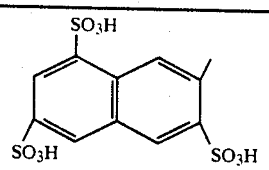 | " | H | 4 | " | b |
| 36 | 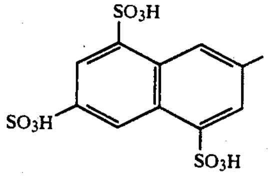 | " | H | 5 | " | b |
| 37 | 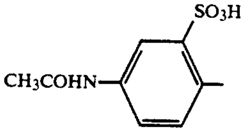 | —COOH | —SO3H | 5 | —NHCH2CHCH2NH— (OH on CH) | a |
| 38 | 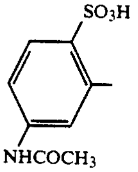 | " | " | 4 | —NHCH2CHNH— (CH3 on CH) | a |
| 39 | 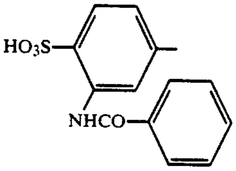 | " | " | 5 | " | a |
| 40 | 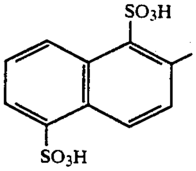 | " | " | 4 | " | b |
| 41 | " | " | " | 4 | —NHCH2CH2NH— | b |

TABLE 5

Compounds of formula (T5)

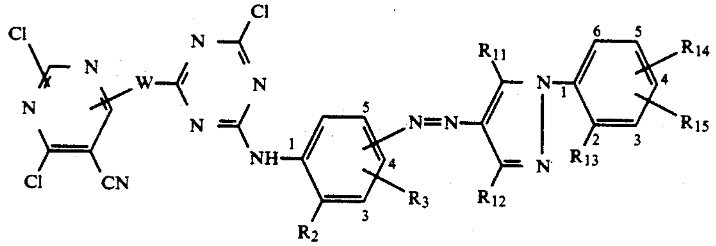

(T5)

In the last column I the shade of each cotton dyeing is given whereby
a is greenish-yellow
and b is yellow.

| Ex. No. | —W— | position —N=N— | $R_2$ | $R_3$ | $R_{11}$ | $R_{12}$ | $R_{13}$ | $R_{14}$ | $R_{15}$ | I |
|---|---|---|---|---|---|---|---|---|---|---|
| 42 | —NHCH2CH2NH— | 4 | H | 5-SO3H | OH | CH3 | H | 4-SO3H | H | b |
| 43 | " | 4 | H | " | OH | " | Cl | " | 5-Cl | b |
| 44 | " | 5 | H | 4-SO3H | OH | COOH | CH3 | " | H | a |
| 45 | " | 5 | SO3H | " | OH | CH3 | Cl | 5-SO3H | H | a |
| 46 | " | 4 | H | 5-SO3H | NH2 | " | H | 3-SO3H | H | b |

TABLE 5-continued

Compounds of formula (T5)

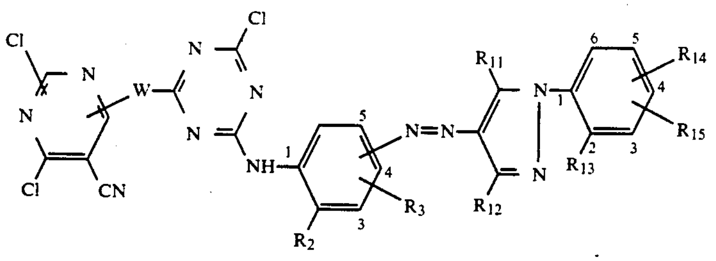

(T5)

In the last column I the shade of each cotton dyeing is given whereby a is greenish-yellow and b is yellow.

| Ex. No. | —W— | position —N=N— | $R_2$ | $R_3$ | $R_{11}$ | $R_{12}$ | $R_{13}$ | $R_{14}$ | $R_{15}$ | I |
|---|---|---|---|---|---|---|---|---|---|---|
| 47 | —NHCH₂CHCH₂NH— with OH on CH ($—NHCH_2CH(OH)CH_2NH—$) | 5 | H | 4-$SO_3H$ | " | " | H | 4-$SO_3H$ | H | a |
| 48 | " | 5 | H | " | OH | " | Cl | " | H | a |
| 49 | $—NHCH_2CH(OH)CH_2NH—$ | 4 | H | 5-$SO_3H$ | OH | $CH_3$ | $SO_3H$ | 5-$SO_3H$ | H | b |
| 50 | " | 4 | H | " | OH | COOH | H | 4-$SO_3H$ | H | b |
| 51 | " | 5 | $SO_3H$ | 4-$SO_3H$ | OH | $CH_3$ | $SO_3H$ | " | H | a |
| 52 | $—NHCH_2CH(CH_3)NH—$ | 4 | H | 5-$SO_3H$ | $NH_2$ | " | H | 3-$SO_3H$ | H | b |
| 53 | " | 4 | H | H | " | " | $SO_3H$ | 5-$SO_3H$ | H | b |
| 54 | " | 4 | H | 5-$SO_3H$ | OH | " | Cl | " | H | b |
| 55 | " | 5 | H | 4-$SO_3H$ | OH | COOH | $CH_3$ | 4-$SO_3H$ | H | a |
| 56 | " | 5 | $SO_3H$ | " | OH | " | H | " | H | a |
| 57 | " | 5 | H | " | OH | $CH_3$ | Cl | " | H | a |
| 58 | $—NH(CH_2)_3N(CH_3)—$ | 4 | H | 5-$SO_3H$ | OH | COOH | $CH_3$ | " | H | b |
| 59 | " | 5 | H | 4-$SO_3H$ | OH | $CH_3$ | Cl | 5-$SO_3H$ | H | a |
| 60 | —N(piperazine)NCH₂CH₂NH— ($—N\langle piperazine \rangle NCH_2CH_2NH—$) | 4 | H | 5-$SO_3H$ | OH | " | $SO_3H$ | " | H | b |
| 61 | $—NH(CH_2)_4CH(COOH)NH—$ | 5 | H | 4-$SO_3H$ | OH | " | " | " | H | a |

TABLE 6

Compounds of formula (T6)

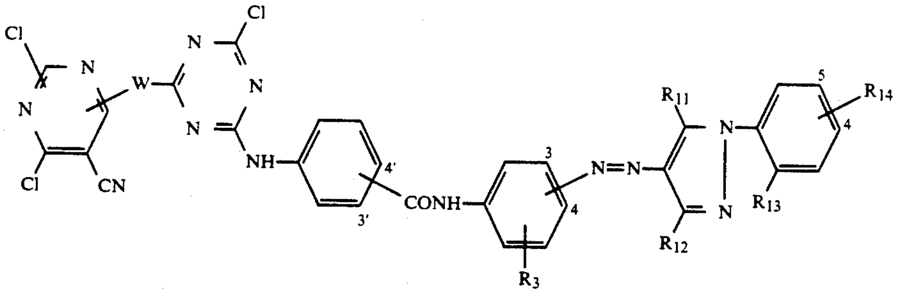

(T6)

In the last column I the shade of each cotton dyeing is given whereby a is greenish-yellow and b is yellow.

| Ex. No. | —W— | position —CONH— | position —N=N— | $R_3$ | $R_{11}$ | $R_{12}$ | $R_{13}$ | $R_{14}$ | I |
|---|---|---|---|---|---|---|---|---|---|
| 62 | $-NHCH_2CH_2NH-$ | 3' | 3 | 4-$SO_3H$ | OH | $CH_3$ | $-SO_3H$ | 4-$SO_3H$ | a |
| 63 | " | 4' | 4 | 3-$SO_3H$ | OH | " | " | 5-$SO_3H$ | b |
| 64 | " | 3' | 4 | " | $NH_2$ | " | H | 4-$SO_3H$ | a |
| 65 | $-NHCH_2CH(OH)CH_2NH-$ | 3' | 4 | " | OH | " | $-SO_3H$ | 5-$SO_3H$ | b |
| 66 | " | 4' | 3 | 4-$SO_3H$ | OH | COOH | $CH_3$ | 4-$SO_3H$ | a |
| 67 | " | 4' | 3 | " | OH | " | H | " | a |
| 68 | $-NHCH_2CH(CH_3)NH-$ | 3' | 4 | 3-$SO_3H$ | OH | $CH_3$ | Cl | " | b |
| 69 | " | 3' | 3 | 4-$SO_3H$ | $NH_2$ | " | Cl | 5-$SO_3H$ | a |
| 70 | " | 4' | 4 | 3-$SO_3H$ | OH | " | $-SO_3H$ | 4-$SO_3H$ | b |
| 71 | " | 4' | 4 | " | OH | COOH | $CH_3$ | " | b |

TABLE 7

Compounds of formula (T7)

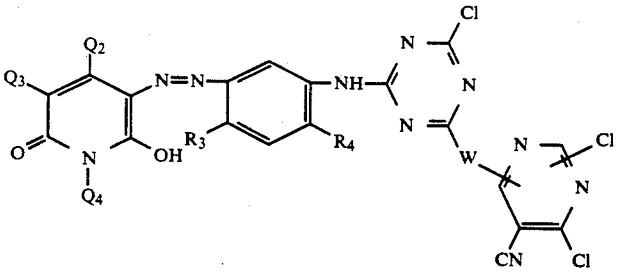

(T7)

| Ex. No. | $R_3$ | $R_4$ | $Q_2$ | $Q_3$ | $Q_4$ | —W— |
|---|---|---|---|---|---|---|
| 72 | $-SO_3H$ | H | $CH_3$ | $-SO_3H$ | $CH_3$ | $-NHCH_2CH(OH)CH_2NH-$ |
| 73 | " | H | " | " | " | $-NHCH_2CH(CH_3)NH-$ |
| 74 | " | $-SO_3H$ | " | $-CONH_2$ | " | " |
| 75 | " | " | " | " | $-CH_2CH_3$ | " |
| 76 | " | H | " | $-CH_2SO_3H$ | " | $-NHCH_2CH_2NH-$ |
| 77 | " | $-SO_3H$ | " | H | " | $-NHCH_2CH(CH_3)NH-$ |
| 78 | " | " | $-COOH$ | H | H | " |

TABLE 7-continued
Compounds of formula (T7)
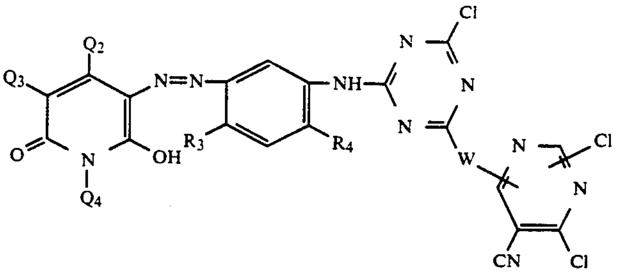
(T7)
| Ex. No. | $R_3$ | $R_4$ | $Q_2$ | $Q_3$ | $Q_4$ | —W— |
|---|---|---|---|---|---|---|
| 79 | " | H | " | H | H | $-NHCH_2CH(OH)CH_2NH-$ |
| 80 | H | H | $-CH_2SO_3H$ | H | $CH_3$ | " |
| 81 | $-SO_3H$ | H | " | $-CONH_2$ | " | 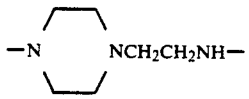 |
| 82 | " | H | $CH_3$ | H | $-CH_2CH_2SO_3H$ | 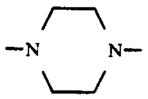 |
| 83 | " | $-SO_3H$ | " | H | $-(CH_2)_3NHCH_3$ | 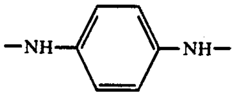 |
| 84 | " | " | " | $-CONH_2$ | $-CH_2CH_3$ | $-NH(CH_2)_4CH(COOH)NH-$ |
| 85 | $-SO_3H$ | $-SO_3H$ | $CH_3$ | $-CONH_2$ | $-CH_2CH_3$ | 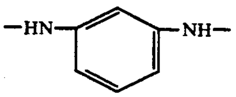 |
| 86 | " | H | " | $-CH_2SO_3H$ | H | 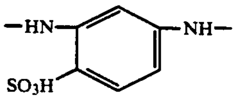 |
The dyeings and prints on cotton obtained with each dyestuff of Examples 72 to 86 have a greenish-yellow shade.

TABLE 8

Compounds of formula (T8)

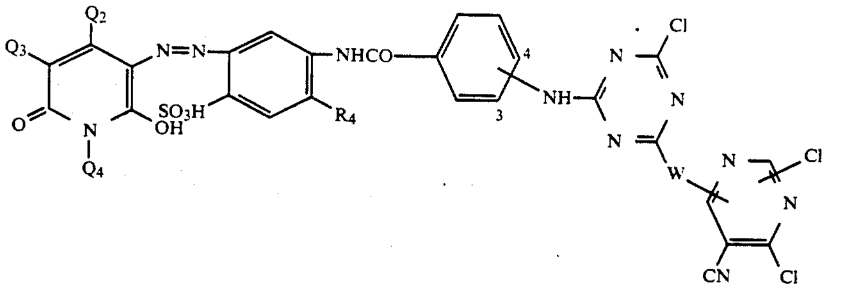

(T8)

| Ex. No. | $R_4$ | $Q_2$ | $Q_3$ | $Q_4$ | position —NH— | —W— |
|---|---|---|---|---|---|---|
| 87 | H | $CH_3$ | $-CH_2SO_3H$ | H | 3 | $-NHCH_2CH(OH)CH_2NH-$ |
| 88 | H | " | " | $CH_3$ | 4 | " |
| 89 | H | " | " | $-CH_2CH_3$ | 3 | " |
| 90 | H | —COOH | H | H | 3 | " |
| 91 | H | $CH_3$ | $-SO_3H$ | H | 3 | " |
| 92 | $-SO_3H$ | " | $-CH_2SO_3H$ | H | 4 | $-NHCH_2CH(CH_3)NH-$ |
| 93 | " | " | $-CONH_2$ | $-CH_2CH_3$ | 4 | " |
| 94 | H | " | $-CH_2SO_3H$ | " | 3 | " |
| 95 | H | $-CH_2SO_3H$ | $-CONH_2$ | $CH_3$ | 3 | $-NHCH_2CH(CH_3)NH-$ |
| 96 | $-SO_3H$ | $CH_3$ | H | $-CH_2CH_2SO_3H$ | 4 | " |
| 97 | H | $-CH_2SO_3H$ | $-CH_2SO_3H$ | $CH_3$ | 3 | 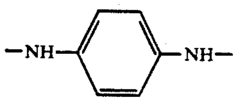 |
| 98 | $-SO_3H$ | $CH_3$ | $-CONH_2$ | $-CH_2CH_2SO_3H$ | 4 | 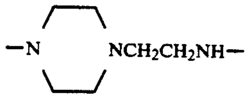 |
| 99 | H | $CH_3$ | H | $-CH_2CH_3$ | 4 | 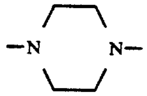 |

The dyeings and prints on cotton obtained with each dyestuff of Examples 87 to 99 have a greenish-yellow shade.

TABLE 9

Compounds of formula (T9)

TABLE 9-continued (T9)

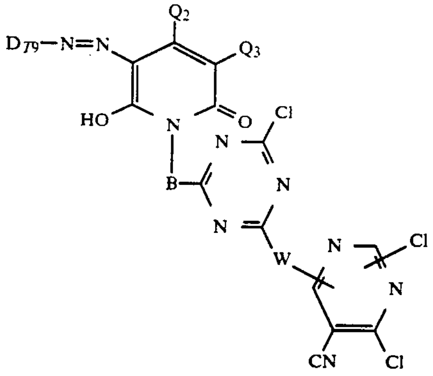

In the last column I the shade of each cotton dyeing is given whereby
a is greenish yellow
and b is yellow.
Any marked carbon atom in a divalent group defined in column —B— is bound to the nitrogen atom of the pyridone.

In Table 9 $D_{79}$ may be a group

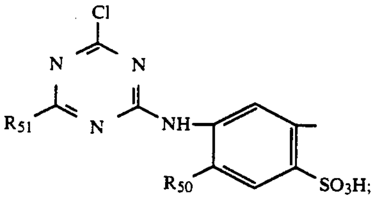

depending on the definition of $R_{50}$ and $R_{51}$, the corresponding groups are signified by $DD_1$ to $DD_{12}$. In the following the significance of each group $DD_1$ to $DD_{12}$ is given.

$DD_1$ in which $R_{51}$ is

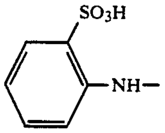

and $R_{50}$ is H $DD_2$ in which $R_{51}$ is " and $R_{50}$ is $-SO_3H$ $DD_3$ in which $R_{51}$ is

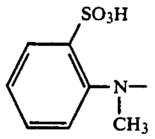

and $R_{50}$ is H $DD_4$ in which $R_{51}$ is

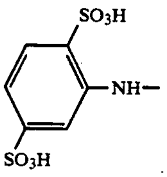

and $R_{50}$ is H $DD_5$ in which $R_{51}$ is

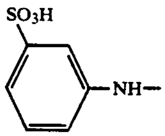

and $R_{50}$ is $-SO_3H$ $DD_6$ in which $R_{51}$ is

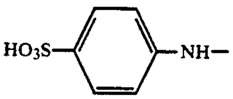

and $R_{50}$ is H

TABLE 9-continued

| | | | |
|---|---|---|---|
| $DD_7$ | in which $R_{51}$ is | 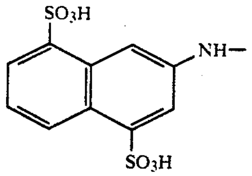 | and $R_{50}$ is H |
| $DD_8$ | in which $R_{51}$ is | ″ | and $R_{50}$ is $-SO_3H$ |
| $DD_9$ | in which $R_{51}$ is | 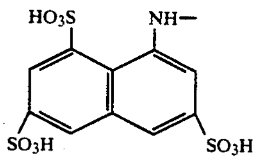 | and $R_{50}$ is H |
| $DD_{10}$ | in which $R_{51}$ is | 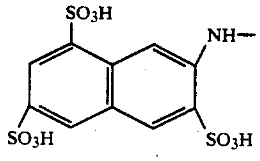 | and $R_{50}$ is H |
| $DD_{11}$ | in which $R_{51}$ is | 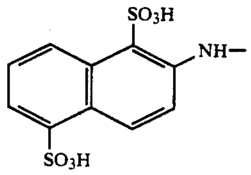 | and $R_{50}$ is $-SO_3H$ |
| $DD_{12}$ | in which $R_{51}$ is | 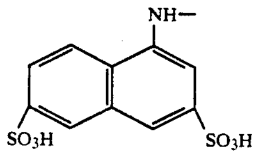 | and $R_{50}$ is H. |

Furthermore, $D_{79}$ may be a group

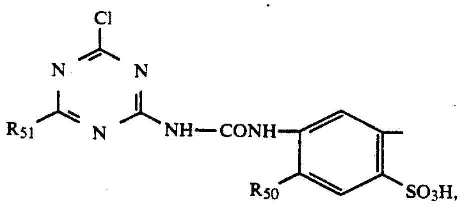

in the corresponding groups which are signified by $DD_{13}$ to $DD_{21}$, $R_{50}$ and $R_{51}$ are defined as follows:

| | | | |
|---|---|---|---|
| $DD_{13}$ | in which $R_{51}$ is | 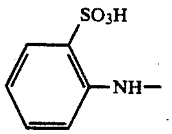 | and $R_{50}$ is H |
| $DD_{14}$ | in which $R_{51}$ is | 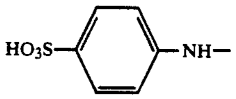 | and $R_{50}$ is $-SO_3H$ |
| $DD_{15}$ | in which $R_{51}$ is | 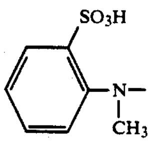 | and $R_{50}$ is H |

TABLE 9-continued
| | | | |
|---|---|---|---|
| $DD_{16}$ | in which $R_{51}$ is | 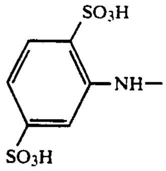 | and $R_{50}$ is H |
| $DD_{17}$ | in which $R_{51}$ is | 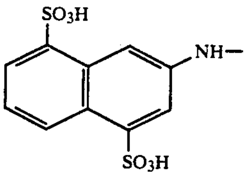 | and $R_{50}$ is H |
| $DD_{18}$ | in which $R_{51}$ is | 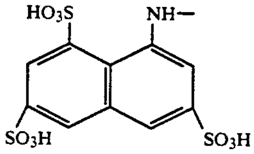 | and $R_{50}$ is H |
| $DD_{19}$ | in which $R_{51}$ is | 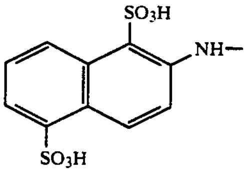 | and $R_{50}$ is $-SO_3H$ |
| $DD_{20}$ | in which $R_{51}$ is | 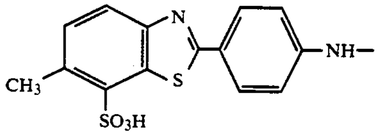 | and $R_{50}$ is $-SO_3H$ |
| $DD_{21}$ | in which $R_{51}$ is | 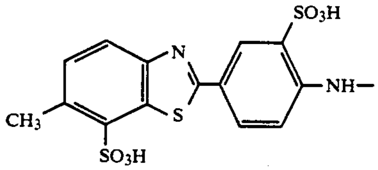 | and $R_{50}$ is H. |
| Ex. No. | $D_{79}$ | $Q_2$ | $Q_3$ | —B— | —W— | I |
|---|---|---|---|---|---|---|
| 100 | 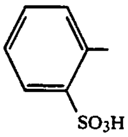 | $CH_3$ | $-CONH_2$ | $-{}^*CH_2CH_2NH-$ | $-NHCH_2CH(OH)CH_2NH-$ | a |
| 101 | 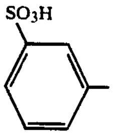 | " | H | $-{}^*CH_2CH(CH_3)NH-$ | $-NHCH_2CH_2NH-$ | a |
| 102 | 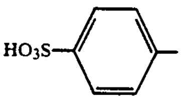 | " | $-CH_2SO_3H$ | $-{}^*(CH_2)_3N(CH_3)-$ | $-NHCH_2CH(CH_3)NH-$ | a |

TABLE 9-continued
| | | | | | | |
|---|---|---|---|---|---|---|
| 103 | 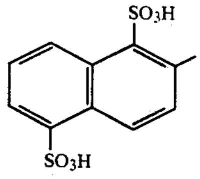 | " | $-SO_3H$ | 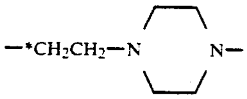 | $-NH(CH_2)_3N(CH_3)-$ | a |
| 104 | 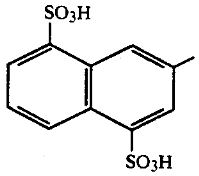 | " | $-CH_2SO_3H$ | $-{}^*CH_2CH_2NH-$ | $-NHCH_2CH(OH)CH_2NH-$ | b |
| 105 | 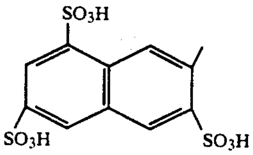 | " | $-CONH_2$ | $-{}^*(CH_2)_3N(CH_3)-$ | $-NHCH_2CH(CH_3)NH-$ | a |
| 106 | 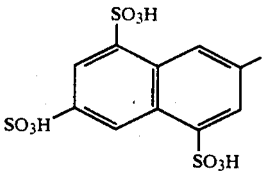 | $-CH_2SO_3H$ | H | $-{}^*CH_2CH(CH_3)NH-$ | " | b |
| 107 | 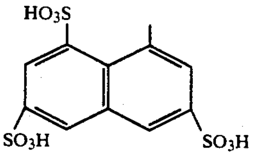 | $CH_3$ | H | $-{}^*CH_2CH_2NH-$ | $-NHCH_2CH_2NH-$ | b |
| 108 | 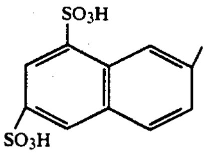 | $-CH_2SO_3H$ | $-CH_2SO_3H$ | $-{}^*CH_2CH_2NH-$ | 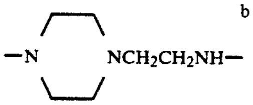 | b |
| 109 | 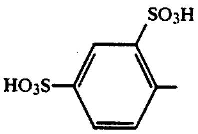 | $CH_3$ | $-CONH_2$ | $-{}^*CH_2CH(CH_3)NH-$ | 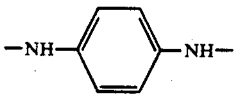 | a |
| 110 | 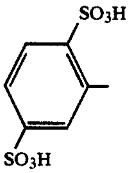 | " | H | $-{}^*CH_2CH_2NH-$ | $-NHCH_2CH(CH_3)NH-$ | a |
| 111 | 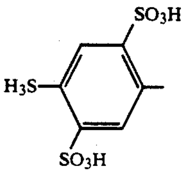 | $CH_3$ | $-CH_2SO_3H$ | $-{}^*(CH_2)_3N(CH_3)-$ | $-NHCH_2CH(OH)CH_2NH-$ | b |

TABLE 9-continued

| | | | | | | |
|---|---|---|---|---|---|---|
| 112 | 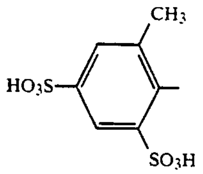 | " | " | $-{}^{*}CH_2CH(CH_3)NH-$ | $-NH(CH_2)_3N(CH_3)-$ | b |
| 113 | 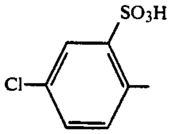 | $-CH_2SO_3H$ | $-CONH_2$ | $-{}^{*}(CH_2)_3N(CH_3)-$ | " | a |
| 114 | 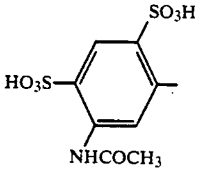 | $CH_3$ | $-CH_2SO_3H$ | " | $-NHCH_2CH_2NH-$ | a |
| 115 | 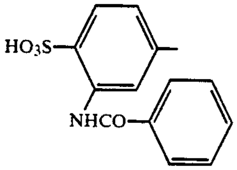 | $CH_3$ | $-CH_2SO_3H$ | $-{}^{*}CH_2CH(CH_3)NH-$ | $-NH(CH_2)_3N(CH_3)-$ | a |
| 116 | 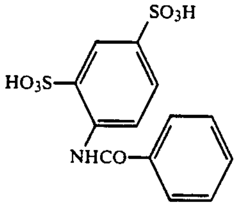 | " | " | $-{}^{*}(CH_2)_3N(CH_3)-$ | $-NHCH_2CH(CH_3)NH-$ | a |
| 117 | $DD_1$ | $CH_3$ | H | $-{}^{*}CH_2CH_2NH-$ | $-NHCH_2CH_2NH-$ | a |
| 118 | " | " | $-CONH_2$ | $-{}^{*}CH_2CH(CH_3)NH-$ | " | a |
| 119 | " | " | H | " | $-NHCH_2CH(CH_3)NH-$ | a |
| 120 | $DD_2$ | " | $-CONH_2$ | " | $-NH(CH_2)_3N(CH_3)-$ | a |
| 121 | " | " | $-CH_2SO_3H$ | $-{}^{*}CH_2CH_2NH-$ | " | a |
| 122 | $DD_3$ | " | $SO_3H$ | $-{}^{*}CH_2CH(CH_3)NH-$ | $-NHCH_2CH(OH)CH_2NH-$ | a |
| 123 | $DD_4$ | " | H | " | $-NHCH_2CH(CH_3)NH-$ | a |
| 124 | " | " | $-CONH_2$ | $-{}^{*}(CH_2)_3NH-$ | " | a |
| 125 | $DD_5$ | " | $-CH_2SO_3H$ | $-{}^{*}(CH_2)_3N(CH_3)-$ | " | a |
| 126 | $DD_6$ | " | $-CONH_2$ | $-{}^{*}CH_2CH_2NH-$ | " | a |
| 127 | " | " | H | " | $-NH(CH_2)_3N(CH_3)-$ | a |

TABLE 9-continued

| | | | | | | |
|---|---|---|---|---|---|---|
| 128 | $DD_7$ | " | H | " | $-NHCH_2CH(CH_3)NH-$ | a |
| 129 | $DD_8$ | " | $-CONH_2$ | $-{}^*CH_2CH(CH_3)NH-$ | " | a |
| 130 | " | " | H | " | $-NHCH_2CH_2NH-$ | a |
| 131 | $DD_9$ | $CH_3$ | $-CH_2SO_3H$ | $-{}^*CH_2CH_2NH-$ | $-NHCH_2CH(CH_3)NH-$ | a |
| 132 | $DD_{10}$ | " | H | " | " | a |
| 133 | $DD_{11}$ | $-CH_2SO_3H$ | $-CH_2SO_3H$ | " | " | a |
| 134 | $DD_{12}$ | " | $-CONH_2$ | $-{}^*(CH_2)_3N(CH_3)-$ | $-NH(CH_2)_3N(CH_3)-$ | a |
| 135 | $DD_{13}$ | $CH_3$ | " | " | " | a |
| 136 | " | " | H | $-{}^*CH_2CH_2NH-$ | " | a |
| 137 | $DD_{14}$ | " | $-CH_2SO_3H$ | " | $-NHCH_2CH(CH_3)NH-$ | a |
| 138 | $DD_{15}$ | " | H | " | " | a |
| 139 | $DD_{16}$ | " | $-CONH_2$ | $-{}^*CH_2CH(CH_3)NH-$ | " | a |
| 140 | " | " | H | $-{}^*CH_2CH_2NH-$ | " | a |
| 141 | $DD_{17}$ | " | $-CH_2SO_3H$ | $-{}^*(CH_2)_3N(CH_3)-$ | $-NH(CH_2)_3N(CH_3)-$ | a |
| 142 | $DD_{18}$ | " | H | " | $-NHCH_2CH(CH_3)NH-$ | a |
| 143 | $DD_{19}$ | " | $-CH_2SO_3H$ | $-{}^*CH_2CH_2NH-$ | " | a |
| 144 | $DD_{20}$ | " | $-CONH_2$ | " | " | a |
| 145 | " | " | H | $-{}^*CH_2CH(CH_3)NH-$ | " | a |
| 146 | $DD_{21}$ | " | $-CONH_2$ | " | $-NHCH_2CH_2NH-$ | a |

TABLE 10

Compounds of formula (T10)

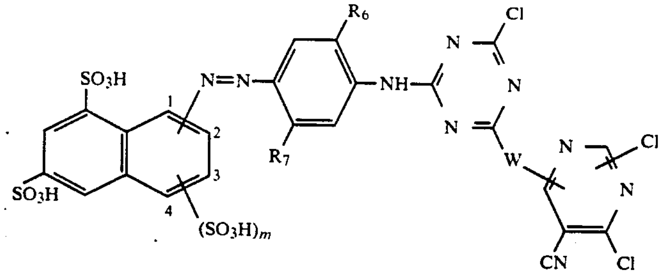

(T10)

In the last column I the shade of each cotton dyeing is given whereby
b is yellow
c is yellowish-orange
and d is orange.

| Ex. No. | position —N=N— | m (position) | $R_6$ | $R_7$ | —W— | I |
|---|---|---|---|---|---|---|
| 147 | 2 | 1 (3) | H | $-NHCONH_2$ | $-NHCH_2CH(OH)CH_2NH-$ | d |
| 148 | 2 | 1 (4) | H | $-NHCONH_2$ | $-NHCH_2CH(OH)CH_2NH-$ | d |
| 149 | 1 | 1 (3) | H | $-NHCONH_2$ | $-NHCH_2CH(OH)CH_2NH-$ | d |
| 150 | 2 | 0 | H | $CH_3$ | $-NHCH_2CH(OH)CH_2NH-$ | b |
| 151 | 2 | 1 (4) | H | $CH_3$ | $-NHCH_2CH(OH)CH_2NH-$ | b |
| 152 | 1 | 1 (3) | H | $CH_3$ | $-NHCH_2CH(OH)CH_2NH-$ | b |
| 153 | 2 | 1 (3) | H | H | $-NHCH_2CH(OH)CH_2NH-$ | b |
| 154 | 2 | 0 | H | H | $-NHCH_2CH(OH)CH_2NH-$ | b |
| 155 | 2 | 1 (3) | $CH_3$ | $CH_3$ | $-NHCH_2CH(OH)CH_2NH-$ | b |
| 156 | 2 | 1 (4) | $OCH_3$ | H | $-NHCH_2CH(OH)CH_2NH-$ | b |
| 157 | 2 | 1 (3) | H | $-NHCOCH_3$ | $-NHCH_2CH(OH)CH_2NH-$ | c |
| 158 | 1 | 1 (3) | H | $-NHCOCH_3$ | $-NHCH_2CH(OH)CH_2NH-$ | c |
| 159 | 1 | 1 (3) | H | $-NHCONH_2$ | $-NHCH_2CH(CH_3)NH-$ | d |
| 160 | 2 | 0 | H | $-NHCONH_2$ | $-NHCH_2CH(CH_3)NH-$ | d |
| 161 | 2 | 1 (4) | H | $-NHCONH_2$ | $-NHCH_2CH(CH_3)NH-$ | d |

TABLE 10-continued

Compounds of formula (T10)

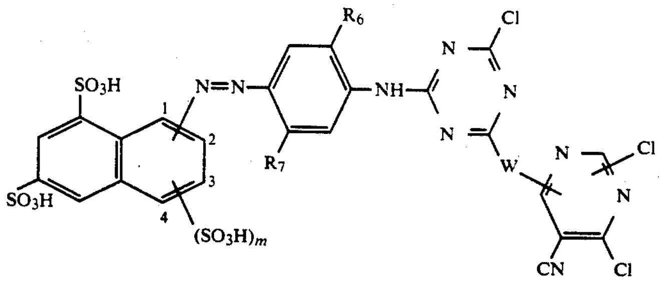

(T10)

In the last column I the shade of each cotton dyeing is given whereby
b is yellow
c is yellowish-orange
and d is orange.

| Ex. No. | position —N=N— | m (position) | $R_6$ | $R_7$ | —W— | I |
|---|---|---|---|---|---|---|
| 162 | 2 | 1 (3) | H | H | $-NHCH_2CH(CH_3)NH-$ | b |
| 163 | 2 | 1 (3) | H | $-NHCOCH_3$ | $-NHCH_2CH(CH_3)NH-$ | c |
| 164 | 1 | 1 (3) | H | $-NHCOCH_3$ | $-NHCH_2CH(CH_3)NH-$ | c |
| 165 | 2 | 0 | H | $-NHCOCH_3$ | $-NHCH_2CH(CH_3)NH-$ | c |
| 166 | 2 | 1 (3) | H | $CH_3$ | $-NHCH_2CH(CH_3)NH-$ | b |
| 167 | 2 | 1 (3) | $OCH_3$ | H | $-NHCH_2CH(CH_3)NH-$ | b |
| 168 | 2 | 1 (3) | H | $-NHCONH_2$ | $-NHCH_2CH_2NH-$ | d |
| 169 | 2 | 1 (4) | H | $-NHCONH_2$ | $-NHCH_2CH_2NH-$ | d |
| 170 | 1 | 1 (3) | H | $-NHCONH_2$ | $-NHCH_2CH_2NH-$ | d |
| 171 | 2 | 1 (3) | H | $CH_3$ | $-NHCH_2CH_2NH-$ | b |
| 172 | 2 | 1 (3) | H | H | $-NHCH_2CH_2NH-$ | b |
| 173 | 2 | 1 (3) | H | $-NHCONH_2$ | 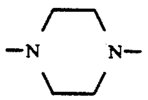 —N N— | d |
| 174 | 2 | 1 (4) | H | $CH_3$ | 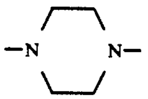 —N N— | b |
| 175 | 2 | 1 (3) | H | $-NHCONH_2$ | 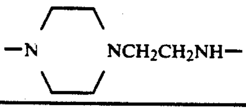 —N NCH2CH2NH— | d |

TABLE 11
Compounds of formula (T11)
(T11)
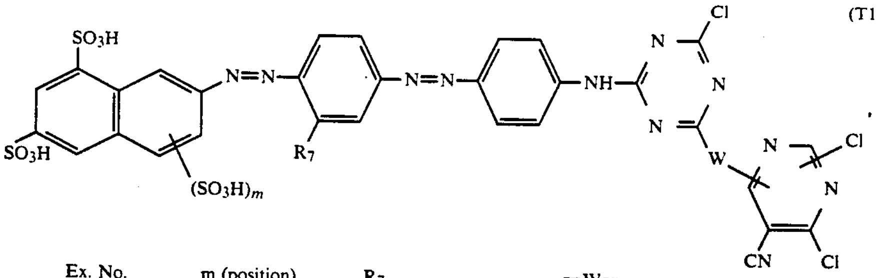
| Ex. No. | m (position) | $R_7$ | —W— |
|---|---|---|---|
| 176 | 1 (4) | $CH_3$ | $-NHCH_2CH(CH_3)NH-$ |
| 177 | 1 (4) | $-CH_2CH_3$ | $-NHCH_2CH(CH_3)NH-$ |
| 178 | 0 | $CH_3$ | $-NHCH_2CH(CH_3)NH-$ |
| 179 | 1 (3) | $CH_3$ | $-NHCH_2CH(CH_3)NH-$ |
| 180 | 1 (4) | $CH_3$ | $-NHCH_2CH(OH)CH_2NH-$ |
| 181 | 1 (4) | $-CH_2CH_3$ | $-NHCH_2CH(OH)CH_2NH-$ |
| 182 | 0 | $-CH_2CH_3$ | $-NHCH_2CH(OH)CH_2NH-$ |
| 183 | 0 | $CH_3$ | $-NHCH_2CH(OH)CH_2NH-$ |
| 184 | 1 (3) | $-CH_2CH_3$ | $-NHCH_2CH(OH)CH_2NH-$ |
| 185 | 1 (4) | $CH_3$ | $-NHCH_2CH_2NH-$ |
| 186 | 1 (3) | $CH_3$ | $-NHCH_2CH_2NH-$ |
| 187 | 0 | $CH_3$ | $-NHCH_2CH_2NH-$ |
| 188 | 1 (4) | $CH_3$ | $-NH(CH_2)_3N(CH_3)-$ |
| 189 | 1 (4) | $CH_3$ | 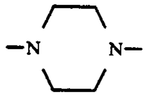 |
| 190 | 1 (3) | $-CH_2CH_3$ | 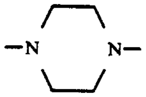 |
| 191 | 0 | $CH_3$ | 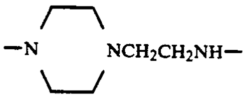 |

TABLE 11-continued

Compounds of formula (T11)

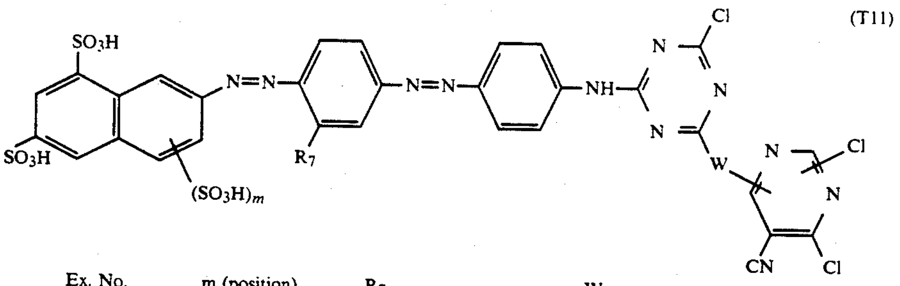

(T11)

| Ex. No. | m (position) | $R_7$ | —W— |
|---|---|---|---|
| 192 | 1 (3) | H | $-NH(CH_2)_3N(CH_3)-$ |
| 193 | 1 (4) | H | $-NH(CH_2)_3N(CH_3)-$ |
| 194 | 1 (3) | $-NHCOCH_3$ | $-NH(CH_2)_3NH-$ |
| 195 | 1 (3) | $-NHCOCH_3$ | $-NHCH_2CH(CH_3)NH-$ |
| 196 | 1 (3) | $-NHCONH_2$ | $-NHCH_2CH(CH_3)NH-$ |
| 197 | 1 (4) | $-NHCONH_2$ | $-NHCH_2CH(CH_3)NH-$ |
| 198 | 1 (3) | H | $-NHCH_2CH(CH_3)NH-$ |
| 199 | 1 (3) | $-NHCONH_2$ | $-NH(CH_2)_3N(CH_3)-$ |
| 200 | 1 (3) | $-NHCONH_2$ | $-NH(CH_2)_3NH-$ |

The dyeings and prints on cotton obtained with each dyestuff of Examples 176 to 200 have an orange shade.

EXAMPLE 201

15.6 Parts (0.02 mole) of the dyestuff having the formula

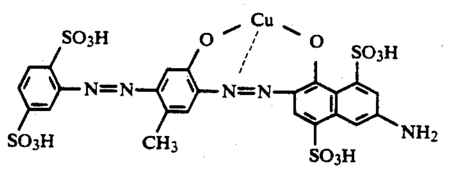

are dissolved in 300 parts of water at pH 8.5–9. The pH is adjusted to 6.0 by adding a small amount hydrochloric acid. To this solution 3.9 parts (0.02 mole plus 5%) of cyanuric chloride are added, and the pH is held at 5.5–6.5 by the addition of sodium hydroxide solution whilst stirring at 10°–15°. After about one hour the reaction is completed.

To the resulting reaction mixture (0.02 mole) 1.6 parts (0.02 mole plus 10%) of 1,2-diaminopropane are added. Condensation is effected at 40°–50°, and the pH is held at 5.5–6.5 by adding sodium hydroxide solution. This reaction is completed after about two hours.

A fine dyestuff suspension is obtained to which (0.02 mole) 4.6 parts (0.02 mole plus 10%) of 5-cyano-2,4,6-trichloropyrimidine are added. This reaction is carried out at 15°–20° and pH 8.5–9.0. By conventional salting out, filtering off and drying the dyestuff corresponding to the formula

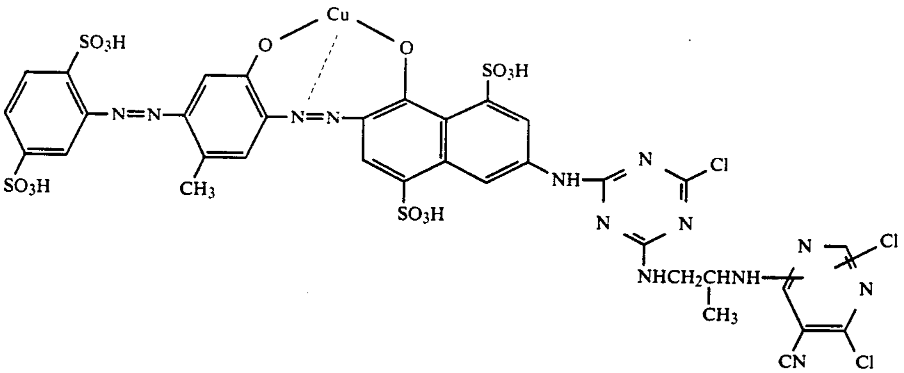

is isolated which dyes cotton a blue shade. These cotton dyeings have high light fastness and good wet fastness properties and are resistant to oxidative influences.

EXAMPLES 202 TO 291

By analogy with the method described in Example 201, using appropriate starting compounds to prepare the desired chromophoric part $F_c$, further metal-containing compounds of formula I may be prepared which are listed in the following Tables 12 to 17. At the top of each Table the corresponding formula is given in which the symbols are as defined in the Table.

The metal complexes of Examples 202–291 dye substrates containing or consisting of cellulose fibres, and particularly textile cotton fabrics, in the shade as indicated whereby the conventional exhaust dyeing method or printing processes are used. The thus obtained dyeings and prints on cotton have high light fastness and wet fastness properties and are resistant to oxidative influences.

TABLE 12

Compounds of formula (T12)

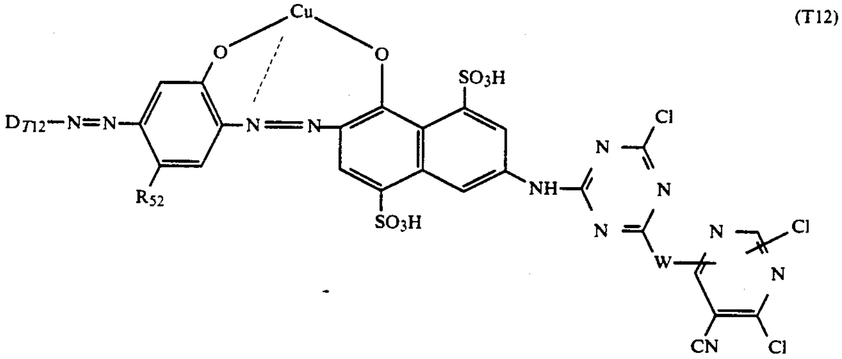

(T12)

| Ex. No. | $D_{T12}$ | $R_{52}$ | —W— |
|---|---|---|---|
| 202 | 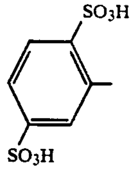 | $CH_3$ | $-NHCH_2CH_2NH-$ |
| 203 | 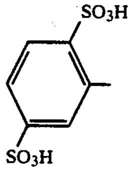 | $CH_3$ | $-NH(CH_2)_3N(CH_3)-$ |
| 204 | 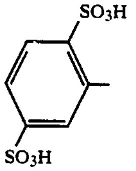 | $CH_3$ | $-NHCH_2CH(OH)CH_2NH-$ |

TABLE 12-continued
Compounds of formula (T12)
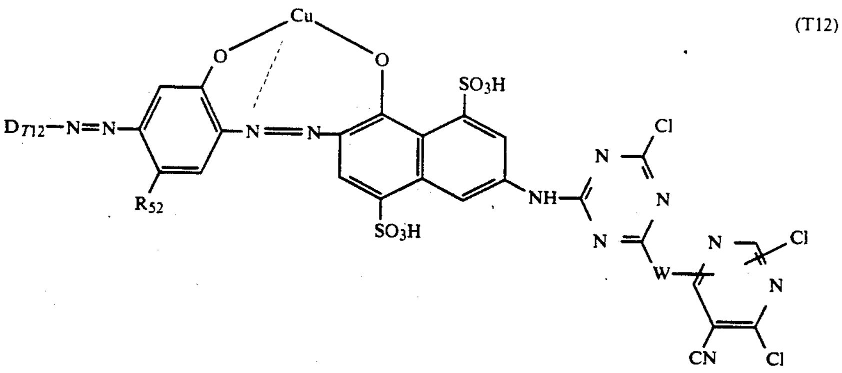
(T12)
| Ex. No. | $D_{T12}$ | $R_{52}$ | —W— |
|---|---|---|---|
| 205 | 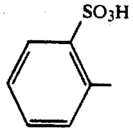 | H | $-NHCH_2CH(CH_3)NH-$ |
| 206 | 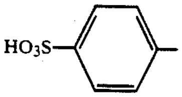 | H | $-NHCH_2CH(CH_3)NH-$ |
| 207 | 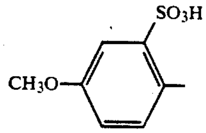 | $CH_3$ | $-NH(CH_2)_3N(CH_3)-$ |
| 208 | 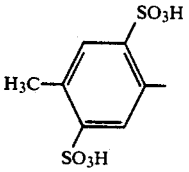 | $CH_3$ | $-NH(CH_2)_3N(CH_3)-$ |
| 209 | 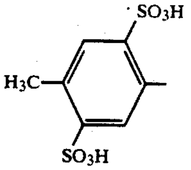 | H | $-NHCH_2CH(CH_3)NH-$ |
| 210 | 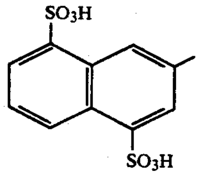 | H | $-NHCH_2CH(CH_3)NH-$ |
| 211 | 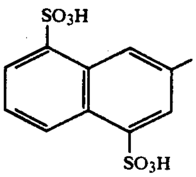 | $CH_3$ | $-NHCH_2CH_2NH-$ |

TABLE 12-continued
Compounds of formula (T12)
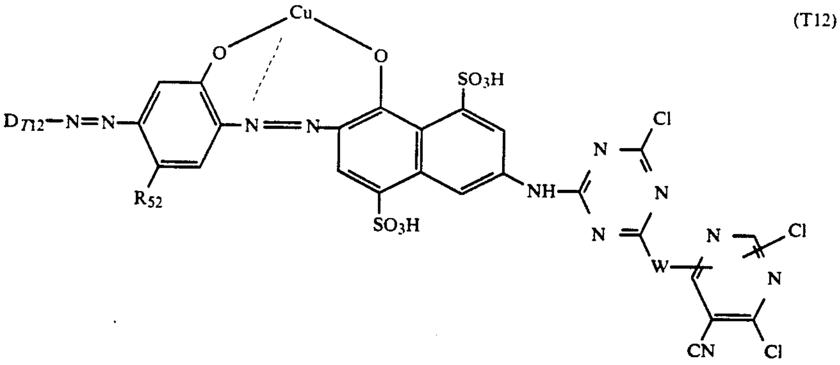
(T12)
| Ex. No. | $D_{T12}$ | $R_{52}$ | —W— |
|---|---|---|---|
| 212 | 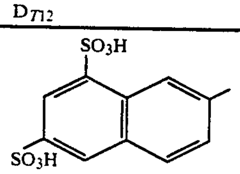 | $CH_3$ | $-NH(CH_2)_3N(CH_3)-$ |
| 213 | 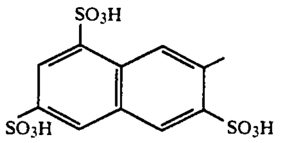 | $CH_3$ | $-NH(CH_2)_3N(CH_3)-$ |
| 214 | 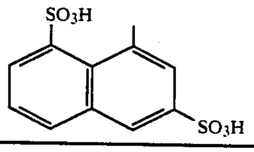 | H | $-NH(CH_2)_3N(CH_3)-$ |
Each dyestuff of Examples 202 to 214 dyes cotton a blue shade.
TABLE 13
Compounds of formula (T13)
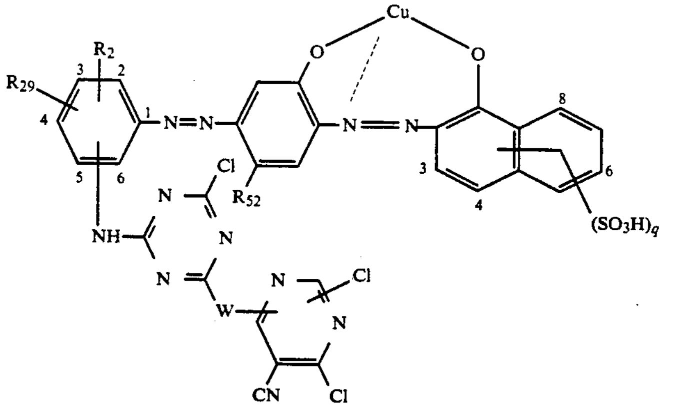
(T13)
| Ex. No. | $R_2$ | $R_{29}$ | $R_{52}$ | position —NH— | —W— | q (position) |
|---|---|---|---|---|---|---|
| 215 | H | H | H | 4 | $-NHCH_2CH_2NH-$ | 2 (3,6) |
| 216 | 2-$OCH_3$ | 3-$SO_3H$ | $CH_3$ | 5 | $-NHCH_2CH(CH_3)NH-$ | 2 (3,8) |

TABLE 13-continued

Compounds of formula (T13)

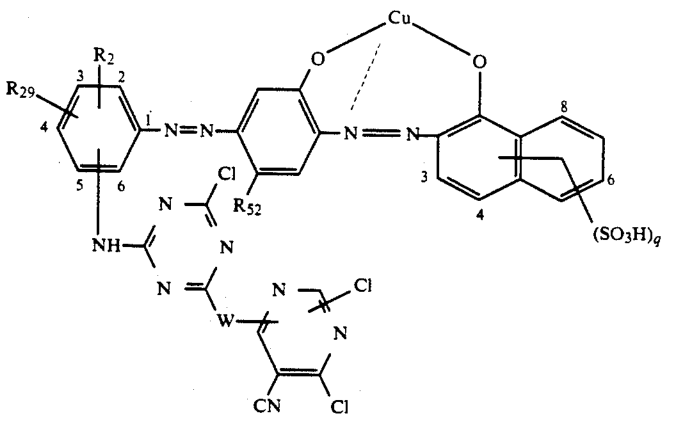

(T13)

| Ex. No. | $R_2$ | $R_{29}$ | $R_{52}$ | position —NH— | —W— | q (position) |
|---|---|---|---|---|---|---|
| 217 | H | 3-$SO_3H$ | H | 5 | $-NHCH_2CH(CH_3)NH-$ | 3 (3,6,8) |
| 218 | 2-$OCH_3$ | H | $CH_3$ | 4 | $-NH(CH_2)_3N(CH_3)-$ | 3 (3,6,8) |
| 219 | 2-$CH_3$ | H | H | 5 | $-NH(CH_2)_3N(CH_3)-$ | 2 (4,6) |
| 220 | H | 2-$SO_3H$ | H | 4 | $-NH(CH_2)_3NH-$ | 2 (3,8) |
| 221 | H | 2-$SO_3H$ | H | 4 | $-NHCH_2CH(CH_3)NH-$ | 2 (3,8) |
| 222 | H | 2-$SO_3H$ | $CH_3$ | 5 | $-NHCH_2CH(CH_3)NH-$ | 2 (3,6) |
| 223 | H | 2-$SO_3H$ | H | 4 | $-NHCH_2CH(CH_3)NH-$ | 3 (3,6,8) |
| 224 | 2-$OCH_3$ | 3-$SO_3H$ | H | 5 | $-NHCH_2CH(CH_3)NH-$ | 3 (3,6,8) |
| 225 | 2-$OCH_3$ | 3-$SO_3H$ | H | 5 | $-NH(CH_2)_3N(CH_3)-$ | 3 (3,6,8) |
| 226 | 2-$OCH_3$ | 3-$SO_3H$ | H | 5 | $-NHCH_2CH_2NH-$ | 3 (3,6,8) |

The dyestuffs of Examples 215 to 226 dye cotton a blue shade.

TABLE 14

Compounds of formula (T14)

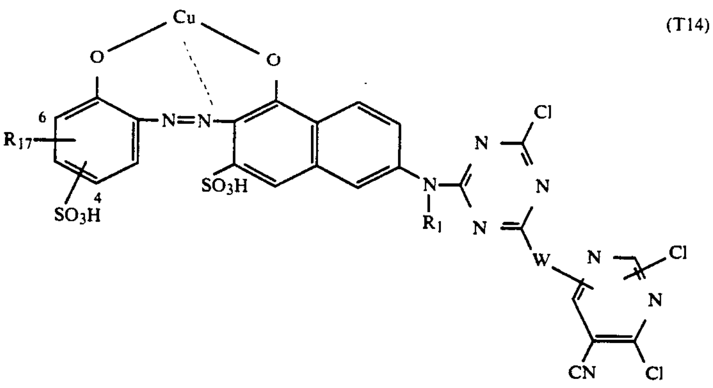

(T14)

| Ex. No. | position SO3H | $R_{17}$ | $R_1$ | —W— |
|---|---|---|---|---|
| 227 | 4 | H | H | $-NHCH_2CH(CH_3)NH-$ |
| 228 | 4 | H | $CH_3$ | $-NHCH_2CH(CH_3)NH-$ |
| 229 | 6 | H | H | $-NHCH_2CH(CH_3)NH-$ |
| 230 | 4 | 6-Cl | H | $-NHCH_2CH(CH_3)NH-$ |
| 231 | 4 | 6-Cl | $CH_3$ | $-NHCH_2CH(CH_3)NH-$ |
| 232 | 6 | 4-Cl | H | $-NHCH_2CH(CH_3)NH-$ |
| 233 | 4 | 6-COOH | H | $-NHCH_2CH(CH_3)NH-$ |
| 234 | 4 | 6-$SO_3H$ | H | $-NHCH_2CH(CH_3)NH-$ |
| 235 | 4 | 6-$SO_3H$ | $CH_3$ | $-NHCH_2CH(CH_3)NH-$ |
| 236 | 4 | H | H | $-NHCH_2CH(OH)CH_2NH-$ |
| 237 | 6 | H | H | $-NHCH_2CH(OH)CH_2NH-$ |
| 238 | 6 | 4-$CH_3$ | H | $-NHCH_2CH(OH)CH_2NH-$ |
| 239 | 4 | 6-Cl | H | $-NHCH_2CH(OH)CH_2NH-$ |
| 240 | 4 | 6-$SO_3H$ | H | $-NHCH_2CH(OH)CH_2NH-$ |
| 241 | 4 | 6-$SO_3H$ | H | $-NHCH_2CH_2NH-$ |

TABLE 14-continued
Compounds of formula (T14)
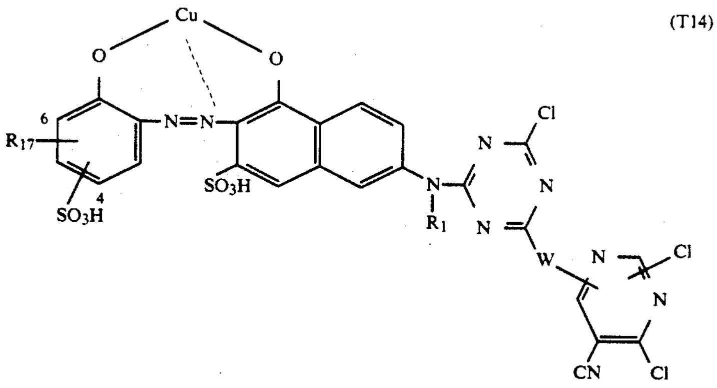
(T14)
| Ex. No. | position SO3H | R17 | R1 | —W— |
|---|---|---|---|---|
| 242 | 4 | H | H | $-NHCH_2CH_2NH-$ |
| 243 | 4 | 6-$NO_2$ | H | $-NHCH_2CH_2NH-$ |
| 244 | 4 | 6-Cl | H | $-NHCH_2CH_2NH-$ |
| 245 | 6 | 4-Cl | H | $-NHCH_2CH_2NH-$ |
| 246 | 4 | H | H | $-NH(CH_2)_3NH-$ |
| 247 | 4 | 6-Cl | H | $-NH(CH_2)_3NH-$ |
| 248 | 4 | 6-$SO_3H$ | H | $-NH(CH_2)_3NH-$ |
| 249 | 4 | 6-$SO_3H$ | H | $-NH(CH_2)_3N(CH_3)-$ |
| 250 | 4 | 6-$SO_3H$ | H | 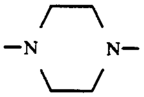 |
The dyestuffs of Examples 227 to 250 dye cotton a ruby-red shade.
TABLE 15
Compounds of formula (T15)
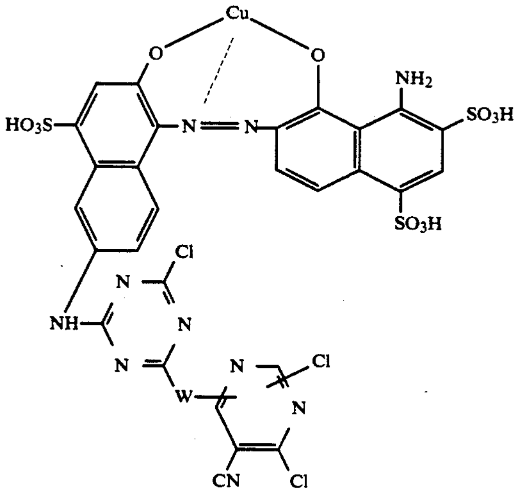
(T15)
| Ex. No. | —W— |
|---|---|
| 251 | $-NHCH_2CH_2NH-$ |

TABLE 15-continued

Compounds of formula (T15)

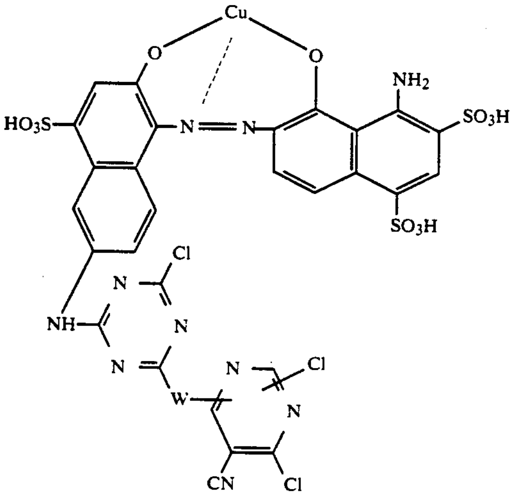

(T15)

| Ex. No. | —W— |
|---|---|
| 252 | —NHCH$_2$CH(OH)CH$_2$NH— |
| 253 | —NH(CH$_2$)$_3$NH— |
| 254 | —NHCH$_2$CH(CH$_3$)NH— |
| 255 | —NH(CH$_2$)$_3$N(CH$_3$)— |
| 256 | 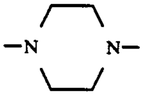 |

The dyestuffs of Examples 251 to 256 dye cotton a dark blue shade.

TABLE 16

Compounds of formula (T16)

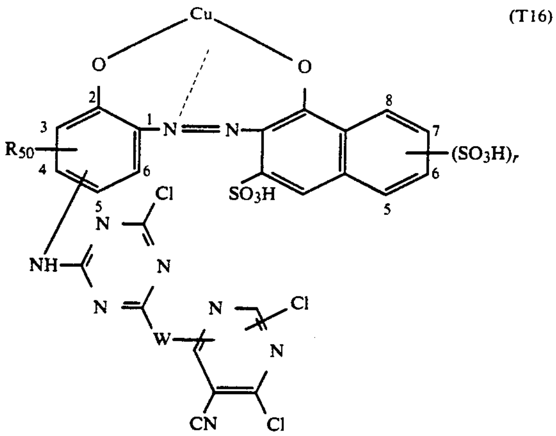

(T16)

| Ex. No. | R$_{50}$ | position —NH— | —W— | r (position) | I |
|---|---|---|---|---|---|
| 257 | 5-SO$_3$H | 3 | —NHCH$_2$CH$_2$NH— | 1 (6) | g |
| 258 | 5-SO$_3$H | 3 | —NHCH$_2$CH(CH$_3$)NH— | 1 (6) | g |
| 259 | 3-SO$_3$H | 5 | —NHCH$_2$CH(CH$_3$)NH— | 1 (6) | g |
| 260 | 3-SO$_3$H | 5 | —NHCH$_2$CH(OH)CH$_2$NH— | 1 (6) | g |
| 261 | 5-SO$_3$H | 3 | —NHCH$_2$CH(OH)CH$_2$NH— | 1 (6) | g |
| 262 | 5-SO$_3$H | 3 | —NH(CH$_2$)$_3$N(CH$_3$)— | 1 (6) | g |
| 263 | H | 4 | —NH(CH$_2$)$_3$N(CH$_3$)— | 2 (6,8) | h |
| 264 | H | 4 | —NHCH$_2$CH(CH$_3$)NH— | 2 (6,8) | h |
| 265 | H | 5 | —NHCH$_2$CH(CH$_3$)NH— | 2 (6,8) | h |
| 266 | H | 4 | —NHCH$_2$CH$_2$NH— | 2 (6,8) | h |
| 267 | H | 4 | —NH(CH$_2$)$_3$NH— | 2 (6,8) | h |
| 268 | H | 4 | —NHCH$_2$CH(OH)CH$_2$NH— | 2 (6,8) | h |

TABLE 17

Compounds of formula (T17)

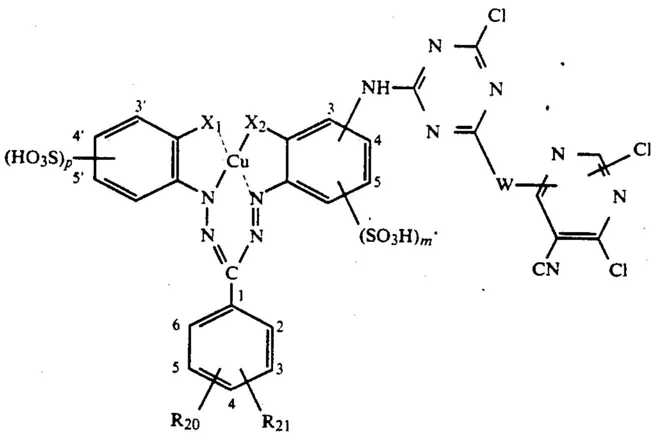

(T17)

| Ex. No. | p (position) | $X_1$ | $X_2$ | position —NH— | m (position) | $R_{20}$ | $R_{21}$ | —W— |
|---|---|---|---|---|---|---|---|---|
| 269 | 2 (3',5') | —O— | —COOH | 4 | 0 | 2-$SO_3H$ | H | —$NHCH_2CH_2NH$— |
| 270 | 2 (3',5') | —O— | —COOH | 4 | 0 | 2-$SO_3H$ | H | —$NHCH_2CH(OH)CH_2NH$— |
| 271 | 2 (3',5') | —O— | —COOH | 4 | 0 | 2-$SO_3H$ | H | —$NHCH_2CH(CH_3)NH$— |
| 272 | 2 (3',5') | —O— | —COOH | 4 | 0 | 3-$SO_3H$ | H | —$NHCH_2CH(CH_3)NH$— |
| 273 | 2 (3',5') | —O— | —COOH | 4 | 0 | 3-$SO_3H$ | H | —$NH(CH_2)_3N(CH_3)$— |
| 274 | 1 (4') | —COOH— | —O— | 3 | 1 (5) | H | H | —$NHCH_2CH_2NH$— |
| 275 | 1 (4') | —COOH— | —O— | 3 | 1 (5) | H | H | —$NH(CH_2)_3NH$— |
| 276 | 1 (4') | —COOH— | —O— | 3 | 1 (5) | H | H | —$NHCH_2CH(OH)CH_2NH$— |
| 277 | 1 (4') | —COOH— | —O— | 3 | 1 (5) | H | H | —$NHCH_2CH(CH_3)NH$— |
| 278 | 1 (4') | —COOH— | —O— | 3 | 1 (5) | 3-$SO_3H$ | H | —$NHCH_2CH(CH_3)NH$— |
| 279 | 1 (5') | —COOH— | —O— | 3 | 1 (5) | 2-Cl | H | —$NHCH_2CH(CH_3)NH$— |
| 280 | 1 (5') | —COOH— | —O— | 3 | 1 (5) | 2-Cl | 5-Cl | —$NHCH_2CH(CH_3)NH$— |
| 281 | 1 (5') | —COOH— | —O— | 3 | 1 (5) | 2-$SO_3H$ | H | —$NHCH_2CH(CH_3)NH$— |
| 282 | 1 (5') | —COOH | —O— | 3 | 1 (5) | 3-$SO_3H$ | H | —$NHCH_2CH(OH)CH_2NH$— |
| 283 | 1 (5') | —COOH | —O— | 3 | 1 (5) | 4-$SO_3H$ | H | —$NHCH_2CH(OH)CH_2NH$— |

TABLE 17-continued

Compounds of formula (T17)

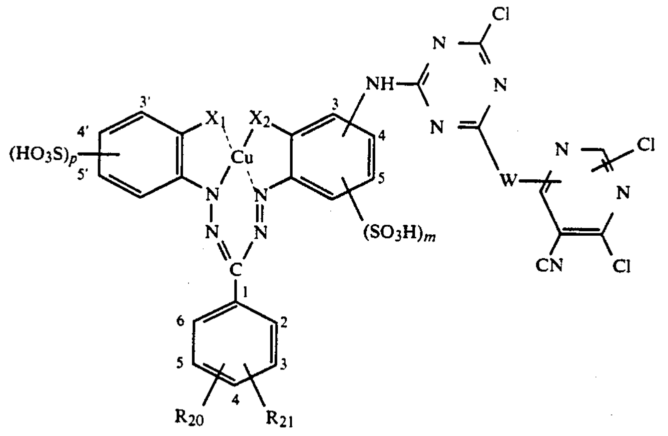

(T17)

| Ex. No. | p (position) | $X_1$ | $X_2$ | position —NH— | m (position) | $R_{20}$ | $R_{21}$ | —W— |
|---|---|---|---|---|---|---|---|---|
| 284 | 1 (5') | —COOH | —O— | 3 | 1 (5) | 4-$CH_3$ | H | —$NHCH_2CH_2NH$— |
| 285 | 1 (5') | —COOH | —O— | 3 | 1 (5) | 4-$OCH_3$ | H | —$NHCH_2CH_2NH$— |
| 286 | 1 (5') | —COOH | —O— | 3 | 1 (5) | 3-$CH_3$ | 4-Cl | —$NH(CH_2)_3N(CH_3)$— |
| 287 | 1 (4') | —O— | —COOH— | 3 | 1 (5) | 2-$CH_3$ | H | —$NHCH_2CH(CH_3)NH$— |
| 288 | 1 (5') | —O— | —COOH— | 5 | 1 (3) | H | H | —$NHCH_2CH(CH_3)NH$— |
| 289 | 1 (5') | —O— | —COOH— | 5 | 1 (3) | 2-$CH_3$ | H | —$NHCH_2CH(OH)CH_2NH$— |
| 290 | 1 (5') | —O— | —COOH— | 5 | 1 (3) | 4-$SO_3H$ | H | —$NHCH_2CH_2NH$— |
| 291 | 1 (5') | —O— | —COOH— | 3 | 1 (5) | H | H | —$NHCH_2CH_2NH$— |

The dyestuffs of Examples 269 to 291 dye cotton a blue shade.

EXAMPLE 292

45.3 Parts of the monoazo dyestuff of the formula

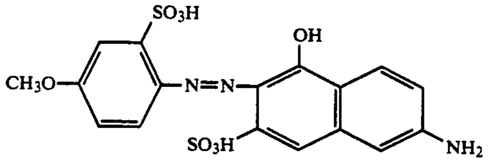

prepared in accordance with known methods, are dissolved in 700 parts of water. Within 30 minutes 18.5 parts of solid cyanuric chloride are added at 20°-25°. The mixture is stirred at pH 6.0-6.5 until a free amino group is no longer detectable. Subsequently, 11.1 parts of 1,2-diaminopropane are added, and the reaction mixture is stirred for two hours whereby a pH of 7.0 is held by the addition of dilute sodium carbonate solution. The condensation product is salted out by adding sodium chloride and filtered off. The wet paste thus obtained is dissolved in 900 parts of water. To this solution 24.9 parts of 5-cyano-2,4,6-trichloropyrimidine are added and stirring is effected for two hours at 0°-5°. During the course of reaction the pH is kept at 8-9 by adding dilute sodium carbonate solution. The resultant dyestuff is precipitated with sodium chloride and isolated. It corresponds to the formula

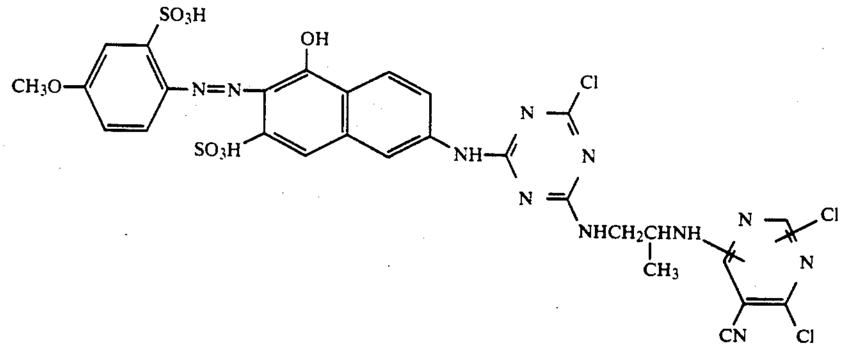

The dyestuff when dried is a dark red powder which dissolves in water showing a red colour and dyes cotton a scarlet shade. These dyeings have good light and wet fastness properties and are resistant to oxidative influences.

EXAMPLES 293 to 319

By analogy with the method described in Example 292, using appropriate starting compounds, further compounds of formula I may be prepared. They correspond to formula (T18)

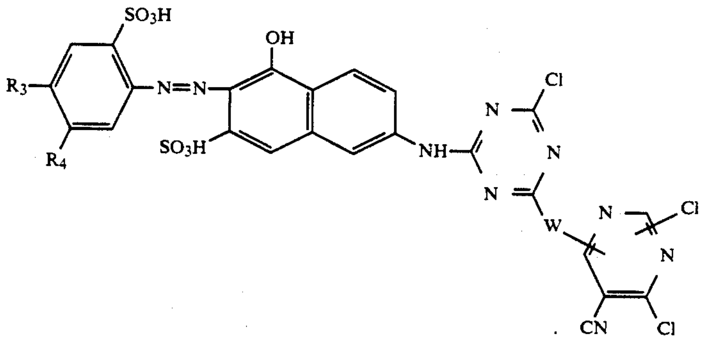

(T18)

in which the symbols are as defined in Table 18 below. The cotton dyeings obtained with the dyestuffs of Examples 293 to 319 have good light and wet fastness properties and are resistant to oxidative influences.

In the last column I the shade of each cotton dyeing is given whereby d is orange and k is scarlet.

TABLE 18

Compounds of formula (T18)

| Ex. No. | $R_3$ | $R_4$ | —W— | I |
|---|---|---|---|---|
| 293 | $OC_2H_5$ | H | $—NHCH_2CH(CH_3)NH—$ | k |
| 294 | $OCH_3$ | $SO_3H$ | $—NHCH_2CH(CH_3)NH—$ | k |
| 295 | $—OC_2H_4OH$ | H | $—NHCH_2CH(CH_3)NH—$ | k |
| 296 | $OCH_3$ | H | $—NHCH_2CH(OH)CH_2NH—$ | k |
| 297 | $OCH_3$ | $SO_3H$ | $—NHCH_2CH(OH)CH_2NH—$ | k |
| 298 | $—OC_2H_4OH$ | H | $—NHCH_2CH(OH)CH_2NH—$ | k |
| 299 | $OCH_3$ | H | $—NHCH_2CH_2NH—$ | k |
| 300 | $OCH_3$ | $SO_3H$ | $—NHCH_2CH_2NH—$ | k |
| 301 | $OC_2H_5$ | H | $—NHCH_2CH_2NH—$ | k |
| 302 | $—OC_2H_4OH$ | H | $—NHCH_2CH_2NH—$ | k |
| 303 | $OCH_3$ | H | $—NH(CH_2)_3NH—$ | k |
| 304 | $OCH_3$ | $SO_3H$ | $—NH(CH_2)_3NH—$ | k |
| 305 | $—OC_2H_4OH$ | H | $—NH(CH_2)_3NH—$ | k |
| 306 | $OC_2H_5$ | H | $—NH(CH_2)_3N(CH_3)—$ | k |
| 307 | $OCH_3$ | H | —N(piperazine)N— | k |
| 308 | $OCH_3$ | $SO_3H$ | —N(piperazine)N— | k |

TABLE 18-continued

Compounds of formula (T18)

| Ex. No. | $R_3$ | $R_4$ | —W— | I |
|---|---|---|---|---|
| 309 | $-OC_2H_4OH$ | H | 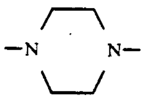 | k |
| 310 | $-OC_2H_4OC_2H_4OH$ | H | 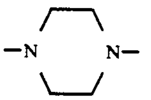 | k |
| 311 | $-OC_2H_4OC_2H_4OH$ | H | $-NHCH_2CH_2NH-$ | k |
| 312 | $-OC_2H_4OC_2H_4OH$ | H | $-NH(CH_2)_3NH-$ | k |
| 313 | $-OC_2H_4OC_2H_4OH$ | H | $-NHCH_2CH(OH)CH_2NH-$ | k |
| 314 | $-OC_2H_4OC_2H_4OH$ | H | $-NHCH_2CH(CH_3)NH-$ | k |
| 315 | $CH_3$ | $SO_3H$ | $-NHCH_2CH(CH_3)NH-$ | d |
| 316 | $CH_3$ | $SO_3H$ | $-NHCH_2CH(OH)CH_2NH-$ | d |
| 317 | $CH_3$ | $SO_3H$ | $-NHCH_2CH_2NH-$ | d |
| 318 | $CH_3$ | $SO_3H$ | $-NH(CH_2)_3N(CH_3)-$ | d |

EXAMPLE 320

5 Parts of cyanuric chloride are stirred to a homogeneous suspension in a mixture of 10 parts of water and 20 parts of ice. To this suspension a neutral solution (of pH 7) of 30 parts of the tetrasodium salt of the dyestuff having the formula

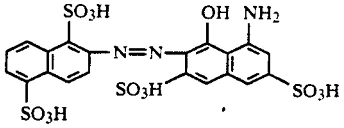

in 160 parts of water are added and stirring is effected at 5° and pH 5.5-6.0 until the free amino group is no longer detectable. At pH 6.5-7.0 the temperature is slowly elevated to 15° and then 3.25 parts of 1,2-diaminopropane are added. The pH is kept at 6.0 by adding hydrochloric acid. The mixture is heated at 50° for three hours, after this time the reaction is completed. Then, 70 parts of sodium chloride are added, and the red suspension is filtered. The filter cake is washed with 500 parts of a 20% sodium chloride solution. The resultant paste is brought into 500 parts of water and 4.5 parts of 5-cyano-2,4,6-trichloropyrimidine are added. Stirring is effected for 12 hours at 20°, until the reaction is complete and then 80 parts of sodium chloride are added. The dyestuff thus obtained is precipitated and filtered; it corresponds to the formula

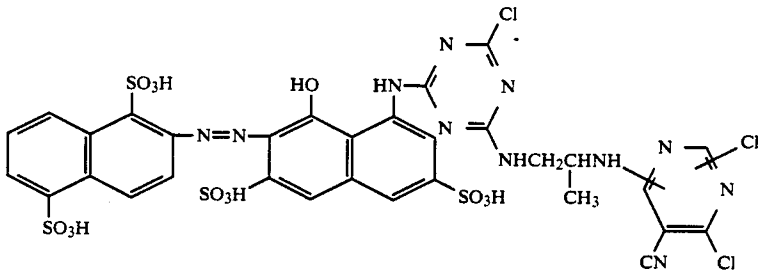

The dyestuff when dried is a dark red powder which dissolves in water showing a red colour and dyes cotton a bluish-red shade. These cotton dyeings have notably good general fastness properties.

EXAMPLES 321 to 416

By analogy with the method described in Example 320, using appropriate starting compounds, further compounds of formula I may be prepared which are listed in Tables 19 to 22 below. At the top of each Table the corresponding formula is given in which the symbols are as defined in the following Table. The dyestuffs of Examples 321 to 416 dye cellulose fibres and particularly cotton using the conventional exhaust dyeing method. All these dyeings are bluish-red and have good fastness properties.

TABLE 19
Compounds of formula (T19)
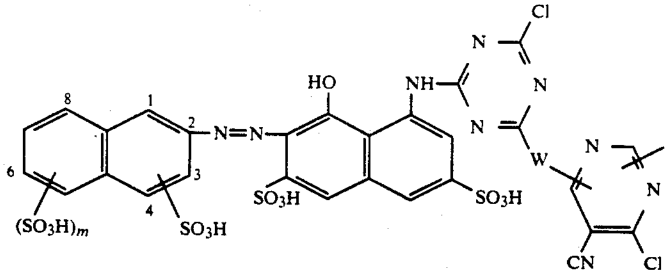
(T19)
| Ex. No. | m | position of the $SO_3H$ group(s) | —W— |
|---|---|---|---|
| 321 | 0 | 1 | $-NHCH_2CH(CH_3)NH-$ |
| 322 | 0 | 1 | $-NHCH_2CH(OH)CH_2NH-$ |
| 323 | 1 | 1,5 | " |
| 324 | 1 | 3,6 | " |
| 325 | 0 | 1 | 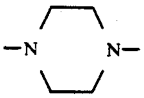 |
| 326 | 1 | 1,5 | " |
| 327 | 0 | 1 | $-NHCH_2CH_2NH-$ |
| 328 | 1 | 1,5 | " |
| 329 | 1 | 4,8 | " |
| 330 | 0 | 1 | $-NH(CH_2)_3NH-$ |
| 331 | 1 | 1,5 | " |
| 332 | 0 | 1 | $-NH(CH_2)_3N(CH_3)-$ |
| 333 | 1 | 1,5 | " |
| 334 | 1 | 3,6 | " |
| 335 | 1 | 4,8 | " |
| 336 | 0 | 1 | $-NHCH_2CH_2N(CH_2CH_2OH)-$ |
| 337 | 1 | 4,8 | $-NHCH_2CH(CH_3)NH-$ |
TABLE 20
Compounds of formula (T20)
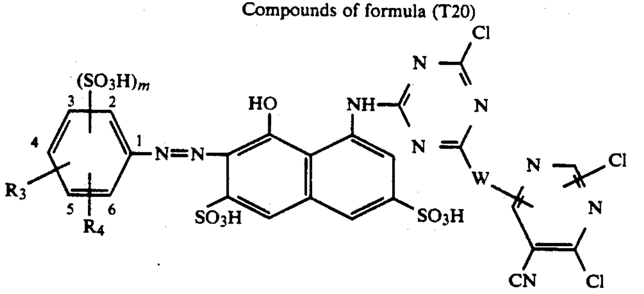
(T20)
| Ex. No. | m (position $SO_3H$) | $R_3$ | $R_4$ | —W— |
|---|---|---|---|---|
| 338 | 1 (2) | H | H | 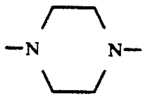 |

TABLE 20-continued

Compounds of formula (T20)

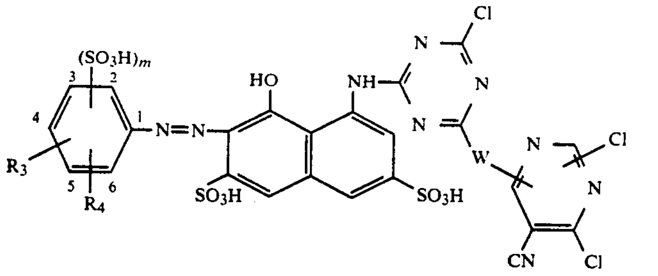

(T20)

| Ex. No. | m (position $SO_3H$) | $R_3$ | $R_4$ | —W— |
|---|---|---|---|---|
| 339 | " | 5-$SO_3H$ | H | " |
| 340 | " | " | 4-$CH_3$ | " |
| 341 | " | " | 4-$OCH_3$ | " |
| 342 | " | H | 4-$CH_3$ | " |
| 343 | " | H | 4-$OCH_3$ | " |
| 344 | " | 4-$SO_3H$ | H | " |
| 345 | " | H | H | —$NHCH_2CH_2N$(—$CH_2CH_2OH$)— |
| 346 | " | H | 4-$OCH_3$ | " |
| 347 | " | 5-$SO_3H$ | H | " |
| 348 | " | H | 4-$CH_3$ | —$NH(CH_2)_3N$($CH_3$)— |
| 349 | " | H | 4-$OCH_3$ | " |
| 350 | " | H | H | " |
| 351 | " | 5-$SO_3H$ | H | " |
| 352 | " | 4-$SO_3H$ | H | " |
| 353 | 0 | 2-COOH | H | " |
| 354 | 0 | 3-COOH | H | " |
| 355 | 0 | 4-COOH | H | " |
| 356 | 1 (2) | 5-$SO_3H$ | 4-$OCH_3$ | —$NHCH_2CH(OH)CH_2NH$— |
| 357 | " | H | H | " |
| 358 | " | H | 4-$CH_3$ | " |
| 359 | 1 (2) | H | 4-$OCH_3$ | —$NHCH_2CH(OH)CH_2NH$— |
| 360 | " | 4-$SO_3H$ | H | " |
| 361 | 0 | 3-COOH | H | " |
| 362 | 1 (2) | H | H | —$NHCH_2CH(CH_3)NH$— |
| 363 | " | 5-$SO_3H$ | H | " |
| 364 | " | " | 4-$CH_3$ | " |
| 365 | " | 4-$SO_3H$ | H | " |
| 366 | 0 | 2-COOH | H | " |
| 367 | 0 | 3-COOH | H | " |
| 368 | 0 | 4-COOH | H | " |
| 369 | 1 (2) | H | H | —$NHCH_2CH_2NH$— |
| 370 | " | H | 4-$OCH_3$ | " |
| 371 | 0 | 2-COOH | H | " |
| 372 | 1 (2) | 5-$SO_3H$ | H | —$NH(CH_2)_3NH$— |

TABLE 21
Compounds of formula (T21)
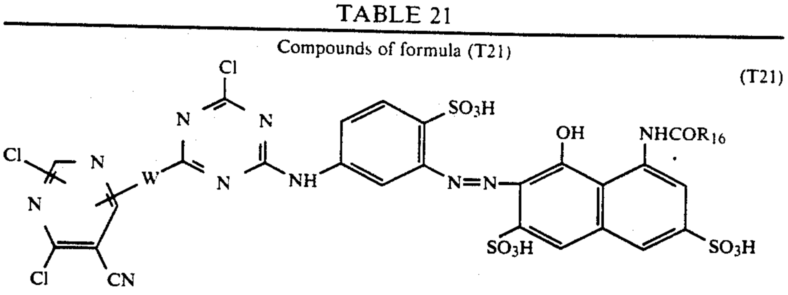
(T21)
| Ex. No. | —W— | $R_{16}$ |
|---|---|---|
| 373 | $-NHCH_2CH_2NH-$ | methyl |
| 374 | " | ethyl |
| 375 | " | phenyl |
| 376 | $-NHCH_2CH(CH_3)NH-$ | phenyl |
| 377 | " | methyl |
| 378 | " | ethyl |
| 379 | $-NH(CH_2)_3N(CH_3)-$ | methyl |
| 380 | " | phenyl |
| 381 | $-NHCH_2CH(OH)CH_2NH-$ | " |
| 382 | " | ethyl |
| 383 | 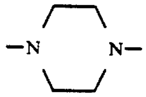 | methyl |
| 384 | $-NH(CH_2)_3NH-$ | phenyl |
TABLE 22
Compounds of formula (T22)
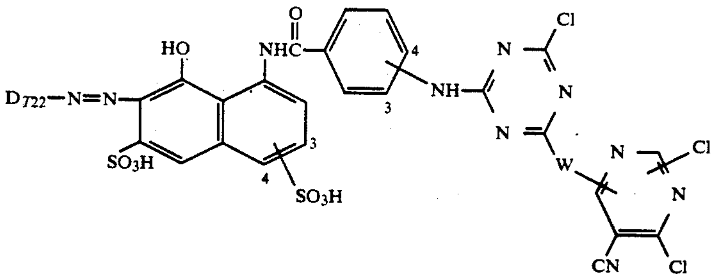
(T22)
| Ex. No. | $D_{T22}$ | position $SO_3H$ | position —NH— | —W— |
|---|---|---|---|---|
| 385 | 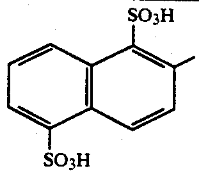 | 3 | 3 | $-NHCH_2CH_2NH-$ |
| 386 | " | 3 | 4 | " |
| 387 | " | 3 | 3 | $-NH(CH_2)_3N(CH_3)-$ |

TABLE 22-continued
Compounds of formula (T22)
(T22)
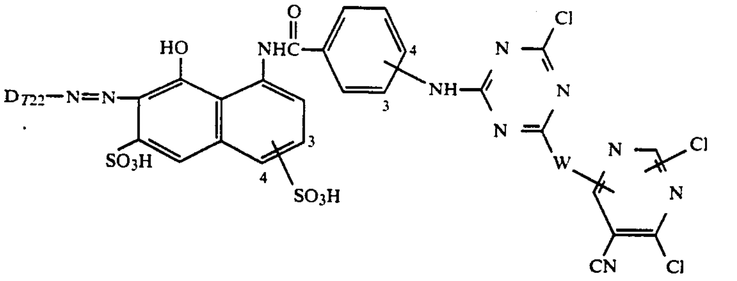
| Ex. No. | $D_{T22}$ | position $SO_3H$ | position —NH— | —W— |
|---|---|---|---|---|
| 388 | " | 3 | 3 | 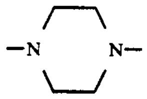 |
| 389 | " | 3 | 3 | $-NHCH_2CH(OH)CH_2NH-$ |
| 390 | " | 3 | 3 | $-NHCH_2CH(CH_3)NH-$ |
| 391 | " | 4 | 3 | " |
| 392 | 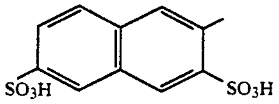 | 3 | 4 | " |
| 393 | " | 4 | 3 | " |
| 394 | " | 3 | 3 | " |
| 395 | 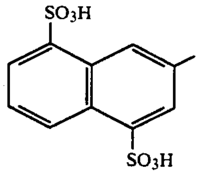 | 3 | 4 | " |
| 396 | " | 3 | 3 | " |
| 397 | " | 4 | 4 | " |
| 398 | " | 3 | 3 | $-NH(CH_2)_3N(CH_3)-$ |
| 399 | 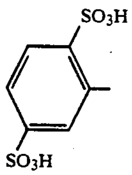 | 3 | 4 | $-NH(CH_2)_3N(CH_3)-$ |
| 400 | " | 3 | 3 | $-NHCH_2CH_2NH-$ |
| 401 | " | 3 | 3 | $-NHCH_2CH(CH_3)NH-$ |
| 402 | " | 3 | 4 | $-NHCH_2CH(OH)CH_2NH-$ |

TABLE 22-continued
Compounds of formula (T22)
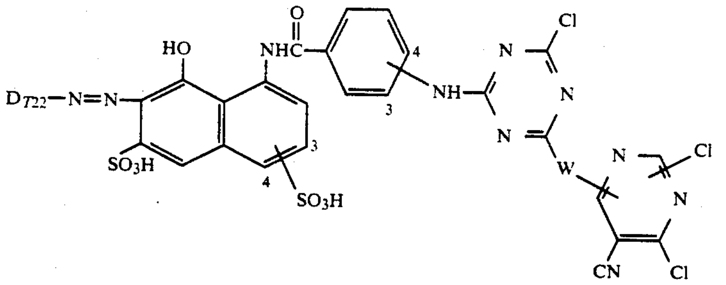
(T22)
| Ex. No. | $D_{T22}$ | position $SO_3H$ | position —NH— | —W— |
|---|---|---|---|---|
| 403 | 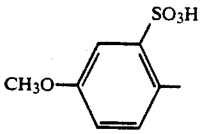 | 3 | 3 | $-NHCH_2CH(OH)CH_2NH-$ |
| 404 | " | 3 | 4 | $-NHCH_2CH(CH_3)NH-$ |
| 405 | " | 4 | 4 | " |
| 406 | 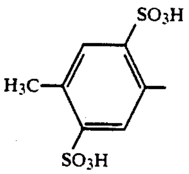 | 3 | 4 | " |
| 407 | " | 3 | 3 | $-NHCH_2CH_2NH-$ |
| 408 | 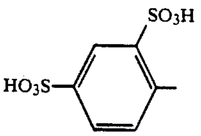 | 3 | 3 | " |
| 409 | " | 4 | 3 | " |
| 410 | " | 3 | 4 | $-NHCH_2CH(CH_3)NH-$ |
| 411 | " | 3 | 3 | $-NH(CH_2)_3N(CH_3)-$ |
| 412 | 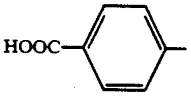 | 3 | 4 | " |
| 413 | 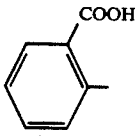 | 3 | 4 | $-NHCH_2CH(CH_3)NH-$ |
| 414 | 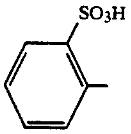 | 3 | 3 | " |
| 415 | " | 4 | 4 | $-NH(CH_2)_3NH-$ |

TABLE 22-continued

Compounds of formula (T22)

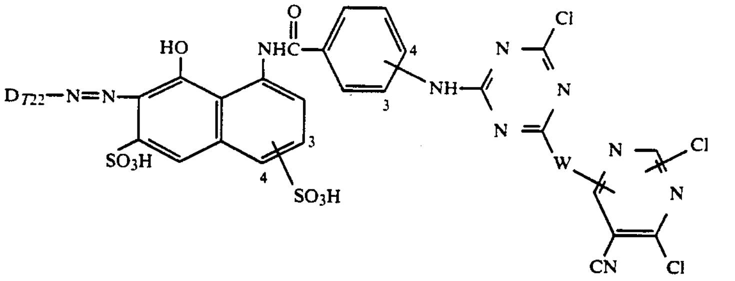

(T22)

| Ex. No. | $D_{T22}$ | position $SO_3H$ | position —NH— | —W— |
|---|---|---|---|---|
| 416 | " | 3 | 4 | $-NHCH_2CH(OH)CH_2NH-$ |

EXAMPLE 417

212 Parts of cyanuric chloride are stirred in a mixture of 560 parts of ice and 200 parts of water for 45 minutes. A solution consisting of 190 parts of 2,4-diaminobenzene-1-sulphonic acid in 920 parts of water and 112 parts of a 30% sodium hydroxide solution is added and this mixture is stirred for 6 hours while cooling with an ice-bath. Subsequently, the white suspension is indirectly diazotized.

In the meantime, 140 parts of 4-aminobenzoic acid are diazotized in accordance with known methods and are coupled with 320 parts of 1-amino-8-hydroxynaphthalene-3,6-disulphonic acid under acid reaction conditions. To the red suspension obtained the above diazo solution is added, and alkaline coupling is effected.

A blue solution is obtained to which 120 parts of 1,2-diaminopropane are added. Condensation is effected during two hours. The reaction mixture is then salted out with sodium chloride (25% by volume) and filtered. The blue filter cake is redissolved in water using the ten-fold amount.

To this aqueous solution a suspension of 175 parts of 5-cyano-2,4,6-trichloropyrimidine in 350 parts of water and 150 parts of ice which has been stirred for 45 minutes, is added within two hours. The pH of the reaction mixture is then held at 9 for three hours. The product thus obtained is salted out by adding sodium chloride (10% by volume) and filtered and the filter cake is dried at 40° in vacuo. The dyestuff having the formula

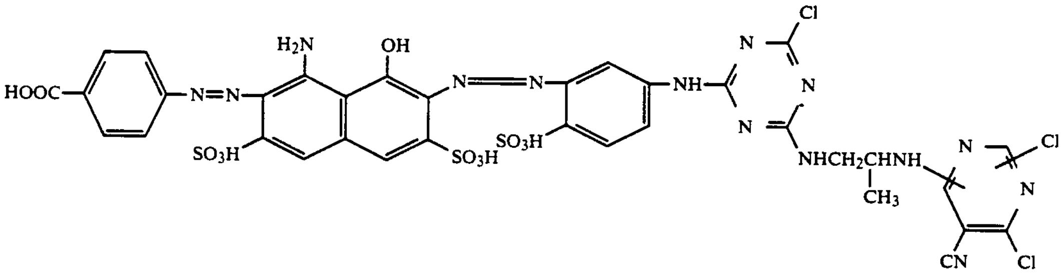

dyes cellulose fibres and particularly cotton a navy shade. These dyeings have good fastness properties such as light and wet fastness properties and are resistant to oxidative influences.

EXAMPLES 418 to 456

By analogy with the method described in Example 417, using appropriate starting compounds, further compounds of formula I may be prepared. They correspond to formula (T23)

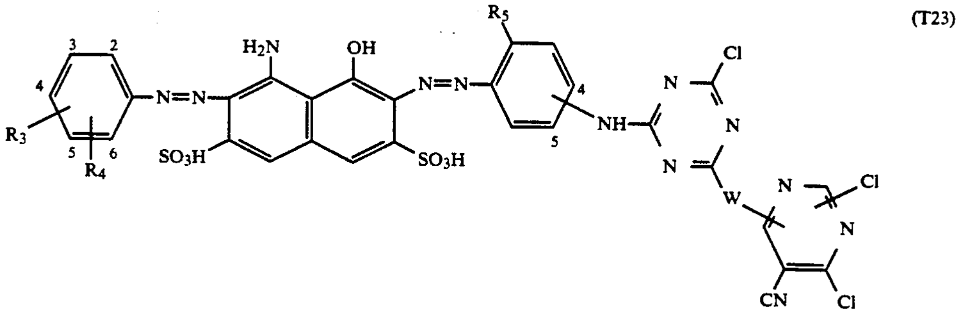

(T23)

in which the symbols are as defined in Table 23 below. The dyestuffs of Examples 418 to 456 dye cellulose fibres and particularly cotton a navy shade using the conventional exhaust dyeing method. These dyeings have notably good general fastness properties.

TABLE 23

| | Compounds of formula (T23) | | | | |
|---|---|---|---|---|---|
| Ex. No. | $R_3$ | $R_4$ | position —NH— | $R_5$ | —W— |
| 418 | 4-$SO_3H$ | H | 5 | $SO_3H$ | 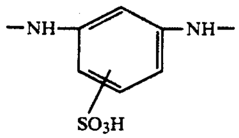 |
| 419 | 3-COOH | H | 4 | " | " |
| 420 | 4-COOH | H | 4 | COOH | " |
| 421 | " | H | 4 | $SO_3H$ | $-NHCH_2\underset{CH_3}{CH}NH-$ |
| 422 | 3-$SO_3H$ | H | 5 | " | " |
| 423 | 5-COOH | 2-Cl | 4 | " | " |
| 424 | " | " | 5 | " | " |
| 425 | " | " | 4 | COOH | " |
| 426 | 3-COOH | H | 5 | $SO_3H$ | " |
| 427 | 4-$SO_3H$ | H | 4 | COOH | " |
| 428 | 2-$SO_3H$ | 4-Cl | 4 | " | " |
| 429 | 4-$SO_3H$ | H | 4 | $SO_3H$ | " |
| 430 | 2-$SO_3H$ | 4-Cl | 4 | " | " |
| 431 | 4-$SO_3H$ | H | 5 | " | " |
| 432 | 2-$SO_3H$ | 4-Cl | 5 | " | " |
| 433 | 5-COOH | 2-Cl | 5 | " | $-NHCH_2\underset{OH}{CH}CH_2NH-$ |
| 434 | 4-COOH | H | 5 | " | " |
| 435 | 4-$SO_3H$ | H | 5 | " | " |
| 436 | 3-COOH | H | 5 | " | " |
| 437 | 3-COOH | H | 4 | " | " |
| 438 | 3-$SO_3H$ | H | 4 | " | " |
| 439 | " | H | 4 | COOH | " |
| 440 | " | H | 5 | $SO_3H$ | $-NHCH_2CH_2NH-$ |
| 441 | 5-COOH | 2-Cl | 5 | " | " |
| 442 | 5-$SO_3H$ | " | 5 | " | " |
| 443 | 3-COOH | H | 5 | " | " |
| 444 | 2-$SO_3H$ | 4-Cl | 5 | " | $-NH(CH_2)_3NH-$ |
| 445 | 5-$SO_3H$ | 2-Cl | 4 | $SO_3H$ | $-NH(CH_2)_3NH-$ |
| 446 | 4-COOH | H | 4 | COOH | $-NH(CH_2)_3\underset{CH_3}{N}-$ |
| 447 | 5-$SO_3H$ | 2-Cl | 5 | $SO_3H$ | " |
| 448 | 4-COOH | H | 5 | " | " |
| 449 | 5-COOH | 2-Cl | 5 | " | " |
| 450 | 3-COOH | H | 4 | COOH | 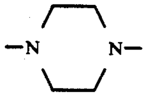 |
| 451 | 3-$SO_3H$ | H | 4 | " | " |
| 452 | " | H | 5 | $SO_3H$ | " |
| 453 | 5-COOH | 2-Cl | 4 | COOH | " |
| 454 | 4-COOH | H | 5 | $SO_3H$ | $-NH(CH_2)_4\underset{COOH}{CH}NH-$ |
| 455 | 5-$SO_3H$ | 2-Cl | 4 | COOH | " |
| 456 | 2-$SO_3H$ | 4-Cl | 4 | " | " |

EXAMPLE 457

65.9 Parts of the dyestuff of the formula

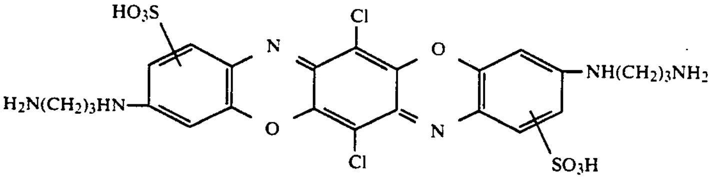

prepared in accordance with known methods are dissolved in 1200 parts of water. At 20°-25° 37 parts of solid cyanuric chloride are added within 30 minutes. The mixture is stirred for one hour at pH 6.0-6.5 which is held by continuously adding a dilute sodium carbonate solution. 22.2 Parts of 1,2-diaminopropane are added, and stirring is effected at 40°-50° for two hours while holding the pH at 7.0 by the addition of a dilute sodium carbonate solution. The condensation product is salted out with sodium chloride and filtered. The resultant paste is redissolved in 1400 parts of water. To this solution 49.5 parts of 5-cyano-2,4,6-trichloropyrimidine are added, and stirring is effected for two hours at 5°-10°. During the course of the reaction the pH is kept at 8-9 by the addition of a dilute sodium carbonate solution. The resultant dyestuff is precipitated by adding sodium chloride and isolated. It corresponds to the formula (T24)

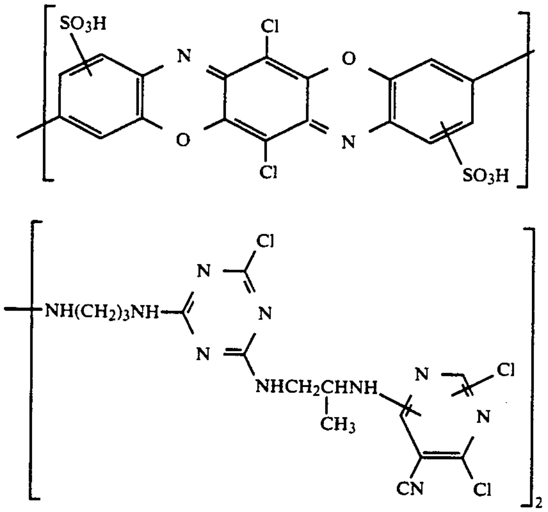

and when dried it is a black powder which dissolves in water with deep-blue colour. The dyestuff dyes cotton a deep-blue shade. These dyeings have very good light and wet fastness properties.

EXAMPLES 458 TO 472

By a method analogous to that described in Example 457 further compounds of formula I may be prepared. They correspond to formula (T24)

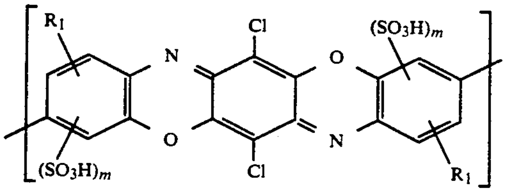

-continued

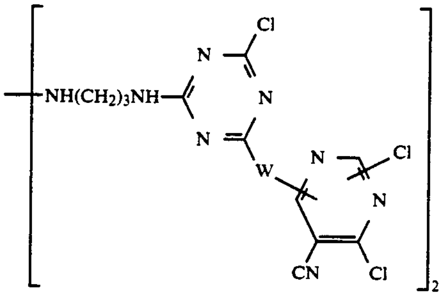

in which the symbols are as defined in Table 24 below. The dyestuffs of Examples 458 to 472 dye cotton a deep-blue shade. These dyeings have good light and wet fastness properties.

TABLE 24

Compounds of formula (T24)

| Ex. No. | m | $R_1$ | —W— |
|---|---|---|---|
| 458 | 1 | H | $-NHCH_2CH_2NH-$ |
| 459 | 1 | H | $-NH(CH_2)_3NH-$ |
| 460 | 1 | H | $-NH(CH_2)_3N(CH_3)-$ |
| 461 | 1 | H | $-NHCH_2CH(OH)CH_2NH-$ |
| 462 | 1 | H | 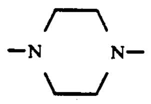 |
| 463 | 0 | $-SO_2CH_2CH_2OSO_3H$ | " |
| 464 | 0 | " | $-NHCH_2CH_2NH-$ |
| 465 | 0 | " | $-NH(CH_2)_3NH-$ |
| 466 | 0 | " | $-NHCH_2CH(OH)CH_2NH-$ |
| 467 | 0 | " | $-NHCH_2CH(CH_3)NH-$ |
| 468 | 1 | " | " |
| 469 | 1 | " | $-NHCH_2CH(OH)CH_2NH-$ |
| 470 | 1 | " | $-NHCH_2CH_2NH-$ |
| 471 | 1 | " | $-NH(CH_2)_3NH-$ |

TABLE 24-continued

| Ex. No. | m | $R_1$ | —W— |
|---|---|---|---|
| | | Compounds of formula (T24) | |
| 472 | 1 | " | 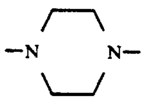 |

EXAMPLE 473

25.7 Parts (0.025 mole) of the dye base, prepared in accordance with known methods by sulphochlorinating of copper phthalocyanine and then reacting with 1,3-diaminobenzene-4-sulphonic acid, containing per molecule an average value of about 2.5 sulphonic acid groups and 1 sulphonamido group, are dissolved in 200 parts of water at pH 6.5–7.0. After the addition of 150 parts of ice, at 0°–5° 4.6 parts of cyanuric chloride are added and stirring is effected for two hours at pH 6.0–6.5. 2.8 Parts of 1,2-diaminopropane are then added and, after having stirred for one hour at 0°–5°, the temperature is raised to 30°–35° within two hours and the pH is adjusted to 7.5–8.0 by adding a 20% sodium carbonate solution. The reaction product which is salted out with 70 parts of sodium chloride and filtered, is redissolved in 250 parts of water. 6.3 Parts of 5-cyano-2,4,6-trichloropyrimidine are added at 0°–5° and the mixture is stirred at this temperature for three hours. Simultaneously, the pH is held at 8–8.5 by adding sodium carbonate. After the condensation is complete, the mixture is salted out with 45 parts of sodium chloride. The dye precipitate is filtered by suction and then dried at 35°. The dyestuff thus obtained corresponding to the formula

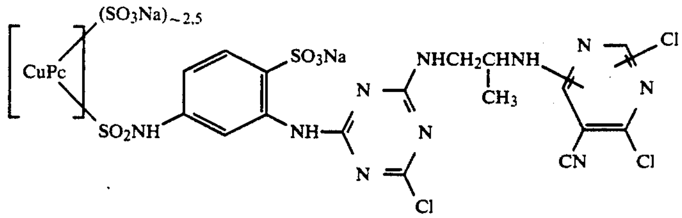

dyes cellulose fibres and particularly cotton a brilliant turquoise shade. These dyeings have good light fastness and perfect wet fastness properties.

EXAMPLE 474

If according to the method described in Example 473 the equivalent amount of the nickel phthalocyanine-dye base, i.e. 25.5 parts (0.025 mole) are used instead of 25.7 parts of the copper phthalocyanine-dye base, the corresponding [NiPc] dyestuff (having the formula analogous to that of Example 473) is obtained which dyes cotton a bluish green shade. The dyeings have good fastness properties.

EXAMPLES 475 TO 480

By analogy with the method described in Examples 473 and 474 further phthalocyanine dyes may be prepared. They correspond to formula (T25)

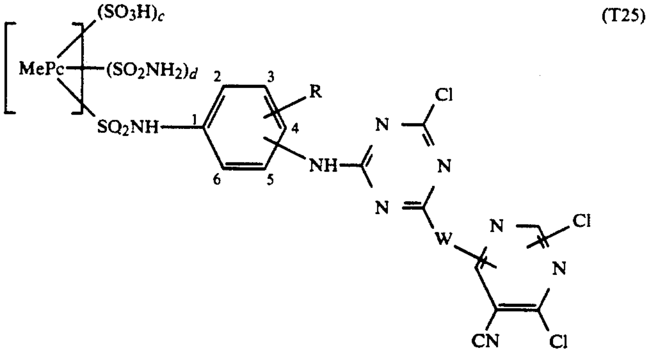

(T25)

in which the symbols are as defined in Table 25 below. In the last column I the shade of each dyeing on cotton is given whereby e is brilliant turquoise and f is bluish green.

These dyeings have good fastness properties.

TABLE 25

| Ex. No. | Me | c | d | R | position —NH— | —W— | I |
|---|---|---|---|---|---|---|---|
| | | | | Compounds of formula (T25) | | | |
| 475 | Cu | 3 | 0 | H | 3 | $-NHCH_2CH(CH_3)NH-$ | e |
| 476 | Cu | 2 | 1 | H | 3 | " | e |
| 477 | Cu | 1 | 2 | 4-$SO_3H$ | 3 | " | e |
| 478 | Cu | 2 | 1 | 2-COOH | H | " | e |
| 479 | Ni | 2 | 1 | H | 3 | " | f |

TABLE 25-continued

| Ex. No. | Me | c | d | Compounds of formula (T25) R | position —NH— | —W— | I |
|---|---|---|---|---|---|---|---|
| 480 | Ni | 1 | 2 | 4-$SO_3H$ | 3 | —$NH(CH_2)_3N(CH_3)$— | f |

EXAMPLE 481

25.5 Parts of the dye base, prepared in accordance with known methods by sulphochlorinating of nickel phthalocyanine and then reacting with 1,3-diaminobenzene-4-sulphonic acid, containing per molecule an average value of about 2.5 sulphonic acid groups and 1 sulphonamido group, in 150 parts of water are stirred with 1.8 parts of sodium nitrite. This solution, which is cooled to 0°-2°, is added dropwise to 100 parts of an ice-water mixture and 12 parts of 30% hydrochloric acid. The resulting diazonium salt suspension is then added to a solution consisting of 5.9 parts of 1-(3'-methylaminopropyl)-6-hydroxy-4-methylpyridone-(2) in 300 parts of ice/water, while keeping a temperature of 0°-5°. During coupling, the pH of the mixture is kept at 9-9.5 by adding a 30% sodium hydroxide solution. A green solution is obtained which is reacted with cyanuric chloride, followed by 1,2-diaminopropane and then 5-cyano-2,4,6-trichloropyrimidine, by analogy with the method described in Example 473, to obtain the dyestuff of the formula

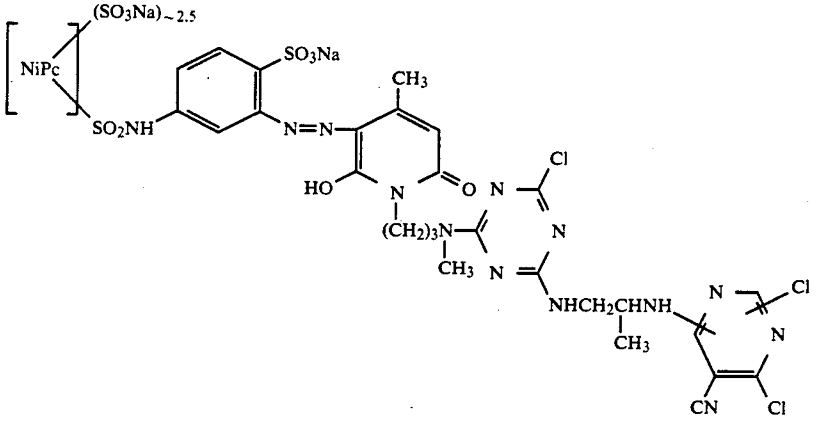

which is isolated in an analogous manner as described in Example 473. The dyestuff dyes cellulose fibres and particularly cotton a brilliant green shade. These dyeings have high light fastness and perfect wet fastness properties.

EXAMPLES 482 TO 519

By a method analogous to that described in Example 481 further phthalocyanine dyestuffs may be prepared. They correspond to the formula (T26) and (T27)

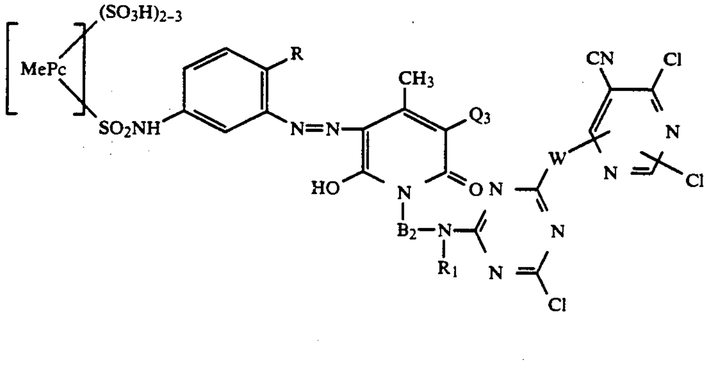

(T26)

-continued (T27)

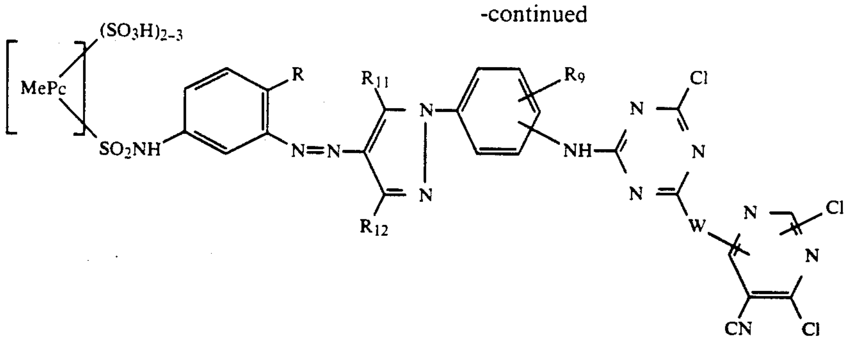

in which the symbols are as defined in Tables 26 and 27 below.

The dyestuffs of Examples 482 to 519 dye cotton a green shade which is further brilliant when nickel phthalocyanine is applied. These dyeings have notably good light and wet fastness properties.

TABLE 26

| | | | Compounds of formula (T26) | | |
|---|---|---|---|---|---|
| Ex. No. | Me | R | $Q_3$ | $-B_2-NR_1-$ | $-W-$ |
| 482 | Cu | $SO_3H$ | H | $-(CH_2)_3N(CH_3)-$ | $-NHCH_2CH(CH_3)NH-$ |
| 483 | Ni | H | H | " | " |
| 484 | Ni | H | $-CONH_2$ | " | " |
| 485 | Ni | $SO_3H$ | H | $-(CH_2)_3NH-$ | " |
| 486 | Cu | " | H | $-CH_2CH_2NH-$ | " |
| 487 | Ni | " | H | " | $-NH(CH_2)_3N(CH_3)-$ |
| 488 | Ni | " | $-CONH_2$ | $-(CH_2)_3NH-$ | " |
| 489 | Ni | " | H | " | " |
| 490 | Ni | " | H | $-(CH_2)_3N(CH_3)-$ | " |
| 491 | Ni | " | H | " | $-NHCH_2CH(OH)CH_2NH-$ |
| 492 | Cu | H | H | " | " |
| 493 | Ni | $SO_3H$ | $-CONH_2$ | " | " |
| 494 | Ni | " | H | $-CH_2CH_2NH-$ | " |
| 495 | Ni | $SO_3H$ | H | $-(CH_2)_3N(CH_3)-$ | piperazine-1,4-diyl (–N⟨⟩N–) |
| 496 | Cu | H | $-CONH_2$ | " | $-NHCH_2CH_2NH-$ |
| 497 | Ni | $SO_3H$ | H | " | –N⟨piperazine⟩NCH₂CH₂NH– |
| 498 | Ni | " | H | $-(CH_2)_3NH-$ | $-NH(CH_2)_3NH-$ |

TABLE 27

| | | | | Compounds of formula (T27) | | | |
|---|---|---|---|---|---|---|---|
| Ex. No. | Me | R | $R_{11}$ | $R_{12}$ | $R_9$ | position —NH— | —W— |
| 499 | Cu | $SO_3H$ | OH | $CH_3$ | H | 5 | $-NHCH_2CH(CH_3)NH-$ |
| 500 | Ni | " | OH | " | H | 5 | " |
| 501 | Ni | " | $NH_2$ | " | H | 5 | " |

TABLE 27-continued

| Ex. No. | Me | R | $R_{11}$ | $R_{12}$ | $R_9$ | position —NH— | —W— |
|---|---|---|---|---|---|---|---|
| | | | Compounds of formula (T27) | | | | |
| 502 | Ni | H | OH | " | 2-$SO_3H$ | 5 | " |
| 503 | Ni | $SO_3H$ | OH | —COOH | H | 4 | " |
| 504 | Cu | " | OH | $CH_3$ | H | 5 | $—NH(CH_2)_3N(CH_3)—$ |
| 505 | Ni | " | OH | " | 2-$SO_3H$ | 5 | " |
| 506 | Ni | " | OH | " | H | 4 | " |
| 507 | Cu | " | OH | —COOH | H | 5 | " |
| 508 | Ni | H | OH | $CH_3$ | 2-$SO_3H$ | 5 | " |
| 509 | Ni | H | OH | " | " | 5 | $—NHCH_2CH(OH)CH_2NH—$ |
| 510 | Ni | $SO_3H$ | OH | " | H | 4 | " |
| 511 | Cu | " | OH | " | 2-$SO_3H$ | 5 | " |
| 512 | Ni | " | $NH_2$ | " | " | 5 | " |
| 513 | Ni | " | OH | " | " | 4 | 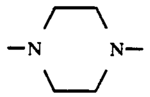 |
| 514 | Cu | " | OH | " | H | 5 | 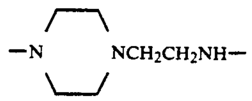 |
| 515 | Ni | H | OH | —COOH | H | 5 | $—NHCH_2CH_2NH—$ |
| 516 | Cu | H | OH | $CH_3$ | H | 4 | " |
| 517 | Ni | $SO_3H$ | OH | " | H | 5 | " |
| 518 | Ni | " | $NH_2$ | " | H | 4 | " |
| 519 | Ni | " | OH | " | 2-$SO_3H$ | 5 | $—NH(CH_2)_3NH—$ |

EXAMPLE 520

By analogy with the method described in Example 481, using appropriate starting compounds, the dyestuff of the formula

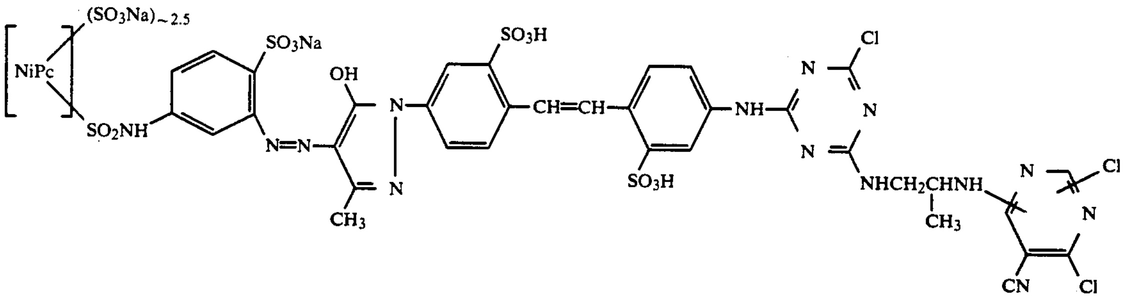

may be prepared and isolated. It dyes cotton a brilliant green shade. The dyeings obtained have good light and wet fastness properties.

In accordance with the method as described the dyestuffs of Examples 1 to 520 are obtained in sodium salt form. They may, depending on the reaction/isolation conditions or by reacting the sodium salts in accordance with known methods, also be obtained in free acid form or in other salt forms, for example those salt forms containing one or more cations indicated in the description above.

The dyes of Examples 1–520 (and the corresponding free acids and other salt forms) contain the compound wherein the floating chloro substituent on the pyrimidine ring is in the 2-position and the corresponding compound wherein it is in the 6-position, with the former usually predominating, often by a ratio of about 2:1. The dyes of Examples 457–520 are mixtures of isomers that differ with respect to the positions of all of the floating substituents. It is preferred to use the mixtures of Examples 1–520, as well as all of the other dyes of formula I, as obtained, i.e., as mixtures. However, if single isomers are desired, the obtained mixtures may be separated by conventional means.

In the following examples the application of the compounds of this invention is illustrated.

APPLICATION EXAMPLE A 0.3 Parts of the dyestuff of Example 1 are dissolved in 300 parts of demineralised water and 15 parts of Glauber's salt (calcined) are added. The dyebath is heated to 40°, then 10 parts of cotton fabric (bleached) are added. After 30 minutes at 40°, 6 parts of sodium carbonate (calcined) are added to the bath portionwise every 10 minutes applying quantities of 0.2, 0.6, 1.2 and finally 4.0 parts thereof. During the addition of sodium carbonate the temperature is kept at 40°. Subsequently, dyeing is effected for a further one hour at 40°.

The dyed fabric is then rinsed with running cold water for 3 minutes and afterwards with running hot water for a further 3 minutes. The dyeing is washed at the boil for 15 minutes in 500 parts of demineralised water in the presence of 0.25 parts of a commercially available anion-active detergent. After being rinsed with running hot water (for 3 minutes) and centrifuged, the dyeing is dried in a cabinet dryer at about 70°. An orange cotton dyeing showing good light and wet fastness properties which are resistant to oxidative influences is obtained.

APPLICATION EXAMPLE B

To a dyebath containing in 300 parts of demineralised water, 10 parts of Glauber's salt (calcined), 10 parts of cotton fabric (bleached) are added. The bath is heated to 40° within 10 minutes, and 0.5 parts of the dyestuff of Example 1 are added. After a further 30 minutes at 40°, 3 parts of sodium carbonate (calcined) are added and dyeing is continued at 40° for a further 45 minutes.

The dyed fabric is rinsed with running cold and then hot water and washed at the boil according to the method given in Application Example A. After rinsing and drying, an orange cotton dyeing which has the same good fastness properties as indicated in Application Example A is obtained.

APPLICATION EXAMPLE C

By a modified method as described in Application Example A, 0.3 parts of the dyestuff of Example 481 are used and, instead of a total of 6 parts of sodium carbonate which are added portionwise, only 2 parts of calcined sodium carbonate are added in one portion. The starting temperature of 40° is raised to 60°, and dyeing is effected for a further one hour at 60°. Otherwise, the method described in Application Example A is employed analogously. A brilliant green cotton dyeing of good build-up showing notably good light fastness properties is obtained.

APPLICATION EXAMPLE D 2.5 Parts of the dyestuff of Example 473 are dissolved in 2000 parts of water. 100 Parts of cotton fabric are added, and the temperature of the dyebath is raised to 80° within 10 minutes. 100 Parts of Glauber's salt (calcined) are added and, 30 minutes thereafter, 20 parts of sodium carbonate (calcined). Dyeing is continued for one hour at 80°. Subsequently, the dyed fabric is rinsed with running cold, then hot, water, and is washed at the boil according to the method given in Application Example A. After rinsing and drying, a brilliant turquoise cotton dyeing having good fastness properties is obtained.

Similarly, the dyestuffs of the remaining Examples or mixtures of the exemplified dyestuffs may be employed to dye cotton in accordance with the method described in Application Examples A to D.

APPLICATION EXAMPLE E

A printing paste consisting of

| | |
|---|---|
| 40 parts | of the dyestuff of Example 1 |
| 100 parts | of urea |

-continued

| | |
|---|---|
| 350 parts | of water |
| 500 parts | of a 4% sodium alginate thickener |
| 10 parts | of sodium bicarbonate |
| 1000 parts | |

is applied to cotton fabric in accordance with conventional printing methods.

The printed fabric is dried and fixed in steam at 102°-104° for 4-8 minutes. It is rinsed in cold and then hot water, washed at the boil (according to the method described in Application Example A) and dried. An orange print which has good general fastness properties is obtained.

Similarly, the dyestuffs of Examples 2 to 520 or mixtures of the exemplified dyestuffs may be employed to print cotton in accordance with the method given in Application Example E. All prints obtained show good fastness properties.

What is claimed is:

1. A compound of the formula $$F_c\text{-}[(X\text{—}NR_1\text{—}Alk)_a\text{—}NR_1\text{—}Z]_b,$$

$$\left[DK\text{—}N{=}N\text{—}KK\right]\text{-}(Z)_b,$$

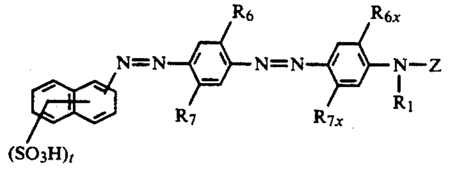

or

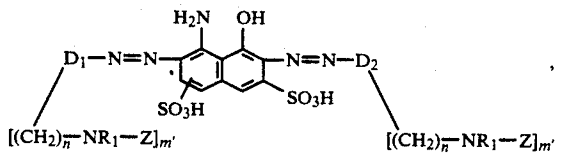

or a water-soluble salt thereof each cation of which is independently a non-chromophoric cation, or a mixture of such compounds or salts, wherein each of $D_1$ and $D_2$ is independently the radical of a diazo component of the aminobenzene or aminonaphthalene series containing at least one sulfo, sulfamoyl or carboxy group, with the proviso that $D_1$ and $D_2$ are not metallized, $F_c$ is the radical of a water-soluble formazan, phthalocyanine, azomethine, oxazine, thiazine, phenazine or triphenylmethane dye, DK is the radical of a benzenic or naphthalenic diazo component, KK is the radical of a benzenic, naphthalenic or heterocyclic coupling component or of an enolizable compound having an acidic —CH group, with the provisos that (i) DK—N=N—KK is the radical of a metal-free and water-soluble azo dye, and (ii) Z or each Z independently is bound to DK or KK through an —$NR_1$— radical, each of $R_6$ and $R_{6x}$ is independently hydrogen, $C_{1-4}$alkyl or $C_{1-4}$alkoxy, each of $R_7$ and $R_{7x}$ is independently hydrogen, halo, $C_{1-4}$-alkyl, $C_{1-4}$alkoxy, ($C_{1-4}$alkyl)carbonylamino or —$NHCONH_2$, each X is independently a direct bond, —CO— or —SO₂—, each Z is independently

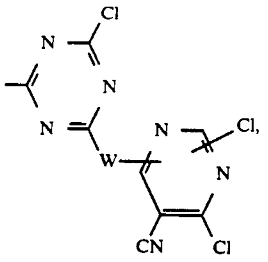

wherein

W is $—NR_1—B_1—NR_1—$,

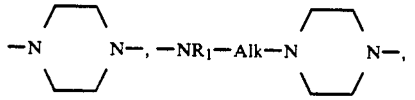

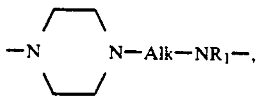

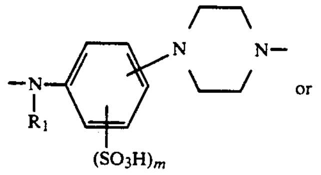

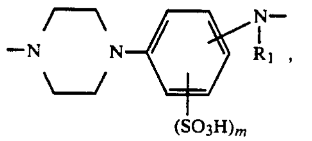

wherein $B_1$ is linear or branched $C_{2-6}$-alkylene; linear or branched $C_{2-6}$alkylene interrupted by —O— or $—NR_1—$; linear or branched $C_{3-6}$alkylene mono-substituted by hydroxy or carboxy or disubstituted by hydroxy,

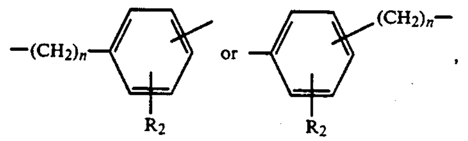

wherein $R_2$ is hydrogen, $C_{1-4}$-carboxy or sulfo, and m' is 0 or 1, each a is independently 0 or 1, b is 1 or 2, each m' is independently 0 or 1, with the proviso that at least one m' is 1, and t is 2 or 3, wherein each Alk is independently linear or branched $C_{2-4}$alkylene, each $R_1$ is independently hydrogen, $C_{1-4}$alkyl or $C_{1-4}$alkyl monosubstituted by hydroxy, halo, sulfo, sulfato or carboxy, and each n is independently 0, 1, 2, 3 or 4, with the proviso that the hydroxy groups of each alkylene radical substituted by two hydroxy groups are attached to different carbon atoms.

2. A compound or salt according to claim 1.

3. A compound, salt or mixture according to claim 1 wherein each cation is independently lithium, sodium, potassium, ammonium, methylammonium, dimethylammonium, trimethylammonium, tetramethylammonium, triethylammonium, ethanolammonium, diethanolammonium or triethanolammonium.

4. A compound, salt or mixture according to claim 1 wherein each $R_1$ is independently hydrogen, methyl, ethyl, 2-hydroxyethyl, $—(CH_2)_r—SO_3H$, $—(CH_2)_r—O—SO_3H$ or $—(CH_2)_q—COOH$, wherein q is 1, 2 or 3, and r is 1 or 2.

5. A compound, salt or mixture according to claim 4 wherein each W is independently $—NR_{1b}—B_{1b}—NR_{1b}—$ or

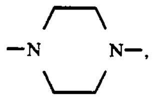

wherein $B_{1b}$ is linear or branched $C_{2-3}$alkylene, linear or branched $C_{3-4}$alkylene mono-substituted by hydroxy,

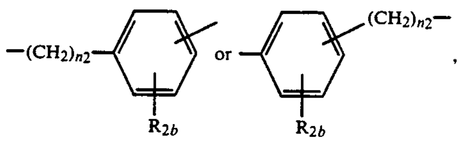

wherein $R_{2b}$ is hydrogen or sulfo, and $n_2$ is 0, 1 or 2, and each $R_{1b}$ is independently hydrogen, methyl, ethyl or 2-hydroxyethyl.

6. A compound according to claim 1 having the formula $$\left[DK—N{=}N—KK\right]—(Z)_b,$$

or a water soluble salt thereof each cation of which is independently a non-chromophoric cation, or a mixture of such compounds or salts.

7. A compound according to claim 6 having the formula $$\left[DK—N{=}N—KK\right]—Z,$$

or a water-soluble salt thereof each cation of which is independently a non-chromophoric cation, or a mixture of such compounds or salts.

8. A compound according to claim 7 having the formula $$DK_1—N=N—KK_1,$$

or a water-soluble salt thereof each cation of which is independently a non-chromophoric cation, or a mixture of such compounds or salts, wherein $DK_1$ is

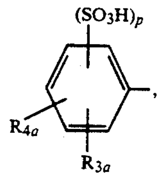

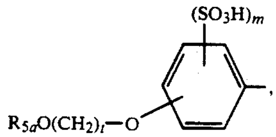

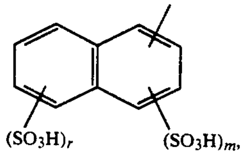

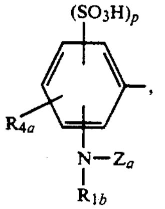

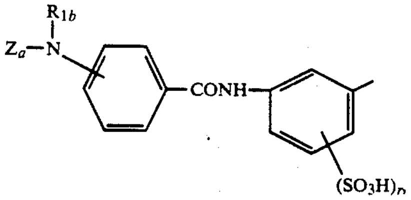

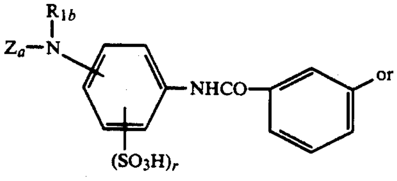

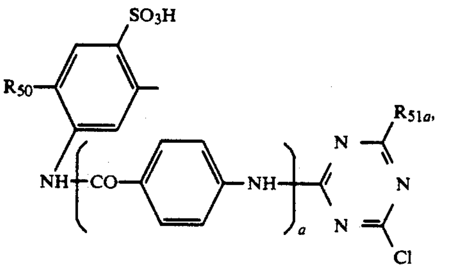

wherein each of $R_{3a}$ and $R_{4a}$ is independently hydrogen, chloro, methyl, methoxy, ethoxy or carboxy, $R_{5a}$ is hydrogen, methyl, ethyl, sulfo or 2-hydroxyethyl, $R_{51a}$ is

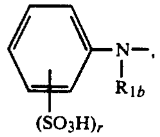

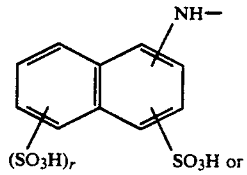

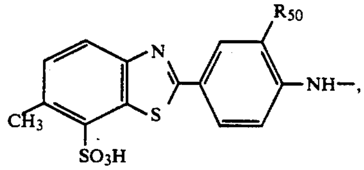

a is 0 or 1, m is 0 or 1, p is 0, 1 or 2, r is 1 or 2, with the proviso that m+r is 2 or 3, and t is 2 or 3, and $KK_1$ is

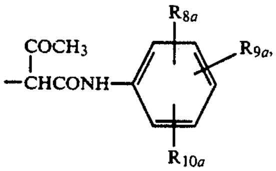

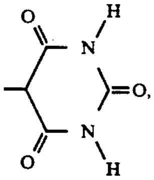

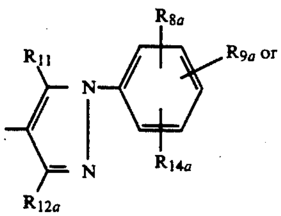

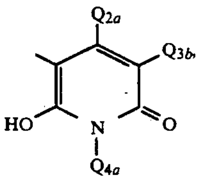

wherein $Q_{2a}$ is hydrogen, methyl, ethyl, phenyl, $—COR_{13}$, sulfomethyl or sulfatomethyl, $Q_{3b}$ is hydrogen, cyano, sulfo $—COR_{13}$, methyl, ethyl, sulfomethyl or $—CH_2NH_2$, $Q_{4a}$ is hydrogen; $—B_{2a}—NR_{1b}—Z_a$; methyl; ethyl; cyclohexyl; phenyl; phenyl substituted by 1 or 2 substituents selected from chloro, methyl, methoxy, sulfo, carboxy, $—NH_2$ and $—NR_{1b}—Z_a$; phenyl($C_{1-2}$alkyl); phenyl($C_{1-2}$-alkyl) the phenyl ring of which is substituted by 1 or 2 substituents selected from chloro, methyl, methoxy, sulfo, carboxy, $—NH_2$ and $—NR_{1b}—Z_a$; or $—Wa—Y_2$, wherein $B_{2a}$ is —Wb—, linear or branched $C_{3-4}$alkylene monosubstituted by hydroxy,

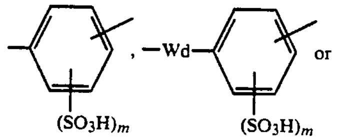

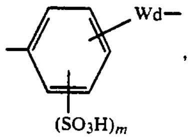

wherein

Wd is linear or branched $C_{1-2}$-alkylene, and m is 0 or 1, or $—B_{2a}—NR_{1b}—Z_a$ is

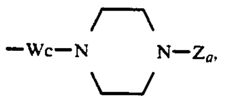

Wa is linear or branched $C_{1-4}$alkylene, and $Y_2$ is carboxy, sulfo, sulfato, hydroxy, cyano, methoxy or $—NR_{27}R_{28}$, wherein each of $R_{27}$ and $R_{28}$ is independently hydrogen; $C_{1-4}$-alkyl; $C_{1-4}$alkyl monosubstituted by hydroxy, $C_{1-4}$-alkoxy, carboxy, sulfo, $—NH—C_{1-4}$-alkyl or $N(C_{1-4}\text{-alkyl})_2$; cyclohexyl; cyclohexyl substituted by 1 to 3 methyl groups; phenyl; phenyl substituted by 1 or 2 substituents selected from halo, $C_{1-4}$alkyl, $C_{1-4}$-alkoxy, sulfo and carboxy; phenyl($C_{1-4}$alkyl); or phenyl($C_{1-4}$alkyl) the phenyl ring of which is substituted by 1 or 2 substituents selected from halo, $C_{1-4}$alkyl, $C_{1-4}$alkoxy, sulfo and carboxy, or $—NR_{27}R_{28}$ is piperidino; morpholino; piperazino; or piperidino, morpholino or piperazino substituted by 1 to 3 methyl groups, $R_{8a}$ is hydrogen, chloro, methyl or methoxy, $R_{9a}$ is hydrogen, chloro, methyl, methoxy, sulfo or carboxy, $R_{10a}$ is hydrogen, sulfo or $—NR_{1b}—Z_a$, $R_{11}$ is hydroxy or $—NH_2$, $R_{12a}$ is methyl, carboxy or $—CONH_2$, and $R_{14a}$ is hydrogen, chloro, methyl, ethyl, sulfo or $—NR_{1b}—Z_a$, wherein each $R_{13}$ is independently hydroxy, $C_{1-4}$alkoxy or $—NH_2$, each $R_{50}$ is independently hydrogen or sulfo, and $Z_a$ is

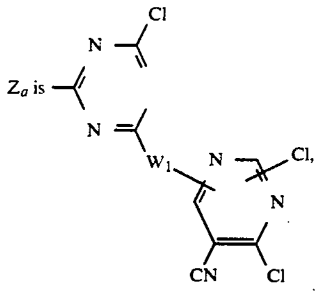

wherein $W_1$ is $—NR_{1b}—B_{1a}—NR_{1b}—$,

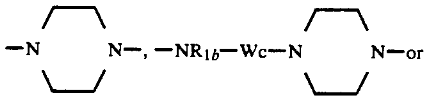

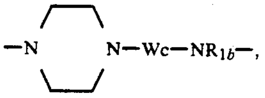

wherein $B_{1a}$ is —Wb—, —Wc—O—Wc—, $—Wc—NR_{1b}—Wc—$, linear or branched $C_{3-4}$alkylene monosubstituted by hydroxy,

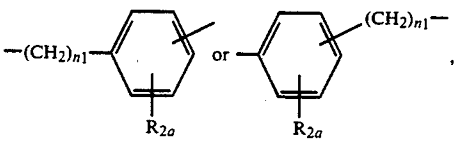

wherein $R_{2a}$ is hydrogen, methyl, methoxy, carboxy or sulfo, and $n_1$ is 0, 1, 2 or 3, wherein each $R_{1b}$ is independently hydrogen, methyl, ethyl or 2-hydroxyethyl, each Wb is independently linear or branched $C_{2-4}$alkylene, and each Wc is independently linear or branched $C_{2-3}$alkylene, with the proviso that the compound contains one $Z_a$ group.

9. A compound according to claim 7 having the formula

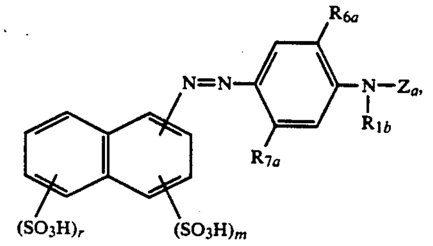

or a water-soluble salt thereof each cation of which is independently a non-chromophoric cation, or a mixture of such compounds or salts, wherein $R_{6a}$ is hydrogen, methyl or methoxy, $R_{7a}$ is hydrogen, chloro, methyl, methoxy, —NHCOCH$_3$ or —NHCONH$_2$, $Z_a$ is

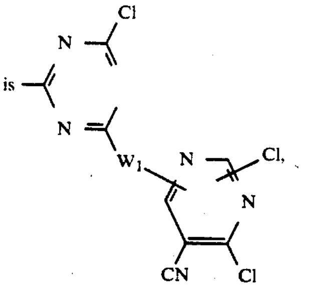

wherein $W_1$ is —NR$_{1b}$—B$_{1a}$—NR$_{1b}$—,

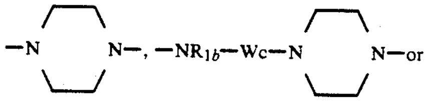

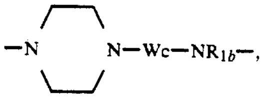

wherein $B_{1a}$ is —Wb—, —Wc—O—Wc—, —Wc—NR$_{1b}$—Wc—, linear or branched C$_{3-4}$alkylene monosubstituted by hydroxy,

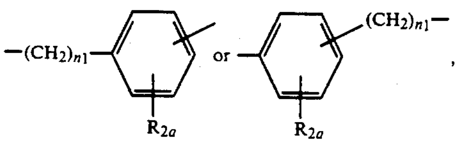

wherein $R_{2a}$ is hydrogen, methyl, methoxy, carboxy or sulfo,

Wb is linear or branched C$_{2-4}$alkylene, and $n_1$ is 0, 1, 2 or 3, m is 0 or 1, and r is 1 or 2, with the proviso that m+r is 2 or 3, wherein each $R_{1b}$ is independently hydrogen, methyl, ethyl or 2-hydroxyethyl, and each Wc is independently linear or branched C$_{2-3}$alkylene.

10. A compound according to claim 7 having the formula

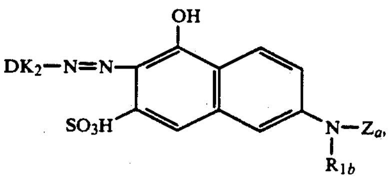

or a water-soluble salt thereof each cation of which is independently a non-chromophoric cation, or a mixture of such compounds or salts, wherein $DK_2$ is

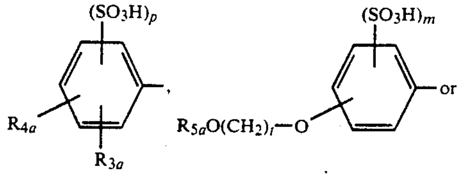

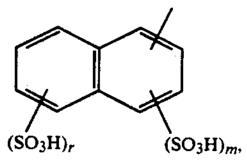

wherein each of $R_{3a}$ and $R_{4a}$ is independently hydrogen, chloro, methyl, methoxy, ethoxy or carboxy, $R_{5a}$ is hydrogen, methyl, ethyl, sulfo or 2-hydroxyethyl, m is 0 or 1, p is 0, 1 or 2, r is 1 or 2, with the proviso that m+r is 2 or 3, and t is 2 or 3, and $Z_a$ is

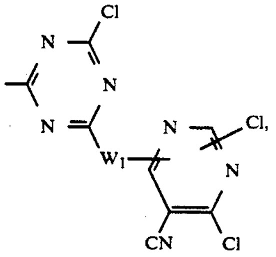

wherein $W_1$ is —NR$_{1b}$—B$_{1a}$—NR$_{1b}$—,

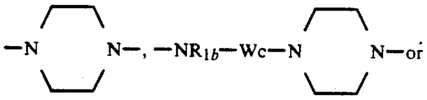

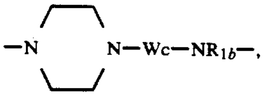

wherein $B_{1a}$ is —Wb—, —Wc—O—Wc—, —Wc—NR$_{1b}$—Wc—, linear or branched C$_{3-4}$alkylene monosubstituted by hydroxy,

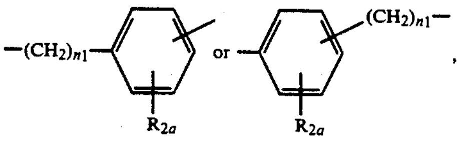

wherein $R_{2a}$ is hydrogen, methyl, methoxy, carboxy or sulfo,

Wb is linear or branched C$_{2-4}$alkylene, and $n_1$ is 0, 1, 2 or 3, wherein each $R_{1b}$ is independently hydrogen, methyl, ethyl or 2-hydroxyethyl, and each Wc is independently linear or branched $C_{2-3}$alkylene.

11. A compound according to claim 7 having the formula

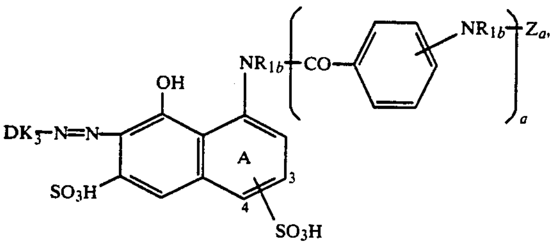

or a water-soluble salt thereof each cation of which is independently a non-chromophoric cation, or a mixture of such compounds or salts, wherein $DK_3$ is

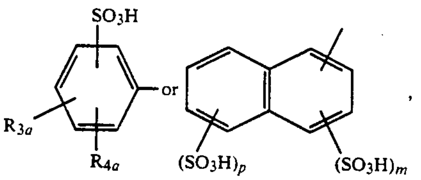

wherein each of $R_{3a}$ and $R_{4a}$ is independently hydrogen, chloro, methyl, methoxy, ethoxy or carboxy, m is 0 or 1, and p is 0, 1 or 2, with the proviso that m+p is 1 or 2, $Z_a$ is

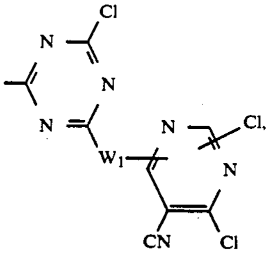

wherein $W_1$ is $-NR_{1b}-B_{1a}-NR_{1b}-$,

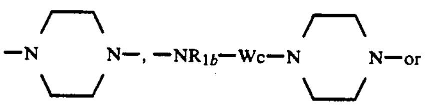

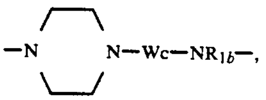

wherein $B_{1a}$ is —Wb—, —Wc—O—Wc—, —Wc—$NR_{1b}$—Wc—, linear or branched $C_{3-4}$alkylene monosubstituted by hydroxy,

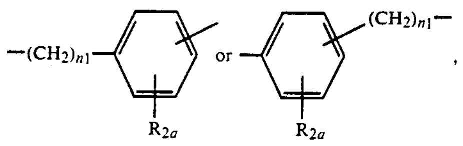

wherein $R_{2a}$ is hydrogen, methyl, methoxy, carboxy or sulfo,

Wb is linear or branched $C_{2-4}$alkylene, and $n_1$ is 0, 1, 2 or 3, a is 0 or 1, and the $-SO_3H$ group on Ring A is in the 3- or 4-position, wherein each $R_{1b}$ is independently hydrogen, methyl, ethyl or 2-hydroxyethyl, and each Wc is independently linear or branched $C_{2-3}$alkylene.

12. A compound according to claim 1 having the formula

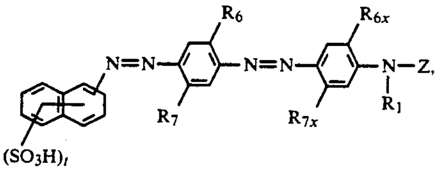

or a water-soluble salt thereof each cation of which is independently a non-chromophoric cation, or a mixture of such compounds or salts.

13. A compound, salt or mixture according to claim 12 wherein each of $R_6$, $R_{6x}$ and $R_{7x}$ is hydrogen.

14. A compound according to claim 1 having the formula

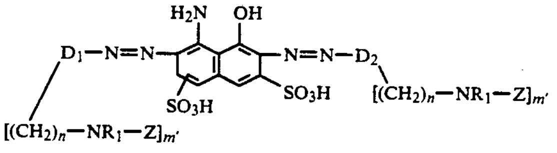

or a water-soluble salt thereof each cation of which is independently a non-chromophoric cation, or a mixture of such compounds or salts.

15. A compound, salt or mixture according to claim 14 wherein $D_1$—$[(CH_2)_n-NR_1-Z]_{m'}$ is

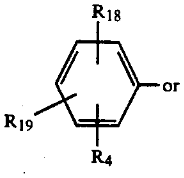

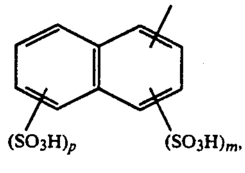

wherein $R_{19}$ is hydrogen, halo, $C_{1\text{-}4}$alkyl, $C_{1\text{-}4}$alkoxy, acetamido or sulfo, m is 0 or 1, and p is 0, 1 or 2, with the proviso that m+p is 1 or 2, and $D_2$ is

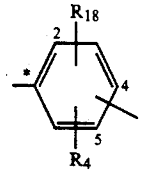

wherein the * denotes the bond attached to the azo radical, wherein each $R_4$ is independently hydrogen, halo, $C_{1\text{-}4}$alkyl, $C_{1\text{-}4}$alkoxy or —CO—$R_{13}$, and $R_{18}$ is independently sulfo, sulfamoyl or —CO—$R_{13}$, wherein $R_{13}$ is hydroxy, $C_{1\text{-}4}$alkoxy or —$NH_2$.

16. A compound according to claim 1 having the formula

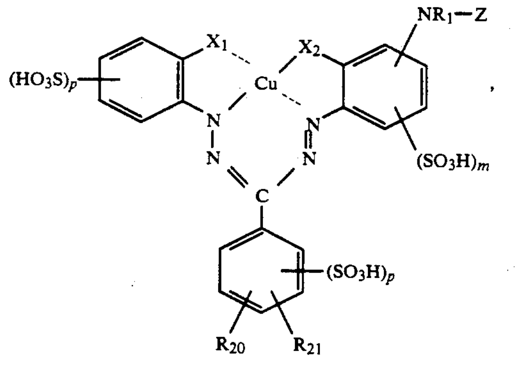

or a salt thereof each cation of which is independently a non-chromophoric cation, or a mixture of such compounds or water-soluble salts, wherein each of $R_{20}$ and $R_{21}$ is independently hydrogen, halo, $C_{1\text{-}4}$-alkyl, $C_{1\text{-}4}$alkoxy, —CO—$R_{13}$ or ($C_{1\text{-}4}$alkyl)-carbonylamino, wherein $R_{13}$ is hydroxy, $C_{1\text{-}4}$alkoxy or —$NH_2$, one of $X_1$ and $X_2$ is —O— and the other is —COO—, m is 0 or 1, and each p is independently 0, 1 or 2, with the proviso that the sum of m and both p's together is at least 2.

17. A compound according to claim 1 having the formula

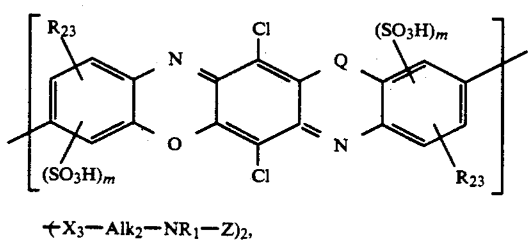

or a water-soluble salt thereof each cation of which is independently a non-chromophoric cation, or a mixture of such compounds or salts.

wherein each $Alk_2$ is independently linear or branched $C_{2\text{-}4}$-alkylene, Q is —O— or —S—, each $R_{23}$ is independently hydrogen or —$SO_2CH_2CH_2OSO_3H$, each $X_3$ is independently —$SO_2$—, —$NR_1$—, —*CO—$NR_1$— or —*$SO_2$—$NR_1$—, wherein the * denotes the atom attached to the ring, and each m is independently 0 or 1.

18. A compound, salt or mixture according to claim 17 wherein the two —$X_3$—$Alk_2$—$NR_1$—Z groups are identical.

19. A compound according to claim 1 having the formula

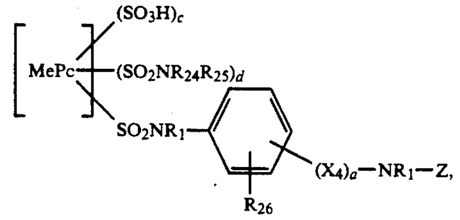

or a water-soluble salt thereof each cation of which is independently a non-chromophoric cation, or a mixture of such compounds or salts, wherein Me is copper, nickel, cobalt, iron or aluminum, Pc is the phthalocyanine ring, each of $R_{24}$ and $R_{25}$ is independently hydrogen or $C_{1\text{-}6}$alkyl or —$NR_{24}R_{25}$ is a saturated 5- or 6-membered heterocyclic ring containing no further hetero atom or containing an —O— or —$NR_{31}$— radical, wherein $R_{31}$ is hydrogen, $C_{1\text{-}4}$alkyl, 2-hydroxyethyl or 2-aminoethyl, $R_{26}$ is hydrogen, halo, hydroxy, $C_{1\text{-}4}$alkyl, $C_{1\text{-}4}$alkoxy, carboxy or sulfo, $X_4$ is a divalent aliphatic, araliphatic or heterocyclic bridging radical or —N=N—$KK_2$— wherein $KK_2$ is

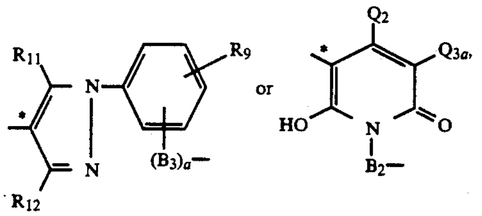

wherein $B_2$ is linear or branched $C_{2\text{-}6}$alkylene; linear or branched $C_{3\text{-}6}$alkylene monosubstituted by hydroxy; linear or branched $C_{2\text{-}6}$alkylene interrupted by —O— or —$NR_1$—;

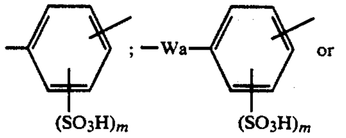

-continued

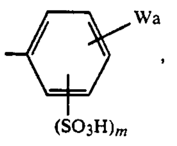

wherein

Wa is linear or branched $C_{1-4}$alkylene, and m is 0 or 1, or

—$B_2$—$NR_1$— is

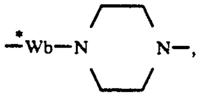

wherein

Wb is linear or branched $C_{2-4}$alkylene, and the * denotes the carbon atom attached to the pyridone ring, $B_3$ is a divalent bridging radical, $Q_2$ is hydrogen; $C_{1-4}$alkyl; $C_{1-4}$alkyl monosubstituted by sulfo, sulfato or —CO—$R_{13}$; $C_{5-6}$cycloalkyl; phenyl; phenyl substituted by 1 to 3 substitutents each of which is independently $C_{1-4}$alkyl, $C_{1-4}$alkoxy, halo, carboxy or sulfo; phenyl($C_{1-4}$alkyl); phenyl($C_{1-4}$alkyl) the phenyl ring of which is substituted by 1 to 3 substituents each of which is independently $C_{1-4}$alkyl, $C_{1-4}$alkoxy, halo, carboxy or sulfo; or —CO—$R_{13}$, $Q_{3a}$ is hydrogen; cyano; sulfo; —CO—$R_{13}$; $C_{1-4}$alkyl; $C_{1-4}$alkyl monosubstituted by hydroxy, halo, cyano, $C_{1-4}$alkoxy, sulfo, sulfato, —$NH_2$ or

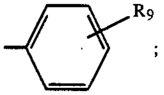

sulfamoyl;

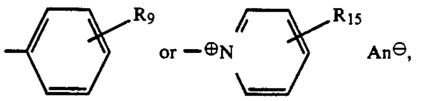

wherein $R_{15}$ is hydrogen, $C_{1-4}$alkyl or $C_{2-4}$hydroxyalkyl, and $An^{\ominus}$ is a non-chromophoric anion, $R_{11}$ is hydroxy or —$NH_2$, $R_{12}$ is $C_{1-4}$alkyl or —CO—$R_{13}$, and the * denotes the carbon atom attached to the azo radical, c is 1, 2 or 3, and d is 0, 1 or 2, with the proviso that c+d is 1, 2 or 3, wherein each $R_9$ is independently hydrogen, halo, $C_{1-4}$alkyl, $C_{1-4}$-alkoxy, carboxy or sulfo, each $R_{13}$ is independently hydroxy, $C_{1-4}$alkoxy or —$NH_2$, and each a is independently 0 or 1.

20. A compound, salt or mixture according to claim 19 wherein —$(X_4)_a$— is —$X_4$—.

21. A compound according to claim 9 having the formula

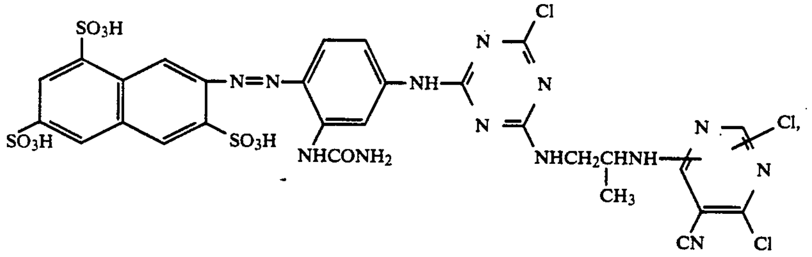

or a water-soluble salt thereof each cation of which is independently a non-chromophoric cation, or a mixture of such compounds or salts.

22. A compound according to claim 10 having the formula

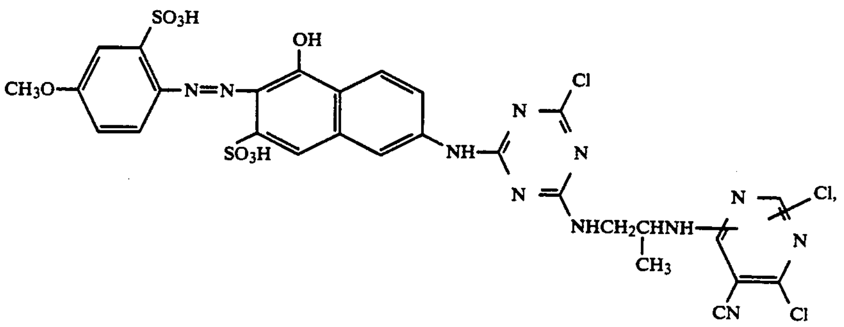

or a water-soluble thereof each cation of which is independently a non-chromophoric cation, or a mixture of such compounds or salts.

23. A compound according to claim 11 having the formula

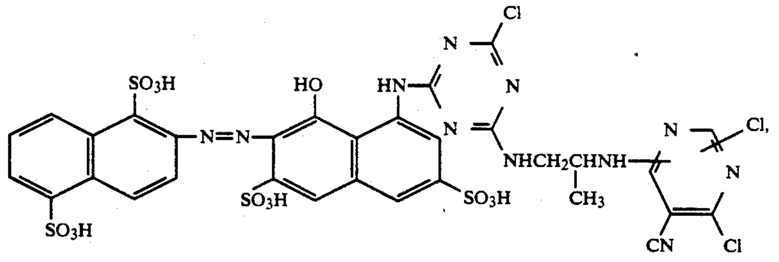

or a water-soluble salt thereof each cation of which is independently a non-chromophoric cation,
or a mixture of such compounds or salts.

24. A compound according to claim 11 having the formula

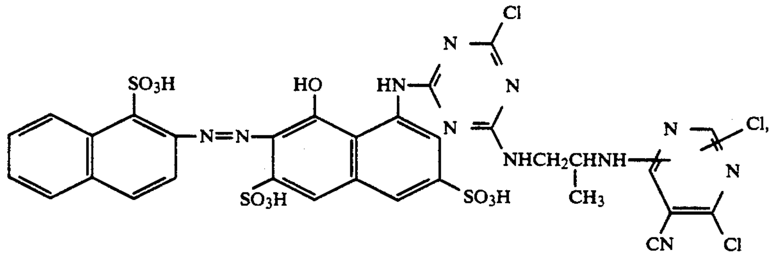

or a water-soluble salt thereof each cation of which is independently a non-chromophoric cation,
or a mixture of such compounds or salts.

25. A compound according to claim 11 having the formula

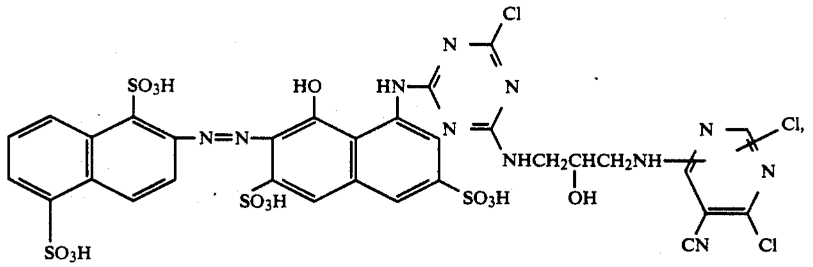

or a water-soluble salt thereof each cation of which is independently a non-chromophoric cation, or a mixture of such compounds or salts.

26. A process for dyeing or printing an hydroxy group- or nitrogen-containing organic substrate comprising applying to an hydroxy group- or nitrogen-containing organic substrate a compound, salt or mixture according to claim 1 as a dyeing or printing agent.

27. A process according to claim 26 wherein the substrate is a fiber material comprising natural or regenerated cellulose.

28. A process according to claim 27 wherein the substrate is a textile material comprising cotton.

* * * * *